United States Patent [19]

Itoh

[11] Patent Number: 5,459,381
[45] Date of Patent: Oct. 17, 1995

[54] COMPOSITE SYSTEM COURSE CONTROL METHOD AND APPARATUS

[75] Inventor: Hiroshi Itoh, Fuchu, Japan

[73] Assignee: Canon Kabushiki Kaisha, Tokyo, Japan

[21] Appl. No.: 141,351

[22] Filed: Oct. 26, 1993

[30] Foreign Application Priority Data

Oct. 28, 1992 [JP] Japan .................................. 4-311143
Oct. 28, 1992 [JP] Japan .................................. 4-311144

[51] Int. Cl.$^6$ ............................................. G05B 11/01
[52] U.S. Cl. ................... 318/560; 318/568.19; 318/575; 318/574; 318/802; 318/568.12; 318/569
[58] Field of Search ............................ 318/560, 568.19, 318/575, 574, 802, 568.12, 569, 567

[56] References Cited

U.S. PATENT DOCUMENTS

| 5,023,538 | 6/1991 | Mutoh et al. | 318/802 |
| 5,206,569 | 4/1993 | Ozawa | 318/560 |
| 5,252,901 | 10/1993 | Ozawa et al. | 318/568.19 |

OTHER PUBLICATIONS

A. Suzuki, et al., "Design and Implementation of Digital Servo Controller for High Speed Machine Tools", Proceedings of the 1991 American Control Conference, vol. 2, pp. 1246–1251 (Jun. 1991).

C. Lo, et al., "Evaluation of Servo–Controllers for Machine Tools", Proceedings of the 1992 American Control Conference, vol. 1, pp. 370–374 (Jun. 1992).

Primary Examiner—William M. Shoop, Jr.
Assistant Examiner—Karen Masih
Attorney, Agent, or Firm—Fitzpatrick, Cella, Harper & Scinto

[57] ABSTRACT

High-speed, high-precision course control can be performed without increasing the loop gain of each control system. A target value for moving a controlled object as a reality axis by a desired amount is produced. A virtual target value for moving a virtual controlled object as a virtual axis based on the reality axis is also produced. A control input and a virtual control input which optimize a predetermined first evaluation function are calculated upon reception of the produced virtual target value, the produced target value, a virtual state amount from the virtual controlled object, a state amount from the controlled object, a first disturbance signal with respect to the virtual controlled object, and a second disturbance signal with respect to the controlled object. The calculated control input and the calculated virtual control input are input to the virtual controlled object and the controlled object, respectively.

6 Claims, 33 Drawing Sheets

5,459,381

COMPOSITE SYSTEM COURSE CONTROL METHOD AND APPARATUS

BACKGROUND OF THE INVENTION

1. Field of the Invention

The present invention relates to a course control method for a composite system constituted by a plurality of control systems for generating control inputs for causing controlled objects to follow up desired target values (courses).

2. Related Background Art

A course control method of this type has been applied to various numerical control apparatuses and the like. For example, in machine tools, the above-mentioned course control method is used for position/course control.

FIG. 31 is a block diagram showing a position control system model for a machine tool. Such a control system is arranged for each axis to constitute a composite control system such as the one shown in FIG. 32.

Referring to FIG. 31, a position command value generation means 1 inputs a target value (course) to a control means 2. A controlled object 3 feeds back a controlled amount corresponding to a control input, supplied from the control means 2, to another system or the control means 2. The control means 2 has gains Wo and Wc/K and a transfer coefficient Wa/s. The controlled object 3 has transfer coefficients K/S and 1/S.

Referring to FIG. 32, position command value generation means 1a and 1b are arranged for the respective axes to input target values to control means 2a and 2b for the respective axes. Controlled objects 3a and 3b for the respective axes feed back controlled amounts corresponding to control inputs, supplied from the control means 2a and 2b, to other systems or the control means 2a and 2b.

As described above, in a conventional machine tool, provided that a circular trace is to be drawn with reference to two axes, each position control system is constituted by the position command value generation means 1, the controlled object 3, and the control means 2. Each position command value generation means 1 outputs a target position/course command signal. The controlled object has a drive means to physically move. Each control means 2 receives a position command value for each axis component from the position signal generation means 1 and a state amount representing the state of the controlled object 3 and outputs a control input to the controlled object 3 constituted by the corresponding drive means.

When, therefore, position command values for the respective axis components are output from the position command value generation means 1a and 1b, the corresponding controlled objects are simultaneously position-controlled by the control means 2a and 2b for the respective axes, thereby drawing a circular trace. As shown in FIG. 31, the position control system for each axis is a control system having a position control loop having a relatively low gain and a velocity control loop located inside the position control loop and having a relatively high gain. This control system is characterized in that high rigidity can be set against disturbances owing to the high gain of the velocity control loop, and a response without excessive impact on a mechanical system can be easily obtained owing to the low gain of the position control loop. Furthermore, by providing integration characteristics for a compensator of the velocity control loop, the rigidity against disturbances can be greatly increased, thereby eliminating positional errors with respect to stepwise torque disturbances.

FIG. 33 is a block diagram showing a position control system model of a conventional numerical control apparatus.

Referring to FIG. 33, a target value generation means 11 outputs target positions 12a and 12b associated with the respective control axes to control means 13a and 13b. Controlled objects 14a and 14b corresponding to the respective axes output controlled amounts 15a and 15b based on control inputs from the control means 13a and 13b. In addition, referring to FIG. 33, a position control system and a velocity control system have loop gains Wo and Wc, respectively, and a constant K is determined by the inertia of a drive system and the gain of a driver.

First, the target value generation means 11 calculates target positions corresponding to the respective control axes in accordance with a target course and a target velocity. Position control systems for the respective axes are then formed to follow up the target values, and are independently controlled for the respective axes. When the synchronous relationship between course command values for the respective axes, supplied as target values, are accurately maintained, and the control feed amounts of the respective axes are sufficiently small in a follow-up operation, target course control can be performed by this method.

FIG. 34 is a schematic view showing an axial feed control system of a conventional position control apparatus.

Referring to FIG. 34, a position 32 of the X axis indicates the distance between the centrobaric position of an X axis movable member 35 and an external reference point 31, and a position 33 of the Y axis indicates the distance between the centrobaric position of a Y axis movable member 36 and the centrobaric position of the X axis. A position 3 of the Z axis indicates the distance between the centrobaric position of the Y axis movable member 36 and the external reference position 31. Control inputs are thrusts 37 and 38 acting on the X and Y axis movable members 35 and 36 in the horizontal direction. In practice, the thrusts 37 and 38 are obtained by supplying power to linear motors or the like.

It is an object of the positioning apparatus for controlling such a composite system to cause the Z axis to reach a target position as soon as possible with limited power and quickly eliminate the influence of disturbances on the Z axis when the disturbances act on the system.

FIG. 35 is a block diagram showing a control arrangement in the axial feed control system of the position control apparatus shown FIG. 34. The operation of the arrangement will be described below.

When a target value generation means 41 outputs a target value signal 42 as a position target value for the Z axis, a coarse feed X axis 52a starts to move, and a position (X axis controlled amount) 50a as a controlled amount moves close to the target value. In this case, when a positional error (X axis error signal) 44 becomes smaller than a set value, a determination means 43 supplies the current positional error 44, as a position command value (Y axis target value), to a Y axis 52b. If the positional error 44 is larger than the set value, the position command value 45 to the Y axis becomes "0". The Y axis moves to coincide with the position command value 45. As a result, a Z axis controlled amount 54 as the sum of the X axis controlled amount 50a and a Y axis controlled amount 50b coincides with the position target value 42 for the Z axis.

In a controller 55, the following are set: a Y axis error signal 46, an X axis compensator 47a, a Y axis compensator 47b, an X axis control input 48a, a Y axis control input 48b, an X axis controlled object 49a, a Y axis controlled object 49b, a controlled amount 50b, an X axis velocity 51a, and a Y axis velocity 51b.

Although the adder (determination means) 43 exists conceptually but does not exist in the actual control system. The controller 55 has gains Wo1, Wo2, M1, and M2 and transfer functions K1/S, K2/S, and 1/S.

FIG. 36 shows the response characteristics of the axial feed control system of the position control apparatus shown in FIG. 35. Referring to FIG. 36, the abscissa indicates time (msec); and the ordinate, target values. Note that the target value for the Z axis changes in the form of a ramp, and the final value is "10".

As shown in FIG. 36, when the determination means 43 is set such that the Y axis starts to move when the positional error becomes 0.21, it takes about 36 (msec) for the Z axis to reach 0.2% of the target value. The maximum accelerations required for the movement in this case are 1,834 (rad/sec$^2$) for the X axis and 1,284 (rad/sec$^2$) for the Y axis. The maximum accelerations are substantially proportional to the power required to move the axes. Since the power which can be normally used is limited, the accelerations must be minimized. In addition, since a vibration produced by a mechanical system is proportional to an acceleration, the maximum accelerations must be minimized.

In the above-described position control method, however, the following problems are posed. ① The method is based on the assumption that the response speeds of the respective axes are completely the same. ② In order to increase the course precision, the gain of the position control loop must be set to be high. ③ In order to obtain high rigidity against disturbances, the gain of the velocity control loop must be set to be high.

These problems posed in the conventional position control method when course control of a position control system is performed by using two axes, i.e., the X and Y axes, will be described in detail below with reference to an X-Y plotter with two orthogonal axes and the like.

In order to draw a circle on a plane defined by two straight axes, i.e., the X and Y axes, for example, a sine (sin) wave and a cosine (cos) wave are given, as position target values, to the X and Y axes. An accurate circle can be drawn by causing the X and Y axes to perfectly follow up these target values.

FIG. 37 is a chart showing traces drawn by an X-Y plotter with two orthogonal axes to which the conventional position control method is applied.

As shown in FIG. 37, a trace C0 is a target circular trace. In the conventional method, the response speeds of the X and Y axes are set to be the same value. When the position control loop gains for the X and Y axes are set to be the same, as described above, a trace C1 is obtained. The trace C1 becomes a circular trace, although it has a radius smaller than that of the target circle except at the start and end points. In order to examine the problem ①, the position control loop gains of the X and Y axes are set to be different values to perform course control upon changing the response speeds of the X and Y axes. In this case, a trace C2 is obtained. As is apparent, the trace C2 does not coincide with the target circle but becomes an ellipse. It is understood from this example why the X and Y axes need to have the same response speed.

The relationship between the course precision and the gain of the position control loop, which corresponds to the problem ②, will be examined below. Assume that the X and Y axes have the same response speed. In this case, the trace C1 is obtained, which is a follow-up trace corresponding to a target course set when the response speeds of the X and Y axes are the same. In this example, the follow-up trace also causes an error with respect to the target circle. In this case, if the course error between the target circular course and the follow-up trace in a normal state is represented by a radius reduction amount dR, $dR=Vo^2/2RWo^2$ (where Vo is the velocity, R is the radius, and Wo is the position loop gain). Therefore, when a circle is to be drawn upon setting a circle defined by the velocity Vo and the radius R as a target trace, the course error is reduced in inverse proportion to the square of the position loop gain Wo. In other words, in order to draw a circle with high precision, a gain Wc of the velocity control loop inside the position control loop must be set to be high.

In general, however, when the gain of the velocity control loop is set to be high, vibration of the mechanical system is caused. For this reason, the gain cannot be set to be higher than a given value. Therefore, it is difficult to set a high position loop gain, and it is more difficult to make the precision of a trace fall within a target course error as the velocity of a target circular trace is increased and the radius of the circle is decreased.

The problem ② will be examined next with reference to FIG. 38.

FIG. 38 is a chart showing traces drawn by an X-Y plotter with two orthogonal axes to which the conventional position control method is applied, when disturbances are applied.

Referring to FIG. 38, a trace C0 is a target circular trace, and a trace C1 is a trace drawn when no disturbances are present. A trace C2 is a response trace obtained when a stepwise acceleration disturbance is applied to the X axis while a circle is drawn. As indicated by the trace C2, when disturbances are applied to a controlled object, the course error is increased. A trace C3 is a response trace obtained when the gain of the velocity control loop of the same system is doubled. In this case, the course error with respect to the same acceleration disturbance is smaller than that of the trace C2, indicating that an increase in velocity loop gain leads to the suppression of disturbances.

As has been described above, however, the gain of the velocity control loop is limited because an increase in gain causes vibration of the mechanical system. In addition, as the gain of the velocity control loop is increased, the acceleration required to suppress disturbances increases. Therefore, it is very difficult to perform course control with high precision while suppressing the influence of disturbances.

In order to perform course control with higher precision by the control method in the numerical control apparatus shown in FIG. 33, the loop gain of the position control system needs to be increased or a feed forward control system needs to be formed to improve the follow-up characteristics of a servo system. If, however, the follow-up characteristics of the servo system are improved, the following new problems are posed. That is, the capacity of a motor driver is increased, and high-frequency vibration is caused in a mechanical system, resulting in a deterioration in positional precision.

For this reason, an increase in precision must be realized without using large accelerations, and hence high-speed, high-precision course control needs to be performed by properly accelerating/decelerating the apparatus without using an excessive torque. When a simple straight light or curve is to be drawn, only a simple calculation is required, and it is relatively easy to properly increase/decrease a target value. However, it is difficult to properly increase/decrease a target value and perform high-speed, high-precision course control when a free curve, a straight line, and a curve are connected to each other complicatedly. In this case, in properly accelerating/decelerating the apparatus, it is important to reduce not only the maximum accelerations but also vibration components included in the acceleration components.

If a satisfactory response speed cannot be obtained in the two-axis control system shown in FIG. 36, the gains (Wo1, Wo2, M1, and M2) of the control system shown in FIG. 35 must be increased to increase the response speed and improve the rigidity. However, with an increase in gain, the maximum accelerations required for movement increase, requiring large power. In addition, when the gains are set to be high, the frequency band of the control system is expanded, causing vibration of the mechanical system. As a result, the convergence characteristics with respect to a target value may deteriorate. Furthermore, this arrangement requires a switching operation near a positional error determination value. Under certain conditions, this switching may cause self-excited oscillation. In this case, the convergence characteristics with respect to a target value deteriorate.

In conventional control apparatuses, such as a position control apparatus, a velocity control apparatus, and a temperature control apparatus, a plurality of controlled objects to be simultaneously controlled are present in a composite state. Various types of control operations are performed to cause such a composite control system to reach a target value at a high speed with limited power. For example, a position control apparatus has a control system for a composite system such as the one shown in FIG. 45, in which the first axis for coarse feed and the second axis for fine feed are respectively defined as the X and Y axes, and the Z axis is an axis indicating a position where the X and Y axes are synthesized. Control in such a position control apparatus will be described below.

FIG. 45 is a schematic view showing an axis feed control system of a conventional position control apparatus.

Referring to FIG. 45, a position 2 of the X axis indicates the distance between the centrobaric position of an X axis movable member 5 and an external reference point 1, and a position 3 of the Y axis indicates the distance between the centrobaric position of a Y axis movable member 6 and the centrobaric position of the X axis. A position 4 of the Z axis indicates the distance between the centrobaric position of the Y axis movable member 6 and the external reference point 1. In addition, control inputs are thrusts 7 and 8 acting on the X and Y movable members 5 and 6 in the horizontal direction. In practice, the thrusts 7 and 8 are obtained by supplying power to linear motors or the like.

It is an object of the positioning apparatus for controlling such a composite system to cause the Z axis to reach a target position as soon as possible with limited power and quickly eliminate the influence of disturbances on the Z axis when the disturbances act on the system.

FIG. 46 is a block diagram showing the first control arrangement in the axial feed control system of the position control apparatus shown in FIG. 45. The operation of the arrangement will be described below.

Upon reception of a target value signal 12, as a position target value for the Z axis, from a target value generation means 11, an X axis 22a for coarse feed starts to move, and a position (X axis controlled amount) 20a as a controlled amount moves close to the target value. In this case, when a positional error (X axis error signal) 14 becomes smaller than a given set value, a determination means 13 supplies the current positional error 14, as a position command value (Y axis target value) 15, to a Y axis 22b. When the positional error 14 is larger than the set value, the position command value 15 to the Y axis becomes "0". The Y axis 22b moves in accordance with the position command value 15. As a result, a Z axis controlled amount 24 as the sum of an X axis controlled amount 20a and a Y axis controlled amount 20b coincides with the position target value 12 associated with the Z axis.

In a controller 25, the following are set: a Y axis error signal 16, an X axis compensator 17a, a Y axis compensator 17b, an X axis control input 18a, a Y axis control input 18b, an X axis controlled object 19a, a Y axis controlled object 19b, a Y axis controlled amount 20b, an X axis velocity 21a, and a Y axis velocity 21b.

Although the adder 13 (determination means) exists conceptually but does not exist in the actual control system. The controller 25 has gains Wo1, Wo2, M1, and M2 and transfer functions K1/S, K2/S, and 1/S.

FIGS. 47 and 48 show the response characteristics of the axial feed control system of the position control apparatus shown in FIG. 46. Referring to FIGS. 47 and 48, the abscissa indicates time (msec); and the ordinate, target values. Note that these graphs respectively correspond to cases where target values associated with the Z axis are set to be "1" and "10".

As shown in FIG. 47, if the determination means 13 is set such that the Y axis starts to move when the positional error becomes 0.01, it takes about 30 (msec) for the Z axis to reach 0.1% of the target value. In this case, the maximum accelerations required for the movement are 1,600 (rad/sec$^2$) for the X axis and 1,870 (rad/sec$^2$) for the Y axis. The maximum accelerations are substantially proportional to the power required to move the axes. Since the power which can be normally used is limited, the accelerations must be minimized. In addition, since a vibration produced by a mechanical system is proportional to an acceleration, the maximum accelerations must be minimized. Furthermore, this arrangement requires a switching operation near a positional error determination value. Under certain conditions, this switching may cause self-excited oscillation. In this case, the convergence characteristics with respect to a target value deteriorate.

As shown in FIG. 48, if the determination means 13 is set such that the Y axis starts to move when the positional error becomes 0.21, it takes about 30 (msec) for the Z axis to reach 0.1% of the target value. In this case, the maximum accelerations required for the movement are 2,300 (rad/sec$^2$) for the X axis and the 2,500 (rad/sec$^2$) for the Y axis.

The behavior of the control system against disturbances will be described below with reference to FIGS. 49 and 50.

FIG. 49 is a block diagram showing the second control arrangement in the axial feed control system of the position control apparatus shown in FIG. 45. The same reference numerals in FIG. 49 denote the same parts as in FIG. 46.

Referring to FIG. 49, disturbances 26a and 26b are respectively applied to the X and Y axes.

FIG. 50 is a graph showing the behavior of the axial feed control system of the position control apparatus shown in FIG. 46 against the disturbances. Referring to FIG. 50, the abscissa indicates time (sec); and the ordinate, target values. Note that this graph corresponds to a case where a target value associated with the Z axis is set to be "10".

When, for example, any force is applied, as the disturbance 26a, to an X axis 22a, the velocity and position of the X axis 22a as a controlled object deviate from a target position and a target velocity owing to the disturbance 26a, thus causing a deviation. In this case, the control system operates in the same manner as in the case where a deviation is caused when a target value is applied. More specifically, an X axis compensator 17a generates a thrust to reduce this deviation to "0", thus moving the X axis 22a. When the positional error of the X axis 22a becomes smaller than a set value in a determination means 13, the Y axis starts to move, thus quickly reducing the deviation caused by the disturbance to "0". As shown in FIG. 50, for example, when the stepwise disturbance 26a is applied to the X axis 22a, the X axis 22a operates to reduce the positional error to "0" by itself at first. At time 0.175 (sec), a stepwise disturbance is applied to the X axis, and the X axis operates to reduce the positional error to "0" by itself at first. At around time 0.3 (sec), the positional error becomes smaller than the set value in the determination means 13, and the X axis starts to move.

Since control of the conventional composite system is performed in the above-described manner, if the satisfactory response speed, rigidity, and the like cannot be obtained with the response characteristics shown in FIG. 47, the gains Wo1, Wo2, M1, and M2 of the control system are increased to obtain a satisfactory response speed, rigidity, and the like. If, however, the above-mentioned gains Wo1, Wo2, M1, and M2 are increased, the frequency band of the control system is expanded to cause vibration of the mechanical system, resulting in a deterioration in convergence characteristics with respect to a target value. In addition, this arrangement requires a switching operation near a positional error determination value. Under certain conditions, this switching may cause self-excited oscillation, causing a deterioration in convergence characteristics with respect to a set target value. It is, therefore, difficult to increase the response speed and improve rigidity in control of the composite system.

In addition, if the satisfactory response speed and rigidity cannot be obtained with the response characteristics with respect to the disturbance shown in FIG. 49, the gains Wo1, Wo2, M1, and M2 of the control system are increased to obtain a satisfactory response speed, rigidity, and the like. If, however, the gains Wo1, Wo2, M1, and M2 are increased, the maximum accelerations required for the movement are increased, requiring large power. Furthermore, similar to the above-described case, if the gains are increased, vibration of the mechanical system is caused, and convergence characteristics with respect to a target value deteriorate. It is, therefore, difficult to increase the response speed and improve rigidity with respect to disturbances in control of the composite system.

SUMMARY OF THE INVENTION

The present invention has been made to solve the above problems, and has its object to provide a composite system course control method and apparatus which can perform high-speed, high-precision course control without increasing the gain of each control system by calculating/outputting control inputs for minimizing a predetermined evaluation function while causing target values set for reality axes as controlled objects, state amounts from the respective controlled objects, and disturbances to interfere with a target value set for a virtual axis as a virtual controlled object, a state amount from the virtual controlled object, and disturbances.

According to the present invention, there is provided a composite system course control method comprising the steps of producing a target value for moving a controlled object as a reality axis by a desired amount and a virtual target value for moving a virtual controlled object as a virtual axis based on the reality axis, calculating a control input and a virtual control input which optimize a predetermined first evaluation function upon receiving the produced virtual target value, the produced target value, a virtual state amount from the virtual controlled object, a state amount from the controlled object, a first disturbance signal with respect to the virtual controlled object, and a second disturbance signal with respect to the controlled object, and outputting the calculated control input and the calculated virtual control input to the virtual controlled object and the controlled object, respectively.

According to the present invention, there is provided a composite system course control apparatus comprising target value production means for producing a target value for moving a controlled object as a reality axis by a desired amount, virtual target value production means for producing a virtual target value for moving a virtual controlled object as a virtual axis based on the reality axis, and control means for calculating a control input and a virtual control input which optimize a predetermined first evaluation function upon receiving the produced virtual target value, the produced target value, a virtual state amount from the virtual controlled object, a state amount from the controlled object, a first disturbance signal with respect to the virtual controlled object, and a second disturbance signal with respect to the controlled object, and for outputting the calculated control input and the calculated virtual control input to the virtual controlled object and the controlled object, respectively.

In addition, there is provided a composite system course control apparatus comprising target value production means for producing target values for moving a plurality of controlled objects by desired amounts, and control means for calculating control inputs for optimizing a predetermined second evaluation function upon receiving the target values, state amounts from the controlled objects, and disturbance signals with respect to the controlled objects, and for outputting the control inputs to the controlled objects.

The first evaluation function includes a first or second weighting function component for evaluating a course error.

The second evaluation function includes a first or second weighting function component for evaluating a course error.

Furthermore, there is provided a composite system course control apparatus comprising target value production means for producing target values for moving a plurality of controlled objects by desired amounts, target value conversion means for converting the target values produced by the target value production means into new target values, and control means for calculating control inputs for optimizing a predetermined second evaluation function upon receiving the converted target values output from the target value conversion means, state amounts from the controlled objects, and disturbance signals with respect to the controlled objects, and for outputting the control inputs to the controlled objects.

According to the composite system course control method of the present invention, a target value for moving a controlled object as a reality axis by a desired amount is produced. In addition, a virtual target value for moving a virtual controlled object as a virtual axis based on the reality axis is produced. A control input and a virtual control input which optimize the predetermined first evaluation function are calculated upon reception of the produced virtual target value, the produced target value, a virtual state amount from the virtual controlled object, a state amount from the controlled object, a first disturbance signal with respect to the virtual controlled object, and a second disturbance signal with respect to the controlled object. The calculated control input and the calculated virtual control input are then output to the virtual controlled object and the controlled object, respectively. With this operation, the course error can be minimized without changing the maximum accelerations with respect to disturbances.

According to the composite system course control apparatus of the present invention, when the target value production means produces a target value for moving a controlled object as a reality axis by a desired amount, and the virtual target value production means produces a virtual target value for moving a virtual controlled object as a virtual axis based on the reality axis, the control means then calculates a control input and a virtual control input which optimize the predetermined first evaluation function upon receiving the produced virtual target value, the produced target value, a virtual state amount from the virtual controlled object, a state amount from the controlled object, a first disturbance signal with respect to the virtual controlled object, and a second disturbance signal with respect to the controlled object. The control means outputs the calculated control input and the calculated virtual control input to the virtual controlled object and the controlled object, respectively. With this operation, control inputs for minimizing the course error can be output without changing the maximum accelerations with respect to disturbances.

In addition, when the target value production means produces target values for moving a plurality of controlled objects by desired amounts, the control means calculates control inputs for optimizing the predetermined second evaluation function upon receiving the target values, state amounts from the controlled objects, and disturbance signals with respect to the controlled objects, and outputs the control inputs to the controlled objects. With this operation, control inputs for minimizing the course error can be output.

Since the first evaluation function includes the first or second weighting function component for evaluating a course error, a follow-up operation with respect to target values can be performed without increasing the accelerations.

When the target value production means produces target values for moving a plurality of controlled objects by desired amounts, the target value conversion means converts the target values produced by the target value production means into new target values, and outputs the new target values to the control means. The control means calculates control inputs for optimizing a predetermined second evaluation function upon receiving the converted target values output from the target value conversion means, state amounts from the controlled objects, and disturbances with respect to the controlled objects. The control means then outputs the control inputs to the controlled objects. With this operation, the course error can be minimized without increasing the accelerations.

When the target value production means produces target values for moving a plurality of controlled objects by desired amounts, the target value conversion means converts the target values produced by the target value production means into new target values, and outputs the new target values to the control means. The control means calculates control inputs for optimizing a predetermined second evaluation function upon receiving the converted target values output from the target value conversion means, state amounts from the controlled objects, and disturbance signals with respect to the controlled objects. The control means then outputs the control inputs to the controlled objects. With this operation, the course error can be minimized without increasing the accelerations.

The present invention has been made to solve the above-described problems, and has as its object to provide a control apparatus for a composite control system, which determines control inputs to be input to controlled objects while causing errors between controlled amounts obtained from the respective control systems and target values to interfere with each other, thereby greatly improving the response characteristics with respect to the overall controlled amount as the sum of the controlled amounts of the respective controlled objects of the composite system, and causing stationary errors by disturbance application to quickly converge.

According to the present invention, there is provided a control apparatus for a composite control system, comprising target value production means for producing desired target value signals on the basis of target value, a plurality of addition means for respectively adding controlled amounts from controlled objects of control systems and the target value signals and outputting error signals for the respective control systems, and compensation means for compensating/calculating control inputs for optimizing a first evaluation function upon receiving the error signals output from the addition means and the controlled amounts output from the respective controlled objects, the control inputs being output to the respective controlled objects.

In addition, there is provided a control apparatus for a composite control system, comprising target value production means for producing desired target value signals on the basis of target values, a plurality of addition means for respectively adding controlled amounts from controlled objects of control systems and the target value signals and outputting error signals for the respective control systems, and compensation means for compensating/calculating control inputs for optimizing a second evaluation function upon receiving the error signals output from the addition means, the controlled amounts output from the controlled objects, and either or both of disturbances applied to the respective controlled objects.

Furthermore, the compensation means calculates and outputs a control input for compensating characteristics of each controlled object on the basis of an integral value of the error signal from each of said addition means or a value obtained by multiplying the integral value by a predetermined weight.

According to the present invention, when the respective addition means add controlled amounts from the controlled objects of the respective control systems and target value signals and output error signals for the respective control systems to the compensation means, the compensation means compensates/calculates and outputs control inputs for optimizing the first evaluation function to the respective controlled objects, while causing the error signals output from the addition means and the controlled amounts output from the controlled objects to interfere with each other. With this operation, the response speed with respect to controlled amount of a composite purpose can be increased without increasing the gain of each control system.

In addition, when the respective addition means add controlled amounts from the respective controlled objects and target value signals and output error signals for the respective control systems to the compensation means, the compensation means calculates control inputs for optimizing the second evaluation function and outputs them to the respective controlled objects, while causing the error signals output from the addition means, the controlled amounts output from the controlled objects, and either or both of the disturbances applied to the controlled objects to interfere with each other. With this operation, stationary errors caused by disturbances acting on the target composite controlled amount can be caused to converge at a high speed.

Furthermore, the compensation means calculates and outputs control inputs for compensating the characteristics of the respective controlled objects on the basis of the integral values of error signals from the respective addition means or values obtained by multiplying the integral values by predetermined weights. Therefore, stationary errors caused by stepwise disturbances can be quickly eliminated.

DETAILED DESCRIPTION OF THE PREFERRED EMBODIMENTS

First Embodiment

Figure 1:
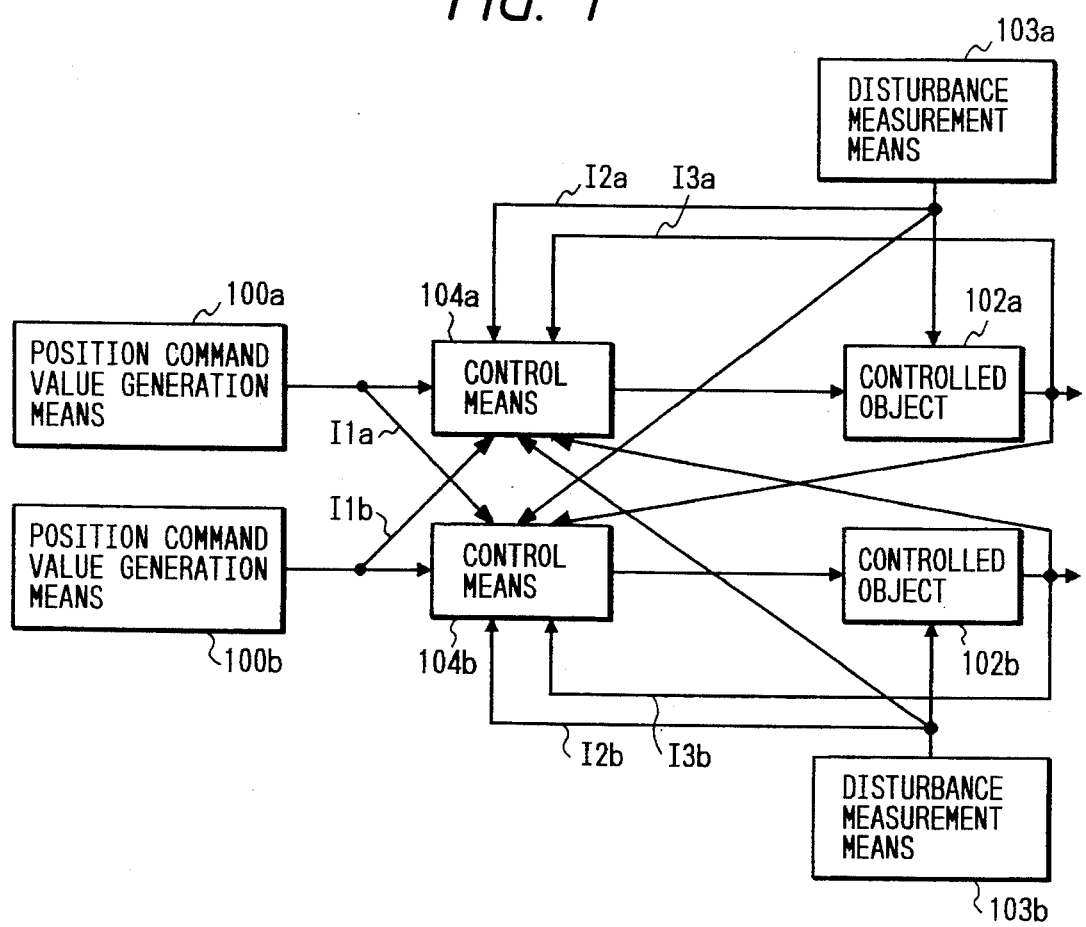
FIG. 1 is block diagram for explaining the arrangement of a composite system course control apparatus according to the first embodiment of the present invention.

FIG. 1 is a block diagram for explaining the arrangement of a composite system course control apparatus according to an embodiment of the present invention.

Referring to FIG. 1, position command value generation means 100a and 100b respectively output target values associated with the respective axes to control means 104a and 104b for the respective axes. The control means 104a and 104b, each having a CPU, a ROM, and a RAM (none of which are shown), respectively calculate control means 104a and 104b for minimizing an evaluation function $J_{(k)}$ defined by equation (1) by using an evaluation function obtained by integrating the evaluation function $J_{(k)}$ by a finite time in a quadratic form, on the basis of inputs I1a, I2a, I3a, I1b, I2b, and I3b. The control means 104a and 104b then output the control inputs 104a and 104b to controlled objects 102a and 102b, respectively. Note that in order to minimize the evaluation function represented by equation (1) in a quadratic form, the above-mentioned control means perform calculation by a DP (dynamic programming) method.

Figure 51:
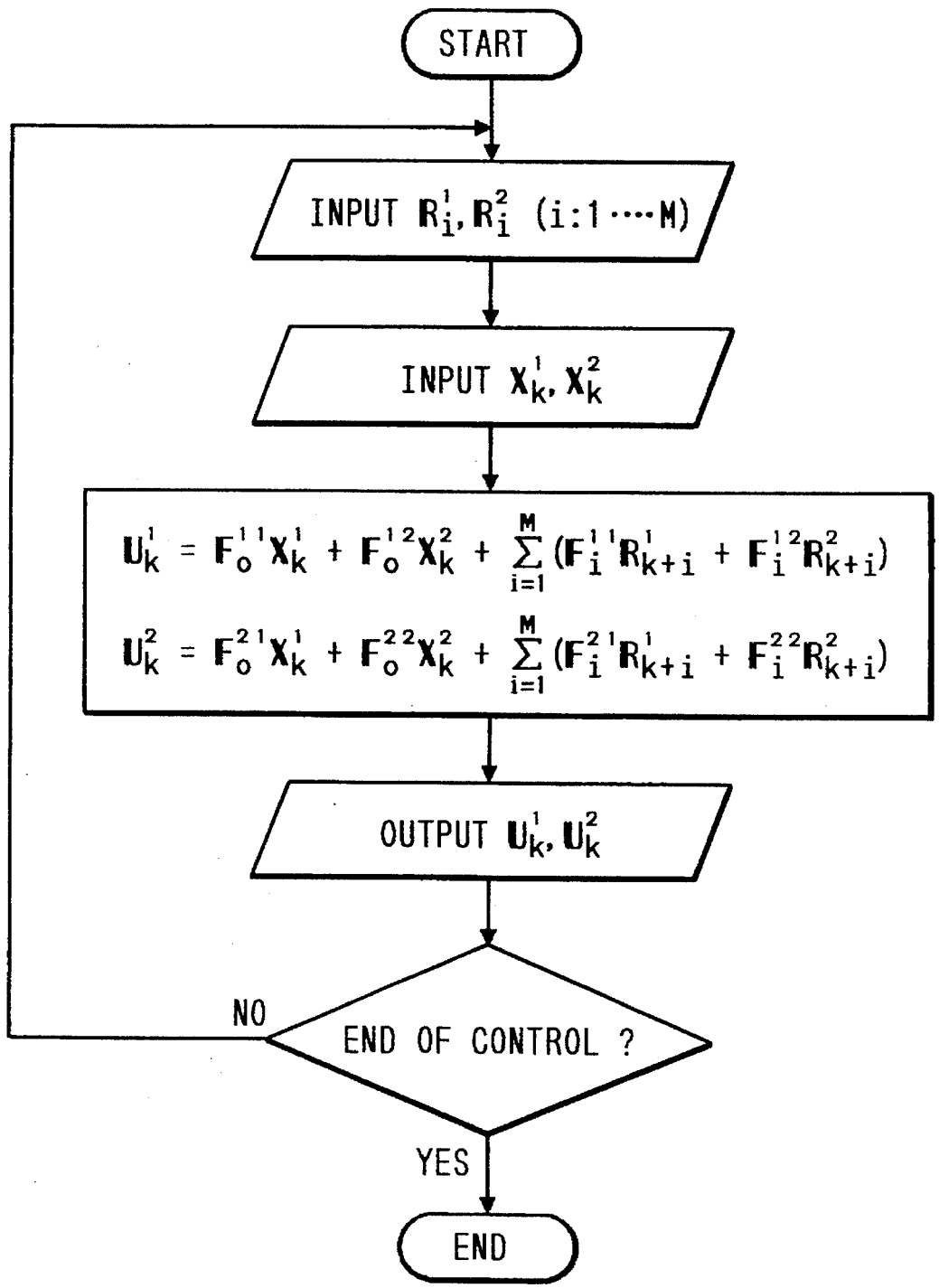
FIG. 51 is a flow chart showing processing in the control means (104a, 140b) shown in FIG. 1, in which a suffix at the upper right position of each symbol indicates the first or second axis, and a suffix at the lower right position of each symbol indicates a sampling timing.

By executing processing based on FIG. 51 on the basis of values obtained from the above-mentioned evaluation function and the like, control is performed as follows:

$$F_0 X_k + F_1 R_{k+1} + \sum_{i=2}^{M} F_i R_{k+1} \tag{1}$$
$$F_0 = -B_M G^T S_{M-1} \phi$$
$$F_1 = B_M G^T C^T Q_{k+1}$$

$$F_i = B_M G^T P_M^T +_{1-i} \cdots P^{TM-1} C^T Q_{k+1}$$
$$B_{M-j} = [G^T S_{M-j-1} G + H_{k+j}]^{-1}$$
$$P_{M-j} = [I - G B_{M-j} G^T S_{M-j-1}] \phi$$

$$S_{M-j} = \phi^T S_{M-j-1} P_{M-j} + C^T Q_{k+j} C$$
$$S_0 = C^T Q_{k+M} C$$

$$J_{(k)} = \sum_{i=k}^{i=k+M} \{(R_{(i)} - y_{(i)})^T Q_{(i)} (R_{(i)} - y_{(i)} + U_{(i)}^T H_{(i)} U_{(i)})\}$$

where R is the target value vector, y (=CX) is the output vector indicating an X state vector, U is the control input vector, k is time, M is the integration time, and Q and H are weighting functions.

Each of the weighting functions Q and X includes either $|e|^2 * |\Delta R|^2 - (e, \Delta R)^2$ or $|e|^2 * |\Delta y|^2 - (e, \Delta y)^2$, (where R is the target value (course) vector, y is the follow-up course vector, e (=R−Y) is the course error vector, $\Delta y$ is the follow-up course velocity vector, and $\Delta R$ is the target value velocity vector), or an element term mathematically equivalent thereto. Assume that the characteristics of the controlled objects 102a and 102b are represented by equation (2):

$$X_{(k+1)} = A_{(k)} X_{(k)} + B_{(k)} U_{(k)} + D_{(k)} W_{(k)} \tag{2}$$

where X is the state vector, U is the control input vector, and W is the disturbance vector. Assume that the state vector X, the control input vector U, and the disturbance vector W are determined as follows:

X=AX+BU+DW

X=(X1, X2, X3, X4, X5, X6)

X1: X axis position X2: X axis velocity

X3: Y axis position X4: Y axis velocity

X5: Z axis position X6: Z axis velocity u=(u1, u2, u3)

U1: X axis control input U2: Y axis control input

U3: Z axis control input

W=(W1, W2, W3)

W1: X axis disturbance input W2: Y axis disturbance input W3: Z axis disturbance input In this case, the X and Y axes are control axes which exist in reality, whereas the Z axis is a virtual control axis which does not exist in reality.

Assume that a target value for the Z axis is the position of "0" at a start point and moves to a certain position at a constant velocity, and target values for the X and Y axes start to move therefrom. The position of the Z axis is held while the target values for the X and Y axes move. The Z axis returns to the position of "0" at the same velocity as that in the starting operation when the target values for the X and Y axes stop. In addition, assume that the disturbance acting on the X axis can be measured in advance.

Note that the evaluation function defined by equation (1) can be represented as equation (3) in the form of time integration of a finite time interval between the current time and finite future time, as follows:

$$J_{(t)} = \int_{t}^{t+t_M} \{(R_{(\tau)} - y_{(\tau)})^T Q_{(\tau)} (R_{(\tau)} - y_{(\tau)}) + U_{(\tau)}^T H_{(\tau)} V_{(t)}\} d\tau \qquad (3)$$

where R is the target value vector, y (=CX) is the output vector, X is the state vector, U is the control input vector, t is time, $t_M$ is the integration time, and Q and H are the weight functions.

A state of a course error in a case where circular traces are drawn by using the composite system course control apparatus shown in FIG. 1 will be described below with reference to FIG. 2.

Figure 2:
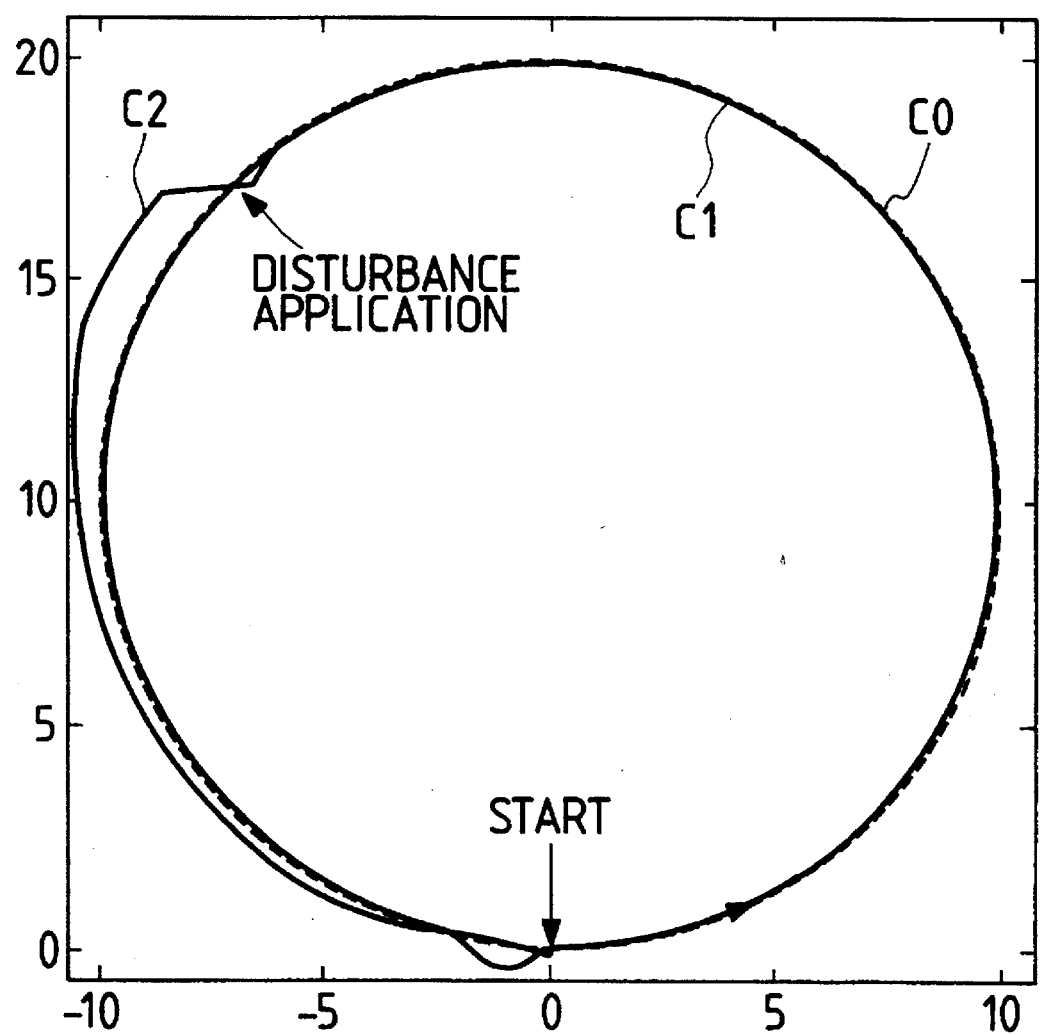
FIG. 2 is a chart showing traces drawn by the course control apparatus in FIG. 1.

FIG. 2 shows traces drawn by an X-Y plotter with two orthogonal axes to which the course control apparatus shown in FIG. 1 is applied. In order to show an improved state of a course error, FIG. 2 is caused to correspond to a state where the error is increased 10 times in the radial direction.

Referring to FIG. 2, a trace C0 is a target circular trace, a trace C1 is drawn in the absence of disturbances, and a trace C2 is drawn when a stepwise disturbance is applied. For comparison with the prior art, in the case shown in FIG. 2, the same target position commands as those in the case shown in FIG. 38 are given to the X and Y axes, and the same disturbance as that in the case shown in FIG. 38 is applied to the X axis.

Figure 38:
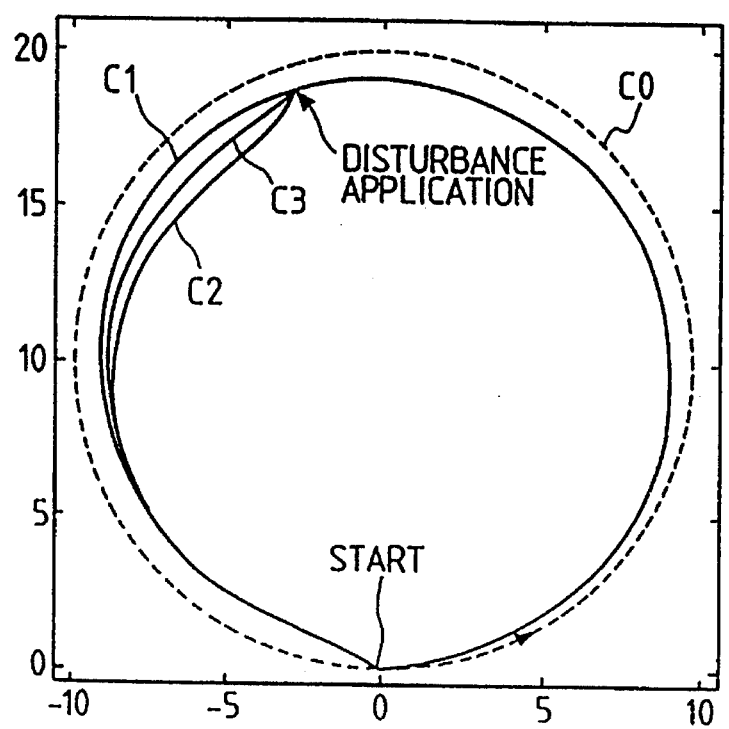
FIG. 38 is a chart showing traces drawn by the X-Y plotter with two orthogonal axes to which a conventional position control method is applied, at the time of disturbance appli

In addition, in this embodiment, parameters are selected such that when the same acceleration disturbance as that in FIG. 38 is applied, the same maximum accelerations as those in the prior art are used to suppress the disturbance. In this case, with the same maximum accelerations, the radius error with respect to the same disturbance is reduced to about 1/10 that in the prior art. That is, an increase in precision can be achieved. In this case, setting of the same maximum accelerations means that the power consumption of the driver of each motor is the same as that in the prior art, provided that disturbances, friction, and the like are neglected. Therefore, by the control method of the embodiment, better follow-up characteristics with respect to a target value and better rigidity against disturbances can be obtained, while course control can be performed at a higher speed and with higher precision by the drivers having the same capacities as those in the prior art. In addition, accelerations cause vibration of the mechanical system. With the same maximum accelerations, the control method of the embodiment can perform course control at a higher speed with higher precision than the conventional method having the vibration of the mechanical system. The weighting function Q in the evaluation function defined by equation (1) is a function of the magnitude of the target value vector R, but the weighting function H is a constant value. Note that the weighting function H may also be a function of the magnitude of the target value vector R in accordance with the purpose of control.

The above-described embodiment is based on the assumption that disturbances can be measured in advance. However, a simpler control arrangement can be realized by using a disturbance signal predicted from, e.g., a course target value and a controlled object model. For example, in a machine tool, nonlinear friction caused when the machine moved in a reverse direction can be predicted from a controlled object model and a target command value. By using this friction as a disturbance signal, the present invention can be easily applied to the machine tool. Furthermore, in order to measure a disturbance signal, a detector for measuring a disturbance signal may be arranged independently of a state amount detector.

Figure 3:
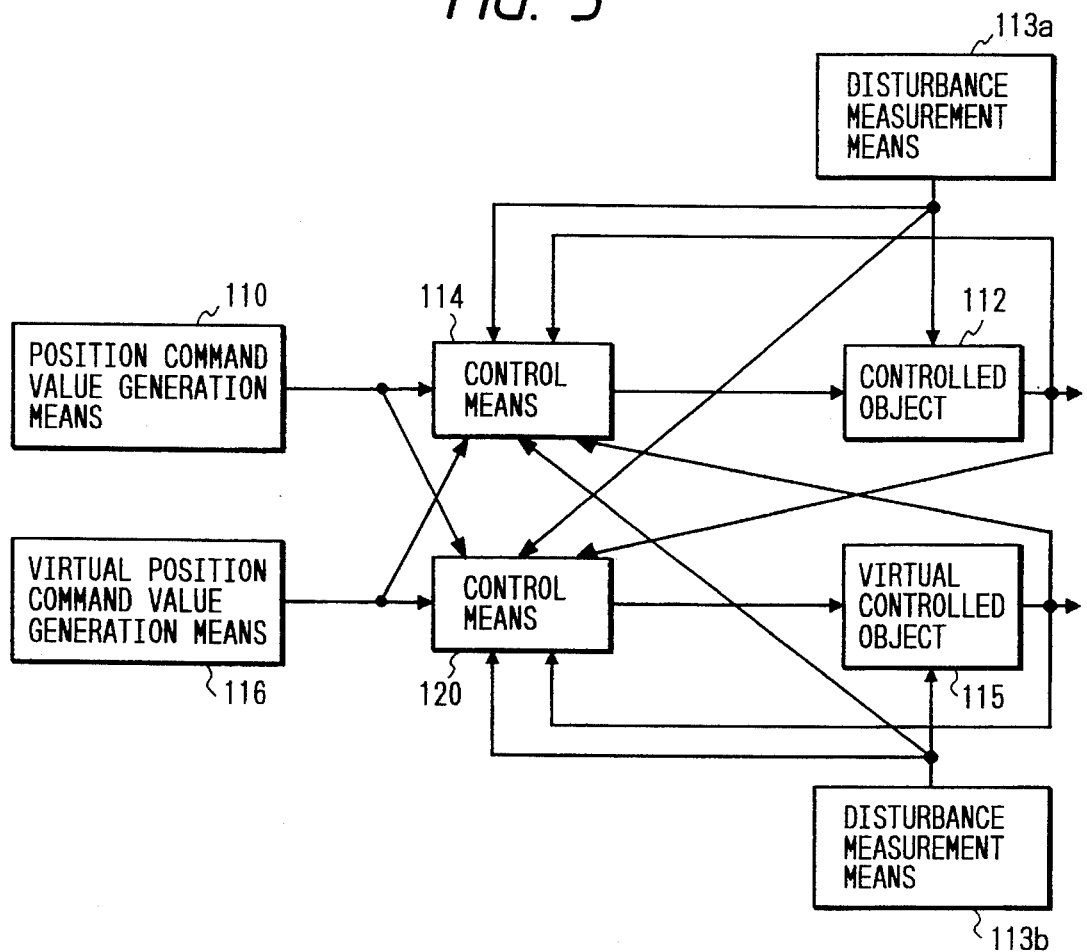
FIG. 3 is a block diagram showing another arrangement of the composite system course control apparatus shown in FIG. 1.

FIG. 3 is a block diagram for explaining another arrangement of the composite system course control apparatus shown in FIG. 1. More specifically, this arrangement corresponds to a case where control is performed by using a virtual axis, i.e., a case where two reality axes (X and Y axes) as controlled objects and one virtual axis (Z axis) as a control system are combined together.

Referring to FIG. 3, a position command value generation means 110 supplies target values for the respective axes (X and Y axes) to control means 114 and 120. The control means 114 includes a CPU, a ROM, and a RAM to perform minimization processing on the basis of an evaluation function corresponding to equation (1). A controlled object 112 receives each axis control input from the control means 114 and moves each axis by a predetermined amount. Disturbance measurement means 113a and 113b supply measured disturbances to the control means 114 and 120, the controlled object 112, and a virtual controlled object 115, respectively.

A virtual position command value generation means 116 supplies a target value for one virtual axis (to be referred to as the Z axis) to the control means 114 and 120.

In the course control apparatus having the above-described arrangement, when the position command value generation means 110 constituting a target value production means 118 generates target values for moving the controlled objects as the reality axes by predetermined amounts, and the virtual position command value generation means 116 generates a virtual target value for moving the virtual controlled object as the virtual axis based on the reality axes, the control means 114 and 120 receive the generated virtual target value and target values, a virtual state amount from the virtual controlled object, state amounts from the controlled objects, the first disturbance signal with respect to the virtual controlled object, the second disturbance signal with respect to the controlled objects, and calculate control inputs and a virtual control input which optimize a predetermined first evaluation function (equation (1) or the like). The control means 114 and 120 then output the calculated control inputs and virtual control input to the corresponding virtual controlled object and control objects. With this operation, control inputs which can minimize the course error without changing the maximum accelerations with respect to disturbances can be output.

As described above, the composite system course control apparatus shown in FIG. 3 is characterized in that a virtual course command signal for a virtual controlled object is obtained from course command signals for the reality controlled objects.

Note that the virtual axis may be replaced with N spatial reality axes and M virtual axes (N and M are arbitrary integers). Although the embodiment is characterized by introducing a virtual axis (controlled object) which does not exist, that the virtual axis does not exist means that the virtual axis is not associated with the purpose of control. However, whether the virtual axis Z physically exist or not is irrelevant to the embodiment. That is, the virtual axis Z may physically exist, but its purpose is to control the X and Y axes. Therefore, whether the virtual axis Z (an axis set such that the state amount of a virtual controlled object which does not physically exist has a mathematically orthogonal relationship with the state amount of a controlled amount which exists) actually moves is not irrelevant to the embodiment.

In the above-described embodiment, an evaluation function is employed in consideration of disturbances applied to the respective courses. However, a predetermined evaluation function may be determined on the basis of the state amounts of the controlled objects 102a and 102b and output signals from the position command value generation means 100a and 100b so that the control means 104a and 104b respectively determine control inputs to the controlled objects 102a and 102b.

As described above, according to the composite system course control method of the present invention, target values for moving controlled objects as reality axes by desired amounts and a virtual target value for moving a virtual controlled object as a virtual axis based on the reality axes are generated, and control inputs for optimizing a predetermined first evaluation function and a virtual control input are calculated by inputting the generated virtual target value and target values, a virtual state amount from the virtual controlled object, state amounts from the controlled objects, the first disturbance signal with respect to the virtual controlled object, and second disturbance signals with respect to the controlled objects. The calculated control inputs and virtual control input are then output to the corresponding virtual controlled object and controlled objects, thereby minimizing the course errors without changing the maximum accelerations with respect to the disturbances.

Second Embodiment

Figure 4:
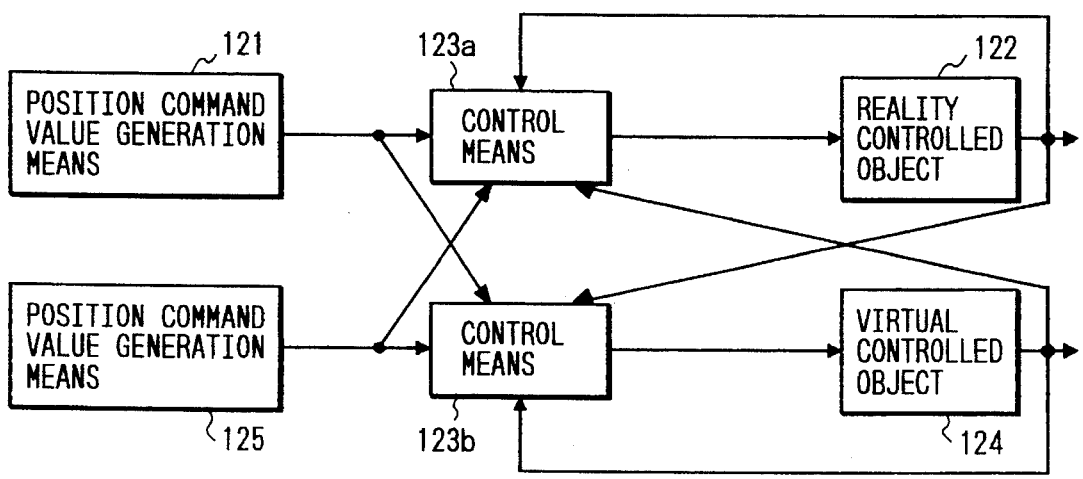
FIG. 4 is a block diagram for explaining the arrangement of a composite system course control apparatus according to the second embodiment of the present invention.

FIG. 4 is a block diagram for explaining the arrangement of a composite system course control apparatus according to the second embodiment of the present invention.

Referring to FIG. 4, a position command value generation means 121 outputs a target value for each reality controlled object 122 as two spatial reality axes to a control means 123a and outputs the same target value to a control means 128 for controlling a virtual controlled object 124. Similarly, a virtual position command value generation means 125 outputs a virtual target value for the virtual controlled object 124 to a control means 123b and outputs the same virtual target value to the control means 123a. Each of the control means 123a and 123b includes a CPU, a RAM, and a ROM. Each control means receives state amounts corresponding to the reality axis control system and the virtual axis, the above-mentioned virtual target value, and the above-mentioned target value, and calculates control inputs and a virtual control input which optimize an evaluation function based on equation (1). These control inputs are then output to reality controlled object 122 and the virtual controlled object 124, respectively.

Assume that a state equation X in equation (1) is determined as follows:

X=AX+BU

X=(X1, X2, X3, X4, X5, X6)

X1: X axis position X2: X axis velocity

X2: Y axis position X4: Y axis velocity

X5: Z axis position X6: Z axis velocity u=(u1, u2, u3)

U1: X axis control input U2: Y axis control input

U3: Z axis control input

In this case, the X and Y axes are control axes which exist in reality, but the Z axis is a virtual control axis which does not exist in reality and which is a characteristic feature of the present invention. Although the Z axis may exist in reality, an arbitrary controlled object which does not exist and a target value are introduced in accordance with the purpose of control. In this embodiment, the characteristics of the Z axis are set to be the same as those of the X axis. Assume that a target value for the Z axis is at the position of "0" at a start point and moves to a certain position at a constant velocity, and target values for the X and Y axes start to move therefrom. The Z axis returns to the position of "0" at the same velocity as that in the starting operation when the target values for the X and Y axes stop.

A state of a course error in a case where circular traces are drawn by using the composite system course control apparatus shown in FIG. 3 will be described below with reference to FIG. 5.

Figure 5:
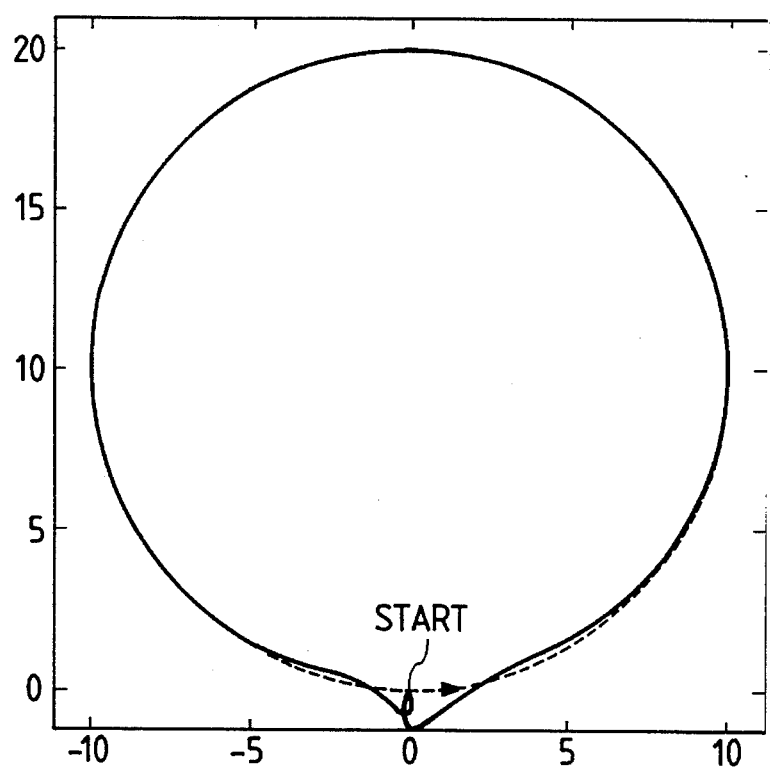
FIG. 5 is a chart showing traces drawn by the course control apparatus in FIG. 4.

FIG. 5 shows traces drawn by using the composite system course control apparatus shown in FIG. 4, e.g., an X-Y plotter with two orthogonal axes. In order to show an improved state of a course error, FIG. 5 is caused to correspond to a state where the error is increased 20 times in the radial direction.

Referring to FIG. 5, the broken line indicates a target circular trace; and the solid line, a controlled trace.

For comparison with the prior art, in the case shown in FIG. 5, the same target position commands as those in the case shown in FIG. 38 are given to the X and Y axes, and the same disturbance as that in the case shown in FIG. 38 is applied to the X axis.

In addition, in this embodiment, parameters are selected to set the same maximum accelerations as those in the conventional method shown in FIG. 38. In this case, with the same maximum accelerations, the radius error with respect to the same disturbance is reduced to about 1/10 that in the prior art. That is, an increase in precision can be achieved. In other words, if the target velocity is changed to set the same radius error as that in the conventional control method, the control method of the embodiment allows the corresponding axis to move at a velocity about three times that in the conventional control method, thus realizing high-speed control.

In this case, setting of the same maximum accelerations means that the power consumption of the driver of each motor is the same as that in the prior art, provided that disturbances, friction, and the like are neglected. In addition, accelerations cause vibration of the mechanical system. With the same maximum accelerations, the control method of the embodiment can perform course control at a higher speed with higher precision than the conventional method owing to the vibration of the mechanical system.

In the above-described embodiment, by controlling the controlled object having two spatial axes which exist in reality and one virtual axis, a high-precision trace of the two spatial axes is obtained. However, one reality spatial axis and one virtual axis may be controlled such that the time waveform of the one spatial reality axis is controlled in accordance with a purpose. A state of variation in control characteristics in a case where one spatial reality axis and one virtual axis are controlled will be described below with reference to FIGS. 6 and 7.

Figure 6:
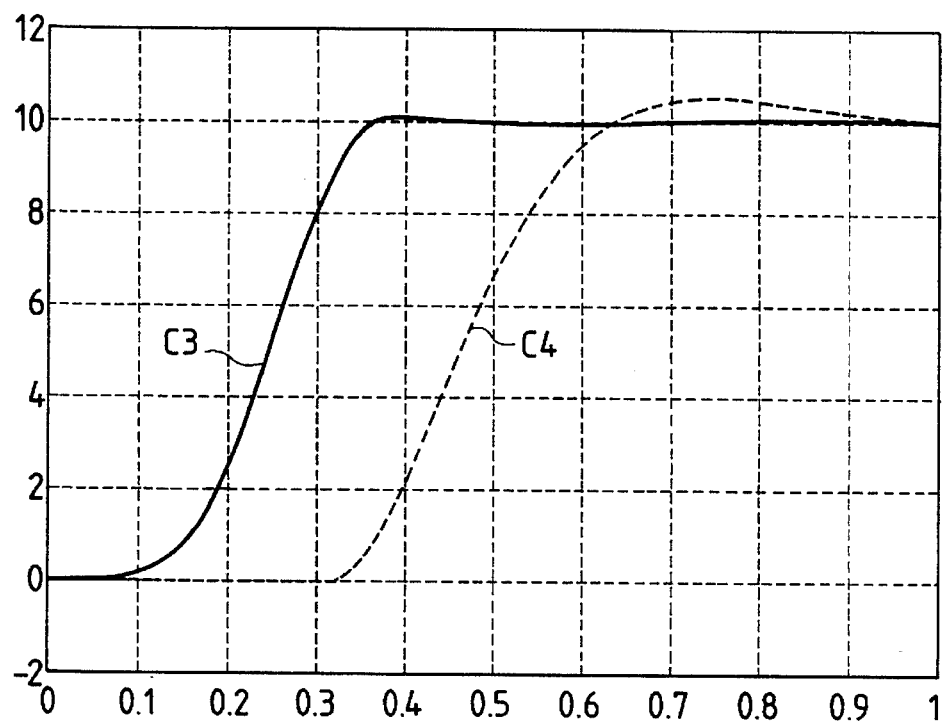
FIG. 6 is a graph showing response characteristics with respect to target values in the course control apparatus in FIG. 4.

FIG. 6 shows response characteristics with respect to a target value in the course control apparatus shown in FIG. 4. Referring to FIG. 6, the abscissa indicates time; and the ordinate, a moving amount.

Referring to FIG. 6, a curve C4 corresponds to response characteristics in a case where no target command value is given to the virtual axis, and a curve C3 corresponds to response characteristics in a case where a target command value is given to the virtual axis upon completion of a command with respect to the reality axis.

As shown in FIG. 6, when a target command value is given to the virtual axis, a response (see the response characteristic curve C3) with almost no overshoot can be obtained, thus greatly improving the control characteristics.

Figure 7:
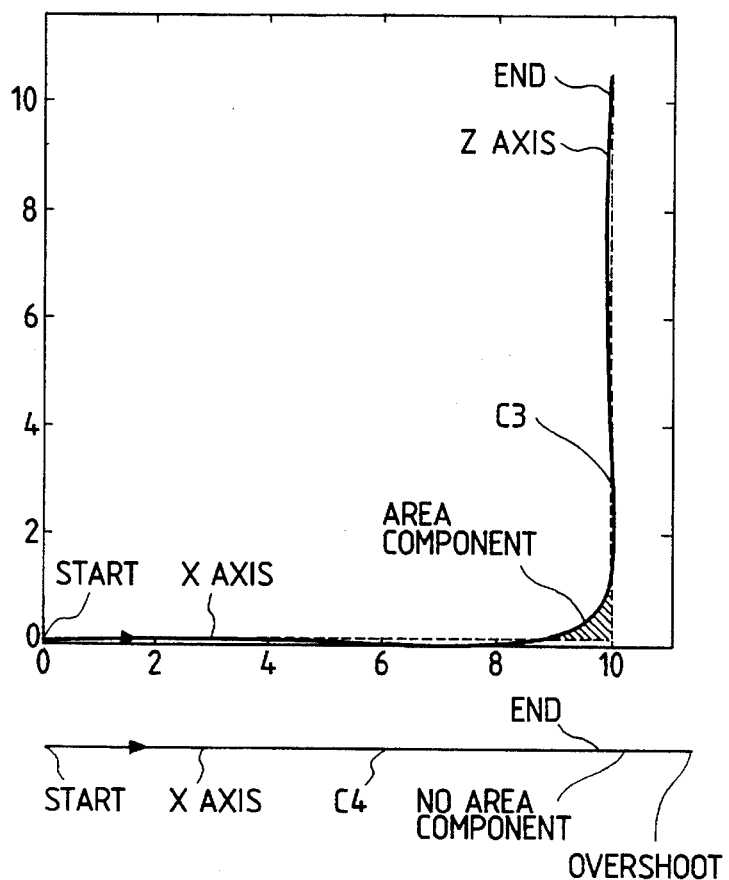
FIG. 7 is a chart showing a physically analyzed state of the response characteristics shown in FIG. 6.

FIG. 7 is a graph showing a physically analyzed state of the response characteristics shown in FIG. 6. The same reference numerals in FIG. 7 denote the same parts as in FIG. 6. Referring to FIG. 7, the abscissa indicates the virtual axis; and the ordinate, the reality axis.

As shown in FIG. 7, the response characteristic curve C4 in a virtual space is a target course having a line segment moving from the left to the right on the reality axis (X axis), and the response characteristic curve C3 is a target course curving at a right angle in the virtual space defined by the reality axis (X axis) and the virtual axis (Z axis). Note that since each of weighting functions Q and X in an evaluation function includes either $|e|^2*|\Delta R|^2-(e,\Delta R)^2$ or $|e|^2*|\Delta y|^2-(e,\Delta y)^2$, or an element term mathematically equivalent thereto, control is performed to reduce the area component, of the response characteristic curve C3, which is indicated by the hatching. For this reason, overshoot can be eliminated from the response of the reality axis.

In contrast to this, when the response characteristic curve C4 follows up the target course whose line segment is simply moved, even if overshoot occurs on the line segment, the area component is zero, and the overshoot cannot be eliminated. Therefore, the follow-up characteristics with respect to a target value in the control system are poor.

In the second embodiment, the present invention is applied to combinations of a controlled object having two reality two axes and one virtual axis, and a controlled object having one spatial reality axis and one virtual axis. It is, however, apparent that the present invention can be applied to a combination of N spatial axes and M virtual axes (N and M are arbitrary integers). In addition, the second embodiment is characterized in that a virtual axis (controlled object) is introduced. However, that the virtual axis does not exist means that the virtual axis is not associated with the purpose of control. For example, the virtual axis Z in the second embodiment may physically exist, but the purpose is to control the X axis. That is, whether the virtual axis Z physically exist or not is irrelevant to the embodiment.

Third Embodiment

Figure 8:
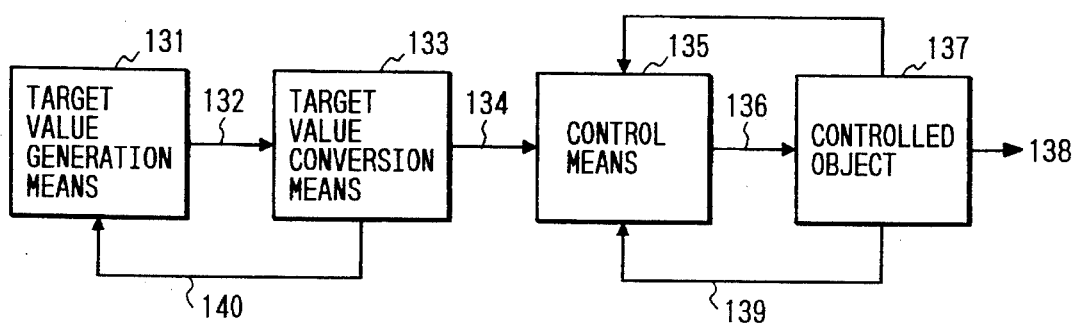
FIG. 8 is a block diagram for explaining the basic arrangement of a course control apparatus according to the third embodiment of the present invention.

FIG. 8 is a block diagram for explaining the basic arrangement of a composite system course control apparatus according to the third embodiment of the present invention.

Referring to FIG. 8, a target value generation means 131 outputs a target value 132 for a controlled object 137 to a target value conversion means 133. The target value conversion means 133 produces a new target value 134 by adding a proper interpolation point to the target value 132 according to a predetermined algorithm when the acceleration of the target value is excessively large. The target value conversion means 133 supplies the new target value 134 to a control means 135. The control means 135 has a CPU, a ROM, a RAM, and the like to sequentially calculate and output a control input 136 for minimizing a predetermined evaluation function $J_{(k)}$ defined by equation (4) (to be described later) upon receiving a state amount 139 of the controlled object, the new target value 134, and a control amount 138 of each control axis as the controlled object. When the target value conversion means 133 adds an interpolation point to the target value 132, a time delay corresponding to the number of added target values occurs. A control signal 140 serves to set the target value generation means 131 in a standby state to prevent it from generating a new target value during this delay period.

$$J_{(k)}=E[|e_i|^2+q_1*\{|e_i|^2*|\Delta R_i|^2-(e_i,\Delta R_i)^2\}+U^T_i H u_i] \quad (4)$$

where ei is the positional error vector, $u_i$ is the control input vector, $\Delta R_i$ is the target value velocity vector, $q_1$ is the area term weighting coefficient, and H is the control input weighting coefficient.

In the composite system course control apparatus having the above-described arrangement, when the target value generation means generates target values for moving a plurality of controlled objects by predetermined amounts, the target value conversion means converts the generated target values into new target values, and outputs them to the control means. The control means receives the converted target values, state amounts from the controlled objects, and disturbance signals associated with the controlled objects, and calculates control inputs for optimizing a predetermined second evaluation function. The control means then outputs the control inputs to the controlled objects, thereby minimizing the course errors without increasing the accelerations.

Figure 9:
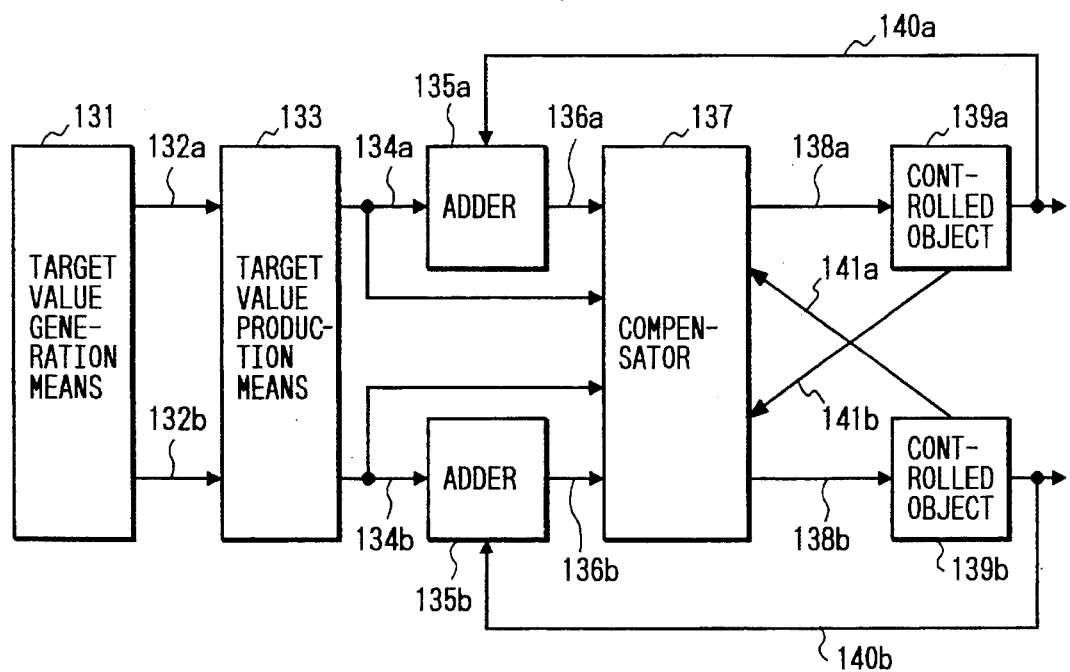
FIG. 9 is a block diagram showing the detailed arrangement of an apparatus having a composite control system to which the course control apparatus according to the third embodiment of the present invention is applied.

FIG. 9 is a block diagram showing the detailed arrangement of an apparatus having a composite control system to which the course control apparatus according to the third embodiment is applied. The same reference numerals in FIG. 9 denote the same parts as in FIG. 8.

Referring to FIG. 9, a target value 132a for an X axis controlled object 139a is input to a target value conversion means 133. As described above, the target value conversion means 133 produces a new target value 134a by adding a proper interpolation point to the target value 132a according to a predetermined algorithm when the acceleration of the target value 132a is excessively larger. The target value conversion means 133 then supplies the new target value 134a to an adder 135a.

A target value 132b for a Y axis controlled object 139b is input to the target value conversion means 133. As described above, the target value conversion means 133 produces a new target value 134b by adding a proper interpolation point to the target value 132a when the acceleration of the target value 132b is excessively large according to a predetermined algorithm. The target value conversion means 133 then supplies the new target value 132b to an adder 135b.

A compensator 137 receives an addition signal 136a based on a controlled amount 140a from the controlled object 139a and the new target value 134a, the new target value 134a, an addition signal 136b based on a state amount 141a of the controlled object 139a, a controlled amount 140b from the controlled target 139b, and the new target value 134b, the new target value 134b, a state amount 141b of the controlled target 139b, and the like, thus sequentially calculating control inputs 138a and 138b for minimizing the predetermined evaluation function $J_{(k)}$ defined by equation (4). The compensator 137 then outputs the control inputs 138a and 138b to the controlled objects 139a and 139b, respectively.

Figure 10A:
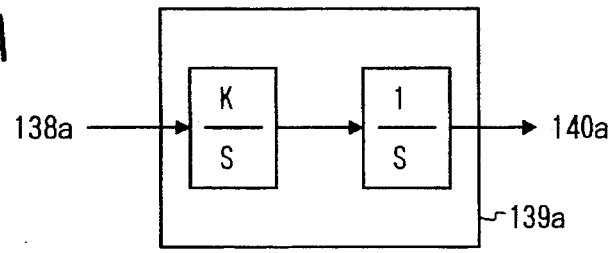
FIGS. 10A and 10B are block diagrams showing arrangements of the controlled object models shown in FIG. 9.
Figure 10B:
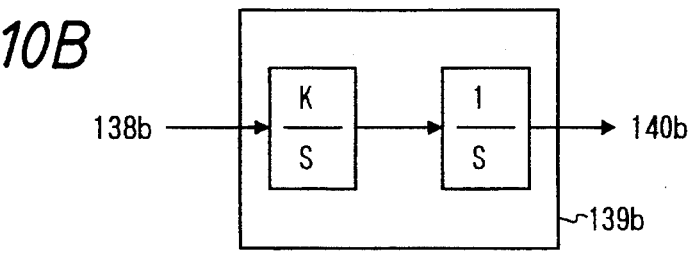

FIGS. 10A and 10B are block diagrams showing the arrangements of models of the controlled objects 139a and 139b shown in FIG. 9. Referring to FIGS. 10A and 10B, each model has transfer coefficients K/S and 1/S, a constant K is determined by the inertia of a drive system, the gain of a driver, and the like.

In this embodiment, a target command value is converted by using the following simple algorithm. However, the present invention is not limited to this. (Conversion algorithm for target command value):

When an acceleration $A_K$ calculated from a current target position $R_K$ (a target value vector having a position target value for each axis at time k as a component) exceeds a set maximum acceleration $A_m$, an intermediate point $\{(R_K/2)+(R_{K-1}/2)\}$ between the current target position $R_K$ and a preceding target position $R_{K-1}$ is set as a current target value.

The operation of the third embodiment will be described in detail below with reference to FIGS. 11A and 11B to FIG. 16.

Figure 11A:
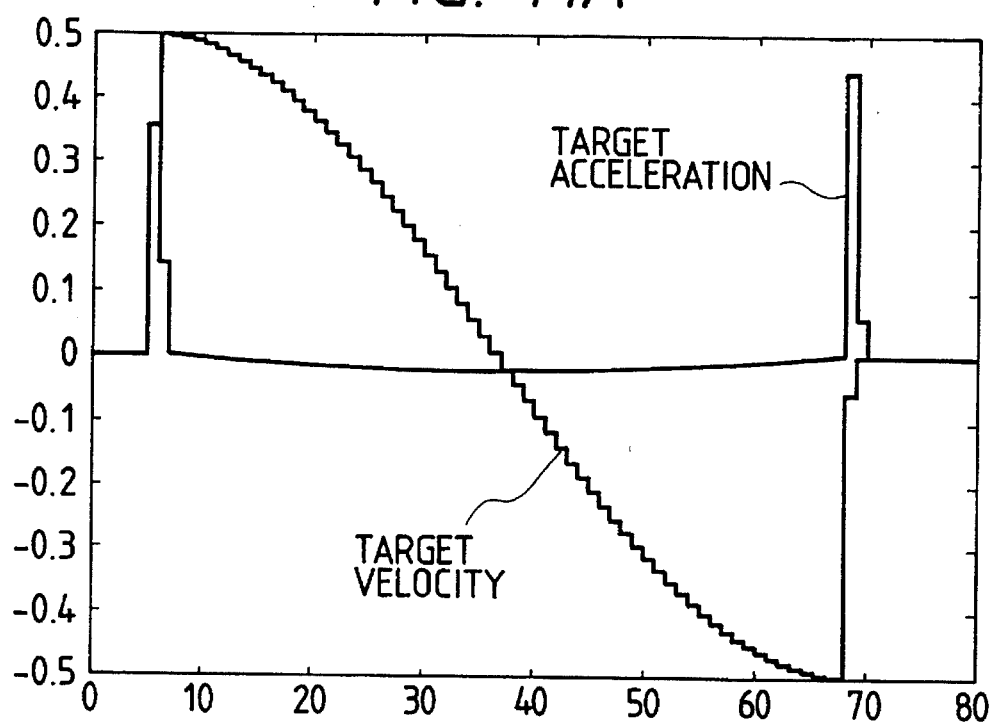
FIGS. 11A and 11B are graphs, each showing the relationship between an increase in position target value of a target course and an acceleration component in the composite system course control apparatus according to the present invention.
Figure 11B:
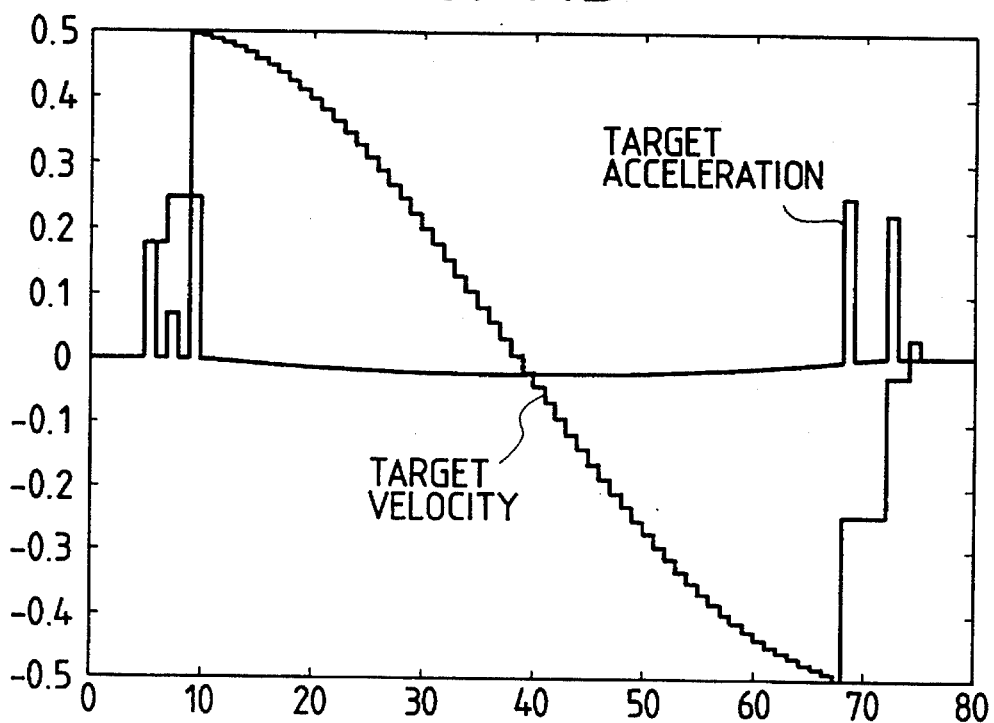

FIGS. 11A and 11B are graphs, each showing the relationship between an increase in position target value (velocity) of a target course and an acceleration component in the composite system course control apparatus according to the present invention. FIG. 11A corresponds to a case where the above-described conversion algorithm for target command values is not executed. FIG. 11B corresponds to a case where the conversion algorithm for target command values is executed, and more specifically, a case wherein a semicircular trace as a course is obtained with a radius of 108 (mm) and a target velocity of 100 (mm/sec) constituting a target position command value. Note that a target value is given to the control system in practice is at the position of the integral value of this velocity component.

Figure 12A:
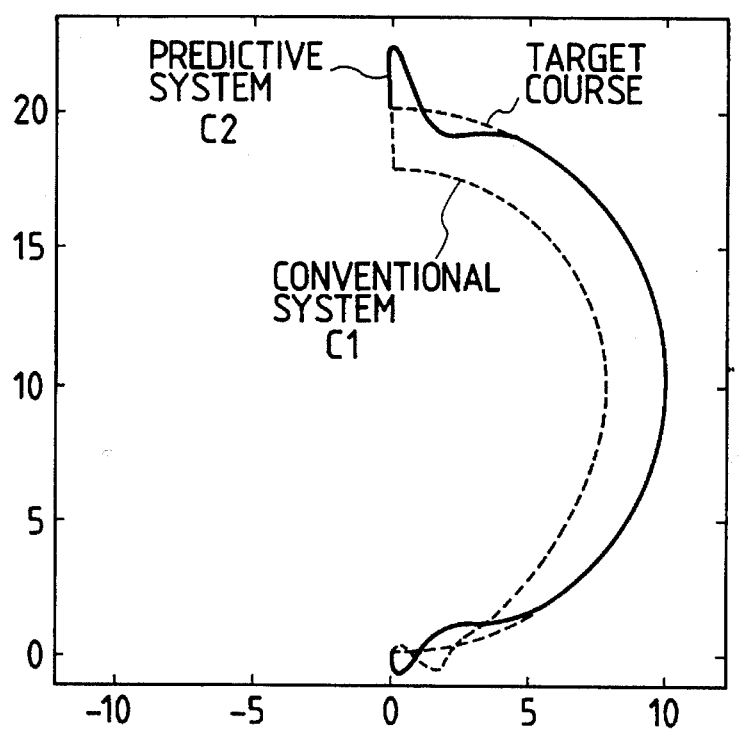
FIGS. 12A and 12B are charts showing course follow-up characteristics with respect to the target values shown in FIGS. 11A and 11B.
Figure 12B:
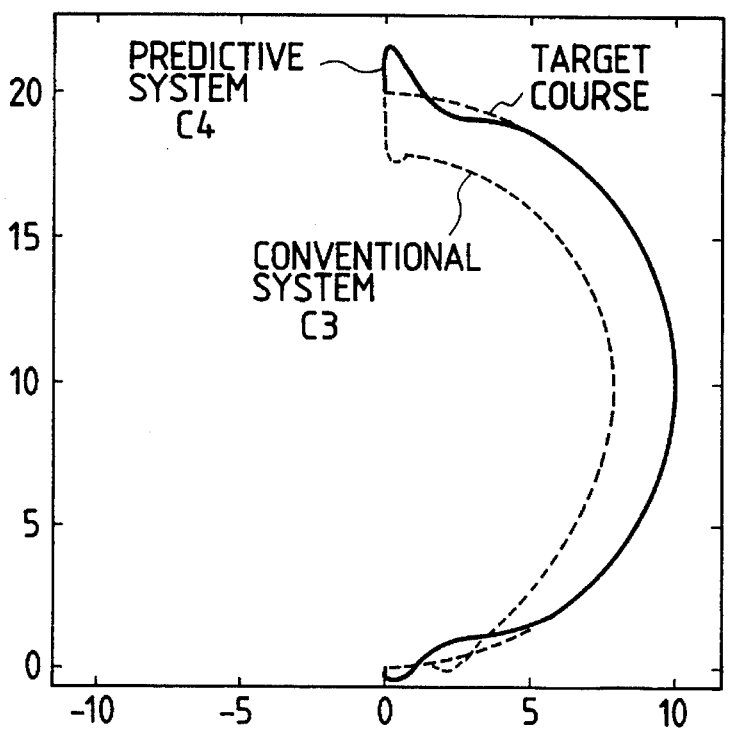
Figure 13:
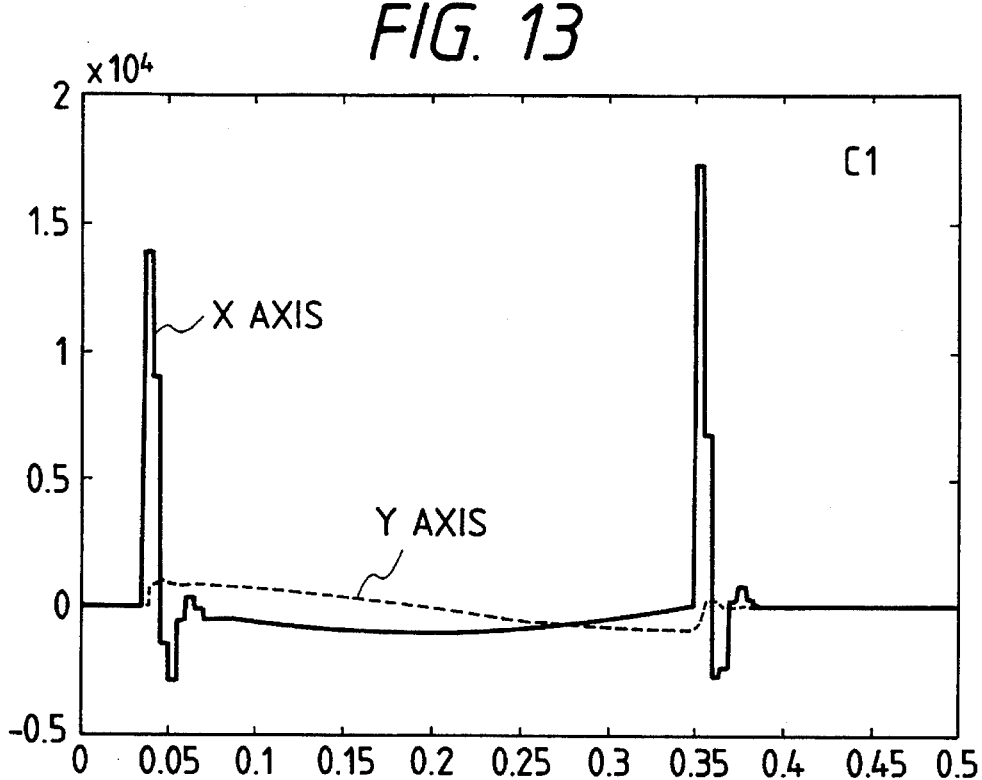
FIG. 13 is a graph showing the acceleration response waveforms, of the X and Y axes, corresponding to the follow-up characteristics shown in FIGS. 11A to 12B.

As shown in FIG. 11B, since accelerations at the start and end points of the target course are large, simple acceleration processing is performed at these points. FIGS. 12A and 12B respectively show response characteristics with respect to such target values.

FIGS. 12A and 12B are graphs showing course follow-up characteristics with respect to the target values shown in FIGS. 11A and 11B. FIG. 12A corresponds to a case wherein the above-described conversion algorithm for target command values is not executed. FIG. 12B corresponds to a case where the conversion algorithm for target command values is executed. Note that in order to clarify the degree to which a course error is improved, these graphs are caused to correspond to states and characteristics obtained when the error is increased 100 times in the radial direction.

FIG. 12A shows a follow-up characteristic curve C2 of a predictive control system and a follow-up characteristic curve of a conventional control system in a case where parameters for the control system are selected such that the maximum course error becomes the same value (about 25 (um)) as that of the position target value in FIG. 11A. FIG. 12B shows a follow-up characteristic curve C4 of the predictive control system and a follow-up characteristic curve C3 of the conventional system with respect to the position target value in FIG. 11B.

Figure 14:
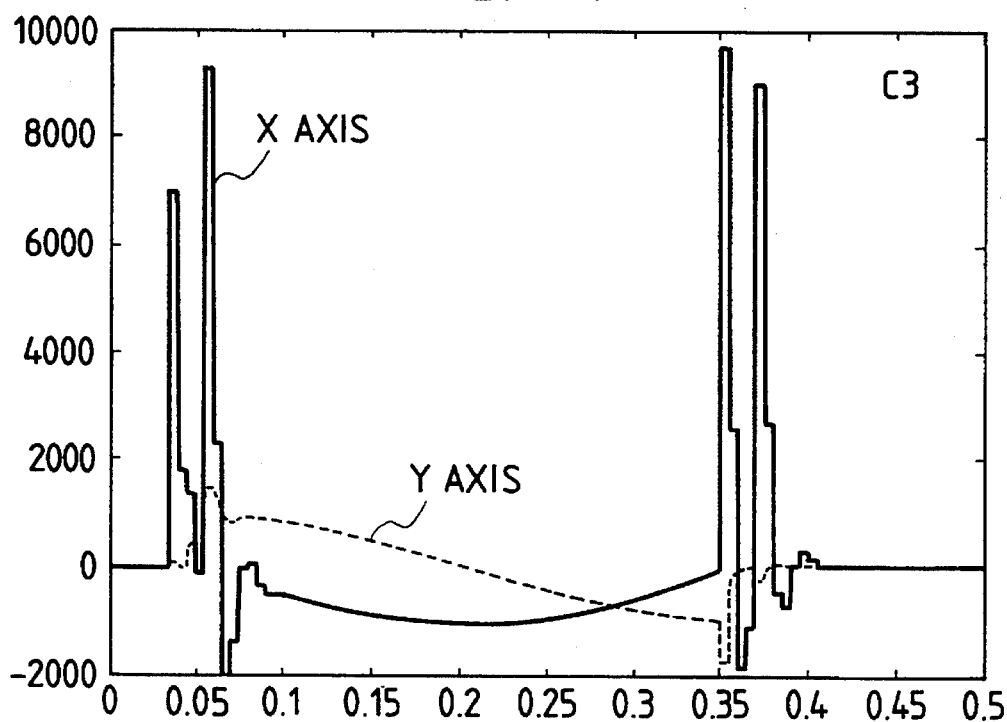
FIG. 14 is a graph showing the acceleration response waveforms, of the X and Y axes, corresponding to the follow-up characteristics shown in FIGS. 11A to 12B.
Figure 15:
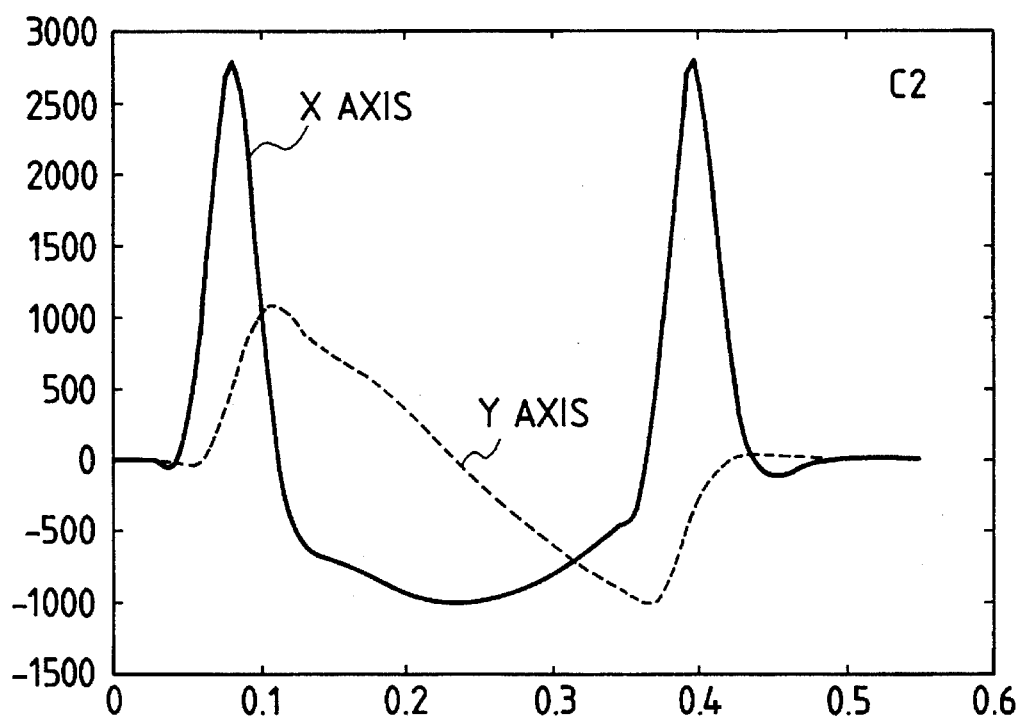
FIG. 15 is a graph showing the acceleration response waveforms, of the X and Y axes, corresponding to the follow-up characteristics shown in FIGS. 11A to 12B.
Figure 16:
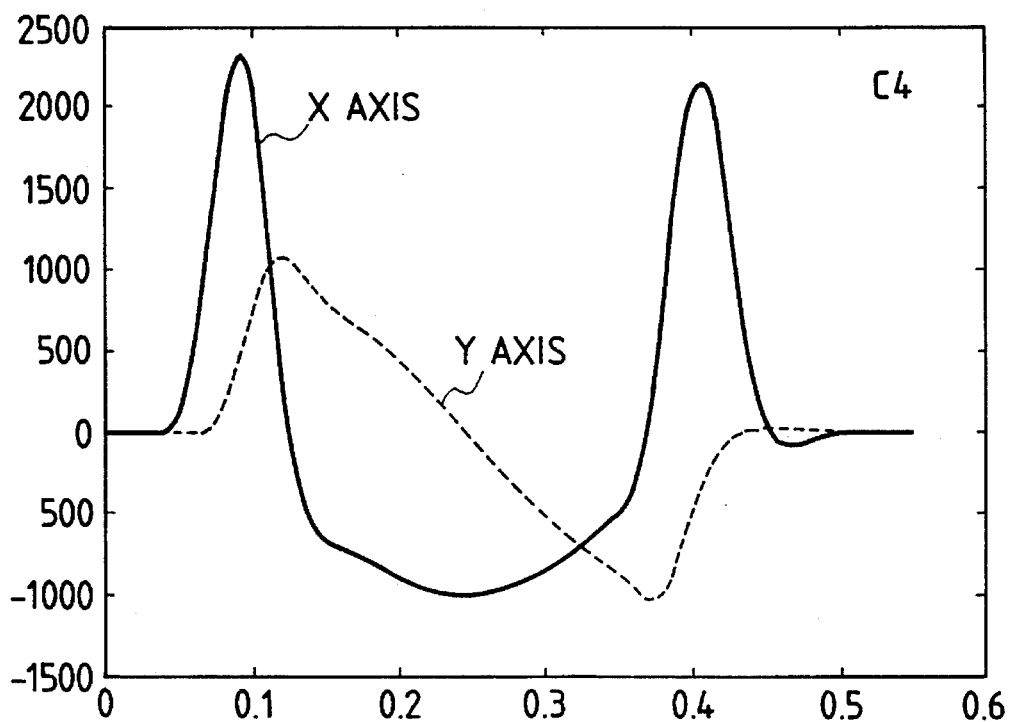
FIG. 16 is a graph showing the acceleration response waveforms, of the X and Y axes, corresponding to the follow-up characteristics shown in FIGS. 11A to 12B.

FIGS. 13 to 16 are graphs showing the acceleration response waveforms, of the X and Y axes, corresponding to the follow-up characteristics shown in FIGS. 11A to 12B. More specifically, FIGS. 13 and 15 correspond to acceleration response waveforms of the follow-up characteristic curve C1 and the follow-up characteristic curve C2 of the predictive control system in the case wherein the conversion algorithm for target command values is not executed. FIGS. 14 and 16 correspond to the acceleration response waveforms of the follow-up characteristic curve C3 and follow-up characteristic curve C4 of the predictive control system in the case where the conversion algorithm for target command values is executed.

As shown in FIG. 12A, the maximum accelerations of the follow-up characteristic curve C2 of the predictive control system and the follow-up characteristic curve of the conventional control system are 2,819 (mm/sec) and 17,338 (mm/sec), respectively. In the conventional system, in order to set the same course error as that in the predictive system, an acceleration about six times that in the predictive system is required. FIG. 12B shows the case wherein the conversion algorithm for target command values is executed, in which the maximum accelerations of the follow-up characteristic curve C4 of the predictive control system and the follow-up characteristic curve C3 of the conventional control system are 2,328 (mm/sec) and 9,666 (mm/sec), respectively. That is, both the maximum course error and the maximum acceleration in the predictive control system are smaller than those in the conventional control system, and the vibration of the acceleration waveform in the predictive control system is also smaller than that in the conventional control system.

As described above, according to the course control method of the present invention, the problems posed in the conventional simple acceleration/deceleration method can be solved. More specifically, in the conventional simple acceleration/deceleration method, since a large number of high-frequency components are included in an acceleration waveform, vibration of a mechanical system is caused, resulting in poor controllability. In addition, in order to perform control with a small amount of vibration, an acceleration/deceleration method needs a sufficient care. Furthermore, the simple acceleration/deceleration method can be applied to only specific courses, e.g., a straight course and an arcuated course. These problems, however, can be solved by the present invention.

In the above-described embodiment, as a target value, position information of each axis (obtained by integrating velocity information in the embodiment) is used. However, velocity information of each axis may be used instead.

The embodiment exemplifies the course control system for simultaneously controlling a plurality of axes. However, the present invention can be applied to position control of one axis and may be applied to a velocity control system using velocity information as a target value.

Furthermore, in the above embodiment, when a acceleration $A_K$ calculated from a current target position $R_K$ (a target value vector having a position target value for each axis at time k as a component) exceeds a set maximum acceleration $A_m$, an intermediate point $\{(R_K/2)+(R_{K-1}/2)\}$ between the current target position $R_K$ and a preceding target position $R_{K-1}$ is set as a current target value. However, another point on the target course may be set as a current target value. In this case, an interpolation point $R_{KK}$ is defined as $R_{KK}=R_{K-1}+m(R_K-R_{K-1})$ where $0 \leq m \leq 1$.

Note that the above-mentioned value m may be 0.5 or a value which causes the acceleration at an interpolation point to coincide with the maximum acceleration. In this case, the acceleration $A_K$ is defined as $A_K=R_K+R_{K-1}-2R_{K-2}$.

Figure 17A:
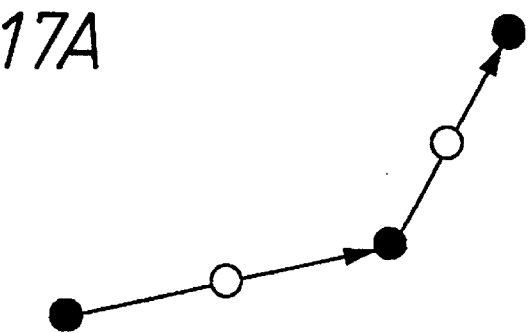
FIGS. 17A and 17B are views showing methods of selecting interpolation points for target courses in the course control apparatus according to the present invention.
Figure 17B:
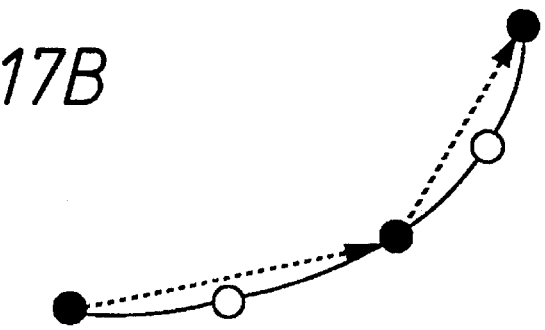

FIGS. 17A and 17B are views showing methods of selecting interpolation points for a target course in the composite system course control apparatus of the present invention. FIG. 17A corresponds to a case wherein interpolation points $R_{KK}$ are selected to be located on joined straight lines. FIG. 17B corresponds to a case wherein the interpolation points $R_{KK}$ are selected to be located on an arc.

Referring to FIGS. 17A and 17B, the black dots indicate given target positions; and the white dots, the interpolation points $R_{KK}$.

As shown in FIGS. 17A and 17B, the interpolation points $R_{KK}$ may be selected to be located on joined straight lines, or may be selected to be located on an arc if it is known beforehand that a target course is smooth. In this case, an arc passing through three points including current and past points is obtained, and interpolation points are selected to be located on the arc, thereby obtaining optimal interpolation points.

Figure 18:
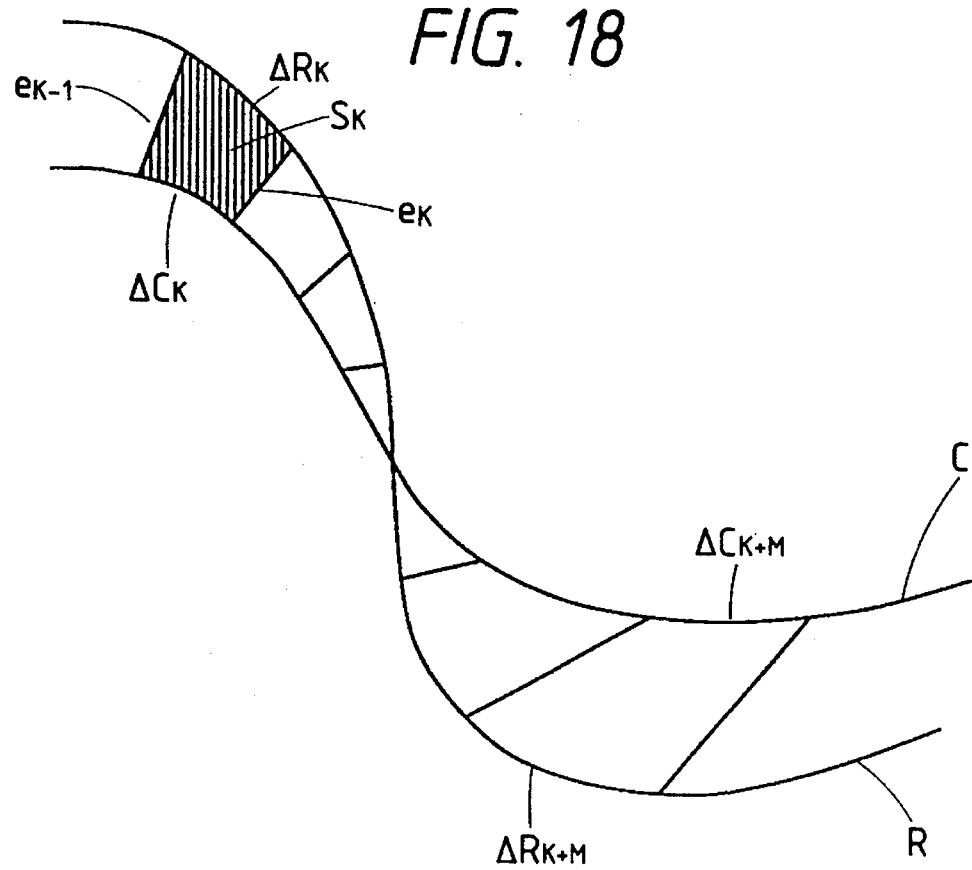
FIG. 18 is a view for explaining a target curve course error in the course control apparatus according to the present invention.
Figure 19:
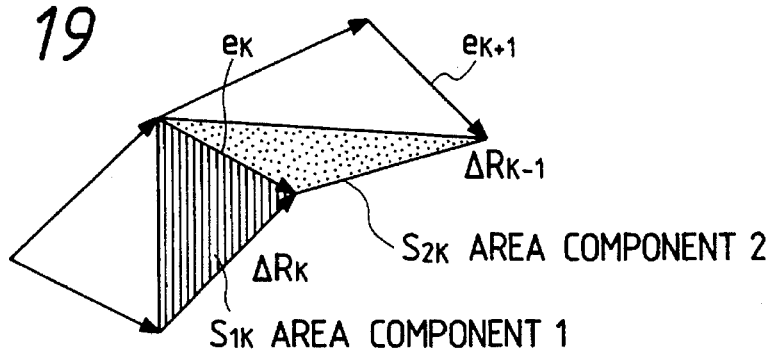
FIG. 19 is a view showing a vector analysis chart of the area components of the target curve course error shown in FIG. 18.
Figure 20A:
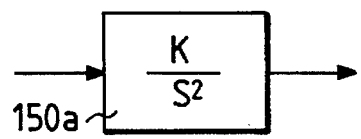
FIGS. 20A and 20B are views showing the transfer functions of controlled objects in the course control apparatus according to the present invention.
Figure 20B:
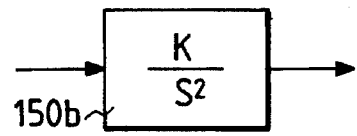

In the above embodiment, as an element for evaluating a course error, an area component $S_K$ as shown in FIG. 18 is used. More specifically, in the embodiment, while a course error is compensated between the respective axes in such a manner that the sum of the area components enclosed with curves as a target course R and a follow-up course C is caused to infinitely approach zero, controlled objects 150a (X axis) and 150b (Y axis) shown in FIGS. 20A and 20B are optimized on the basis of the evaluation function (equation (4)). An area error component (area error term) $S_{ik}$ in one interval can be expressed by a vector relationship, as shown in FIG. 19. Note that FIG. 19 also shows a position error vector $e_k$.

Figure 21:
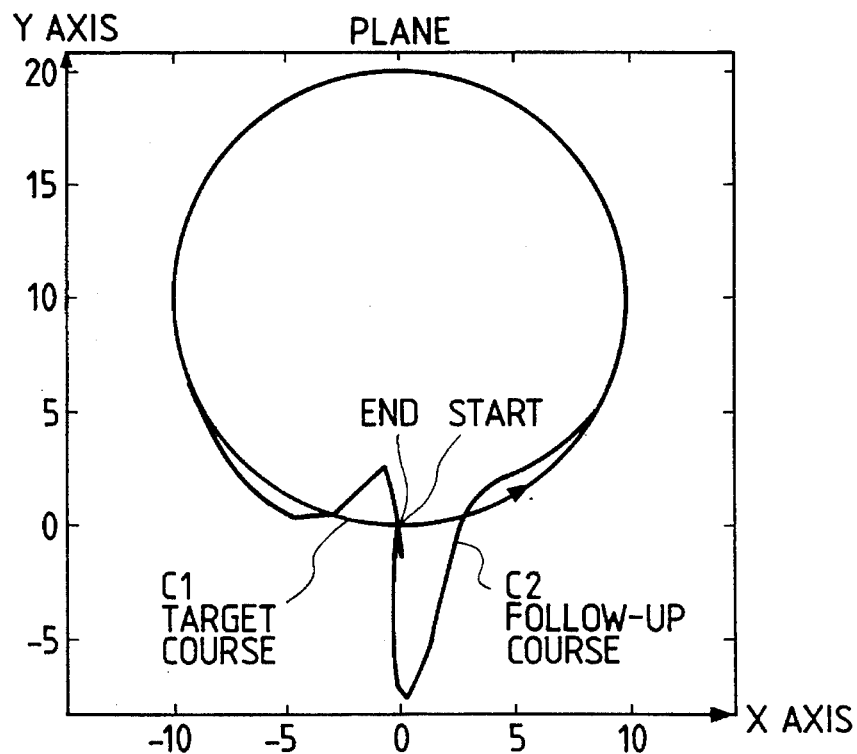
FIG. 21 is a chart showing traces of a target course and a follow-up course in the course control apparatus according to the present invention.

FIG. 21 shows a trace of a target course C1 and a trace of a follow-up course C2 in a case wherein a circle is drawn after optimal control inputs for minimizing the evaluation function are obtained by the course control system having the above-described arrangement. In this case, the radius of the target circular course is set to be 10 (mm), and the moving velocity is set to be 150 (mm/sec). Since a course error in the follow-up course is very small, the follow-up course is displayed after the error is increased 100 times in the radial direction.

As shown in FIG. 21, the maximum course error, which is 77 (μm), occurs at the start point.

In this manner, the course error can be suppressed to be a very small value. However, target precision may not be achieved even with such a small error. In this case, an increase in precision is realized by reducing a weighting coefficient corresponding to the acceleration term of the evaluation function and using large accelerations. When a large acceleration is used in this manner, the following problems may be posed.

The capacity of a motor driver of an axis drive system is increased. In addition, high-frequency vibration of a mechanical system is caused, resulting in a deterioration in precision.

In such a case, by using not only the above-mentioned area error term $S_{ik}$ but also, for example, a succeeding area error term $S_{2k}$, an increase in precision in course control can be realized without using a large acceleration. For this purpose, as an area error term of the above-mentioned evaluation function, an area error term other than a current term, for example, a preceding term or a succeeding term, i.e., $|e_i|^2 * |\Delta R_i|^2 - (e_i, \Delta R_i)^2$ or $|e_i|^2 * |\Delta y_i|^2 - (e_i, \Delta y_i)^2$ (where $i = \pm 1, \pm 2, \ldots$) is used.

An evaluation function and the like, in a course control apparatus, which uses an area error term other than a current term, e.g., a preceding term or a succeeding term will be described below.

Fourth Embodiment

Figure 22:
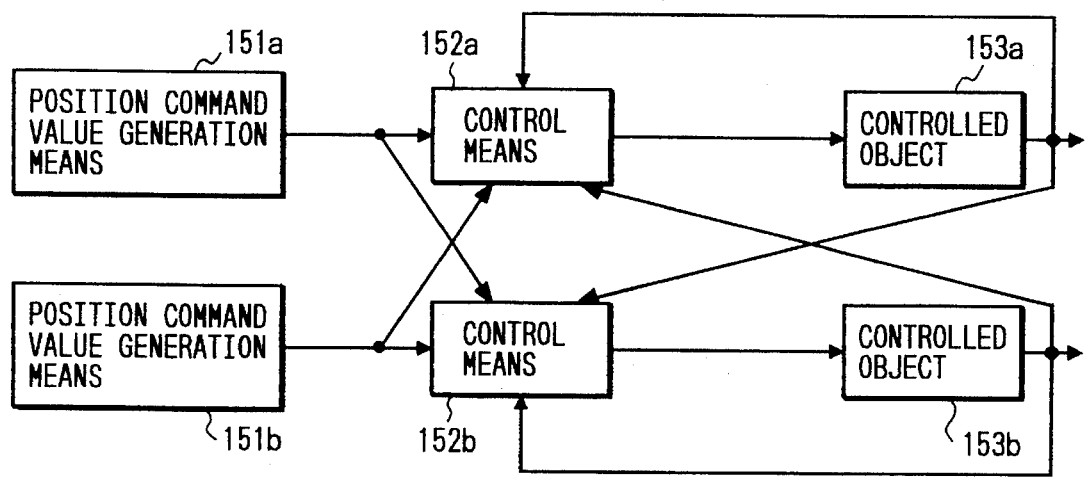
FIG. 22 is a block diagram for explaining the basic arrangement of a course control apparatus according to the fourth embodiment of the present invention.

FIG. 22 is a block diagram for explaining the basic arrangement of a course control apparatus according to the fourth embodiment of the present invention.

Referring to FIG. 22, a position command value generation means 151a outputs a target value for the X axis to control means 152a and 152b. A position command value generation means 151b outputs a target value for the Y axis to the control means 152a and 152b. Each of the control means 152a and 152b includes a CPU, a ROM, a RAM, and the like to minimize an evaluation function $j_{(K)}$ defined by equation (5) upon receiving the respective target values and state amounts and controlled amounts from controlled objects 153a and 153b.

$$J_{(K)} = \sum_{i=k}^{k+M} [|e_i|^2 + q_1 * \{|e_i|^2 * |\Delta R_i|^2 - (e_i, \Delta R_i)^2\} + \quad (5)$$
$$q_2 * \{|e_i|^2 * |\Delta R_{i+1}|^2 - (e_i, \Delta R_{i+1})^2\} +$$
$$U_i^T H u_i]$$

where $e_i$ is the positional error vector, $u_i$ is the control input vector, $\Delta R_i$ is the target value velocity vector, $q_i$ is the area term weighting coefficient, and H is the control input weighting coefficient. In equation (5), the weighting coefficients $q_1$ and $q_2$ of area error terms at the current and succeeding sampling time points are set to be the same value. However, these weighting coefficients $q_1$ and $q_2$ may be set to be different values. Although a position error term and an acceleration term are used for the evaluation function as well as the area term, a control system may be formed by introducing an acceleration change term, a velocity term, and the like into the evaluation function in addition to the above-mentioned terms.

Figure 23:
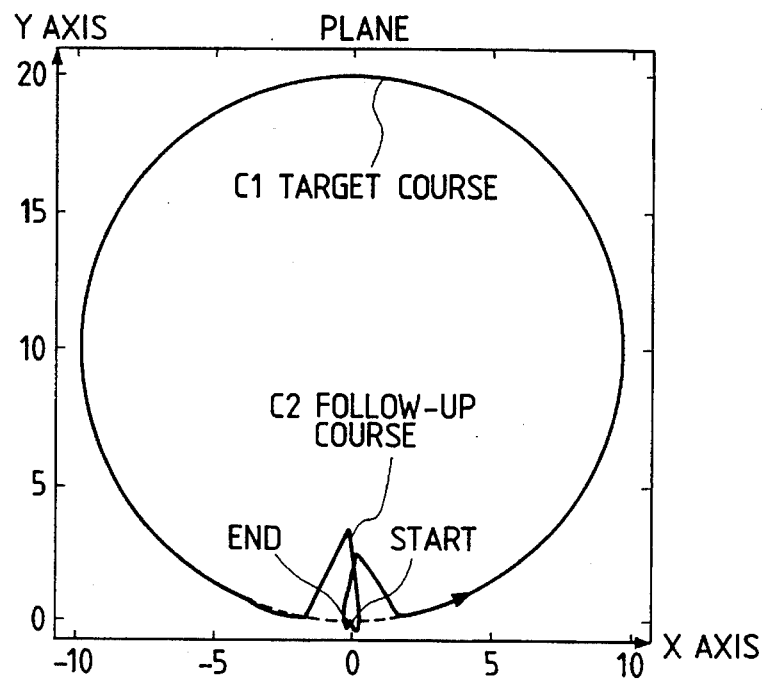
FIG. 23 is a chart showing the relationship between a target course and a follow-up course in the course control apparatus shown in FIG. 22.

According to the course control apparatus having the above-described arrangement, a trace of a target course C1 and a trace of a follow-up course C2 shown in FIG. 23 are obtained when a circle is drawn. Note that the maximum target velocities (150 mm/sec) shown in FIGS. 21 and 23 are set when weighting coefficients of the control system are selected to set the same acceleration. In order to clearly show a course error in FIG. 23, the course error is increased 100 times in the radial direction. More specifically, the maximum error, which is 35 (um), occurs at an end point. Therefore, by using an area error term other than a current term, for example, a preceding term or a succeeding term, i.e., $|e_i|^2 * |\Delta R_i|^2 - (e_i, \Delta R_i)^2$ or $|e_i|^2 * |\Delta y_i|^2 - (e_i, \Delta y_i)^2$ as an area error term of the evaluation function, the course error characteristics can be greatly improved as compared with the above-described embodiment.

Figure 24:
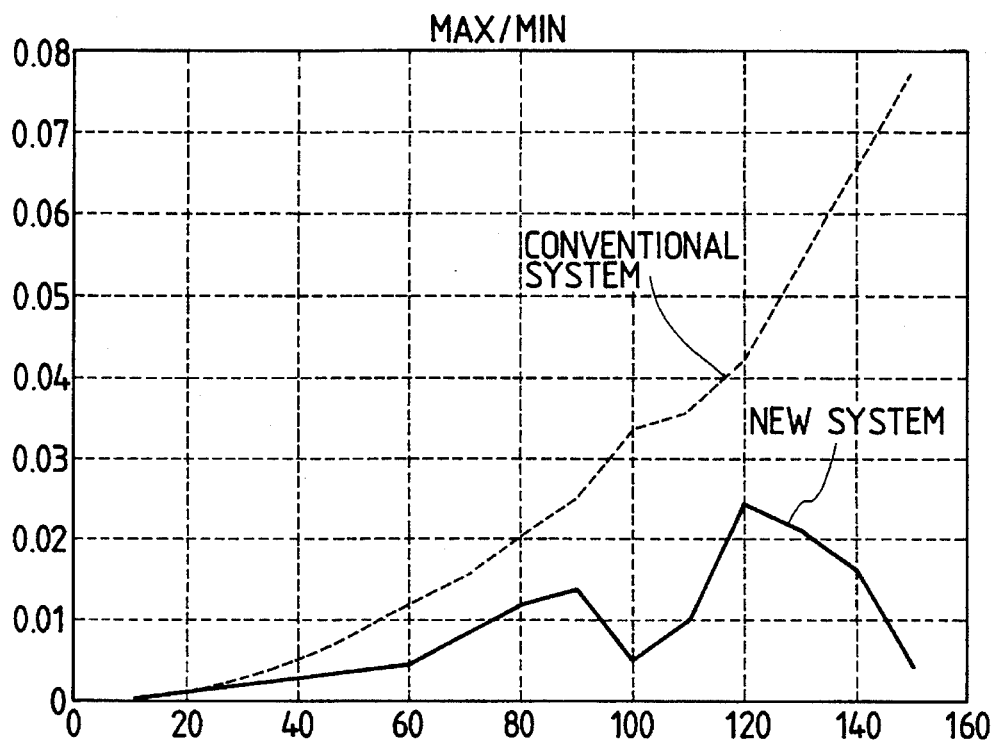
FIG. 24 is a graph showing course error characteristics in the course control apparatus in FIG. 22.
Figure 25:
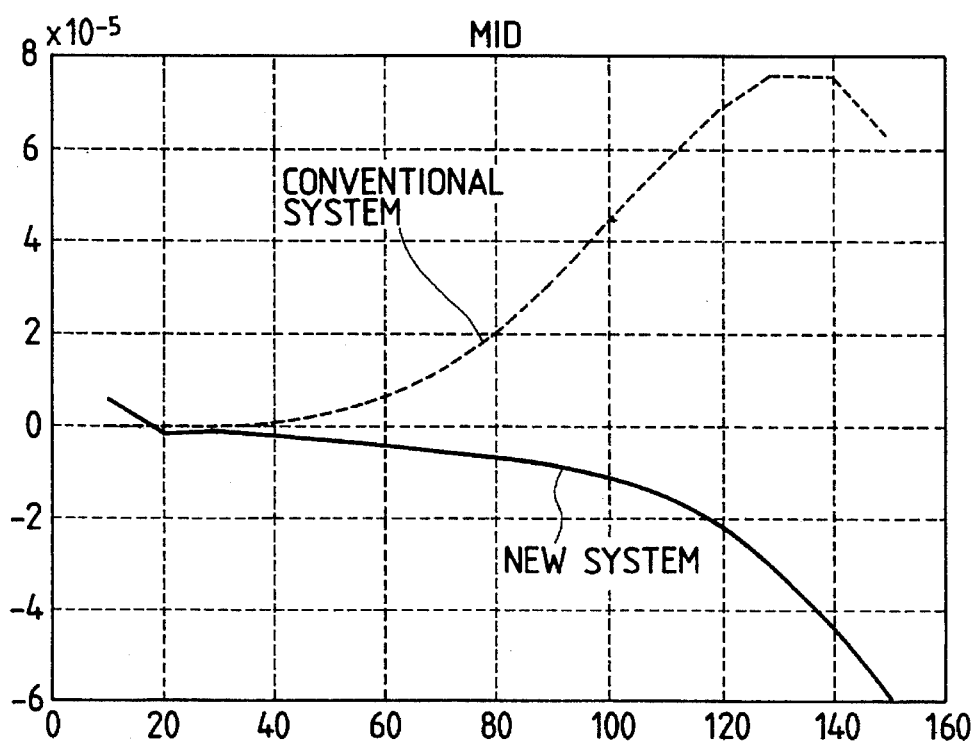
FIG. 25 is a graph showing course error characteristics in the course control apparatus in FIG. 22.
Figure 26:
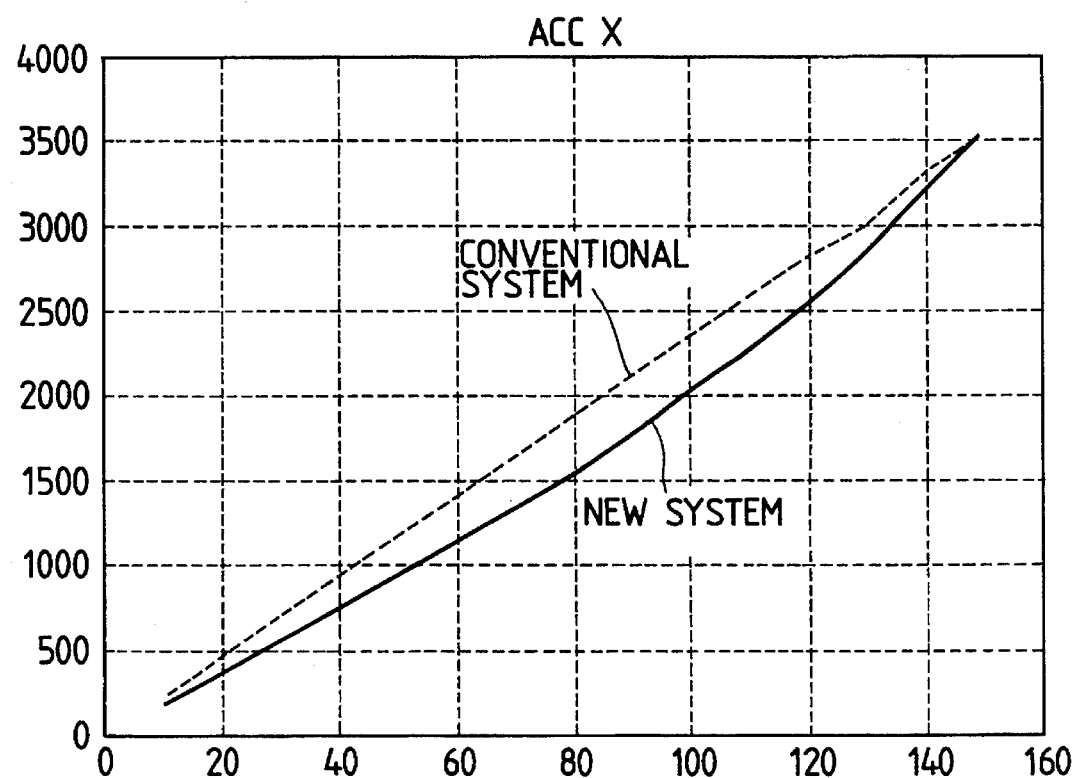
FIG. 26 is a graph showing course error characteristics in the course control apparatus in FIG. 22.

FIGS. 24 to 26 show course error characteristics in the course control apparatus shown in FIG. 22. FIG. 24 shows maximum radius error characteristics. FIG. 25 shows radius error characteristics in a normal state. FIG. 26 shows maximum acceleration characteristics. In each graph, the abscissa indicates the moving velocity.

As is apparent from these graphs, a course error (radius reduction amount) can be reduced in both a normal state and an excess state while an acceleration smaller than that in the conventional method is maintained throughout the velocity range.

In this case, position information (obtained by integrating velocity information) of each axis is used as a target value. However, velocity information of each axis may be used instead.

Fifth Embodiment

Figure 27:
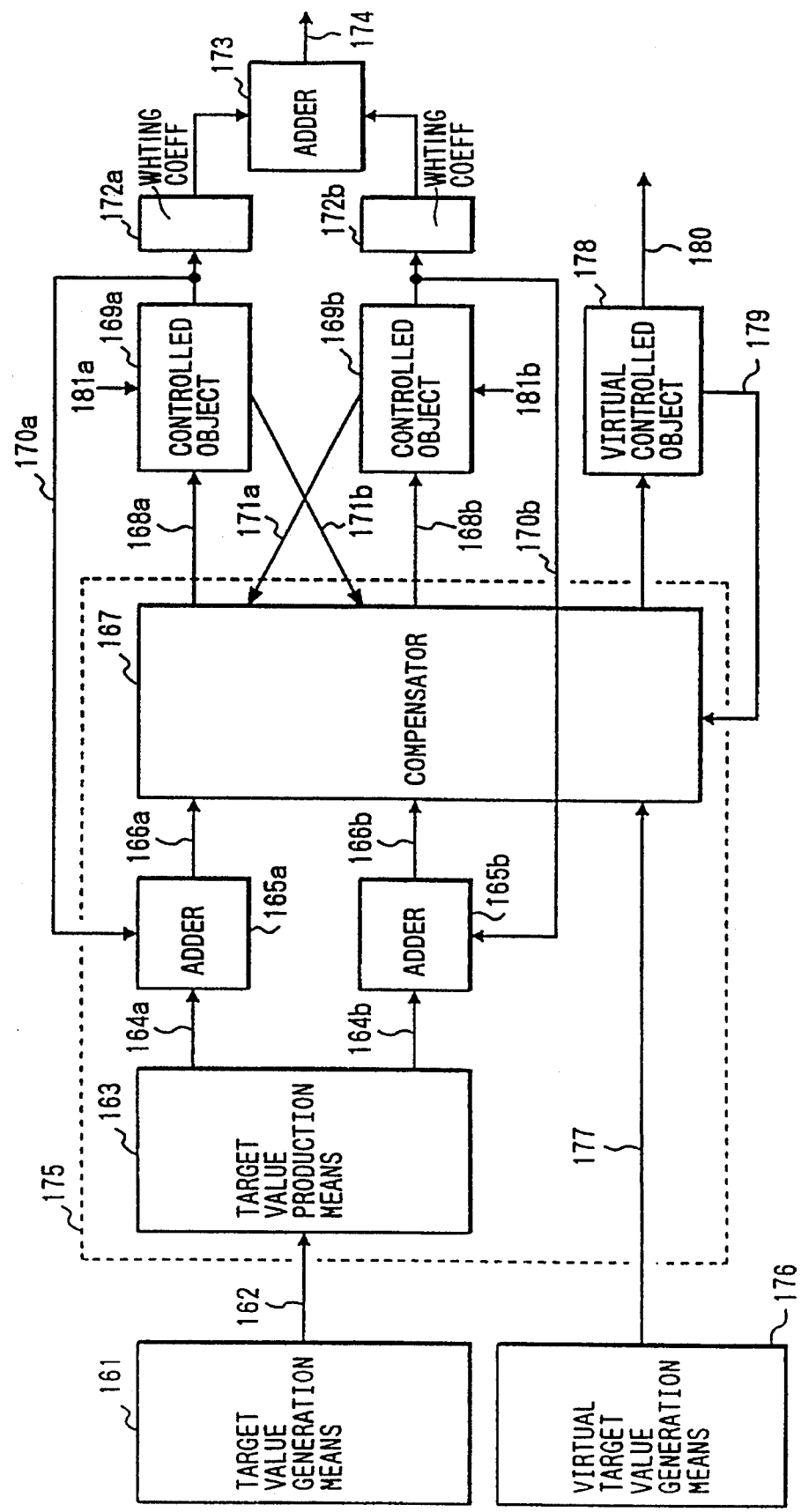
FIG. 27 is a block diagram for explaining the basic arrangement of a course control apparatus according to the fifth embodiment of the present invention.

FIG. 27 is a block diagram for explaining the basic arrangement of a course control apparatus according to the fifth embodiment of the present invention.

Referring to FIG. 27, a target value generation means 161 outputs a desired target value signal 162 to a target value production means 163 of a controller 175. The target value production means 163 produces an X axis target value 164a on the basis of the input target value signal 162, and outputs the X axis target value 164a to an adder 165a. The target value production means 163 also produces a Y axis target value 164b and outputs it to an adder 165b. The adder 165a adds the X axis target value 164a to an X axis controlled amount 170a and outputs an X axis error signal 166a to a compensator 167. The adder 165b adds the Y axis target value 164b to a Y axis controlled amount 170b and outputs a Y axis error signal 166b to the compensator 167. A virtual target value generation means 176 outputs a virtual target value to the compensator 167. A virtual controlled object 178 is set in accordance with the purpose of control of controlled objects 169a and 169b. A virtual state amount 179 of the virtual state amount 179 is input to the compensator 167 in advance. An adder 173 adds an X axis weight 172a and a Y axis weight 172b to produce a Z axis controlled amount 174.

The target value production means 163 produces the target values 164a and 164b such that the sums of the target values 164a and 164b for the respective controlled objects and the desired target value signal 162 are equal to each other. The compensator 167 includes a CPU, a ROM, and a RAM (none of which are shown) to compensate/calculate control inputs 168a and 168b for minimizing the evaluation function defined by equation (1) upon receiving the Y axis error signal 166b, the X axis error signal 166a, state amounts 171a and 171b, and the virtual state amount 179. The compensator 167 then outputs the control inputs 168a and 168b to the controlled objects 169a and 169b.

Assume that the characteristics of the controlled objects 169a and 169b and state equation X are determined as follows:

X=AX+BU

X=(X1, X2, X3, X4, X5, X6)

X1: X axis position X2: X axis velocity

X3: Y axis position X4: Y axis velocity

X5: Z axis position X6: Z axis velocity

U=(U1, U2, U3)

U1: X axis control input U2: Y axis control input

U3: Z axis control input

In this case, the X and Y axes are control axes which exist in reality, and the Z axis is represented by synthesis of the X and Y axes. The W axis is a virtual control axis which does not exist in reality. Although the W axis may exist in reality, this embodiment is characterized in that an arbitrary controlled object and an arbitrary target value which do not exist in reality are introduced in accordance with the purpose of control, and the characteristics of the W axis are set to be the same as those of the X axis. Assume that a target value for the W axis is at the position of "0" at a start point and moves to a certain position at a constant velocity, and target values for the X and Y axes start to move therefrom. The position of the W axis is held while the target values for the X and Y axes move. The W axis returns to the position of "0" at the same velocity as that in the starting operation when the target values for the X and Y axes stop. In addition, assume that in the fifth embodiment, the target value for the Y axis is always "0".

Figure 28:
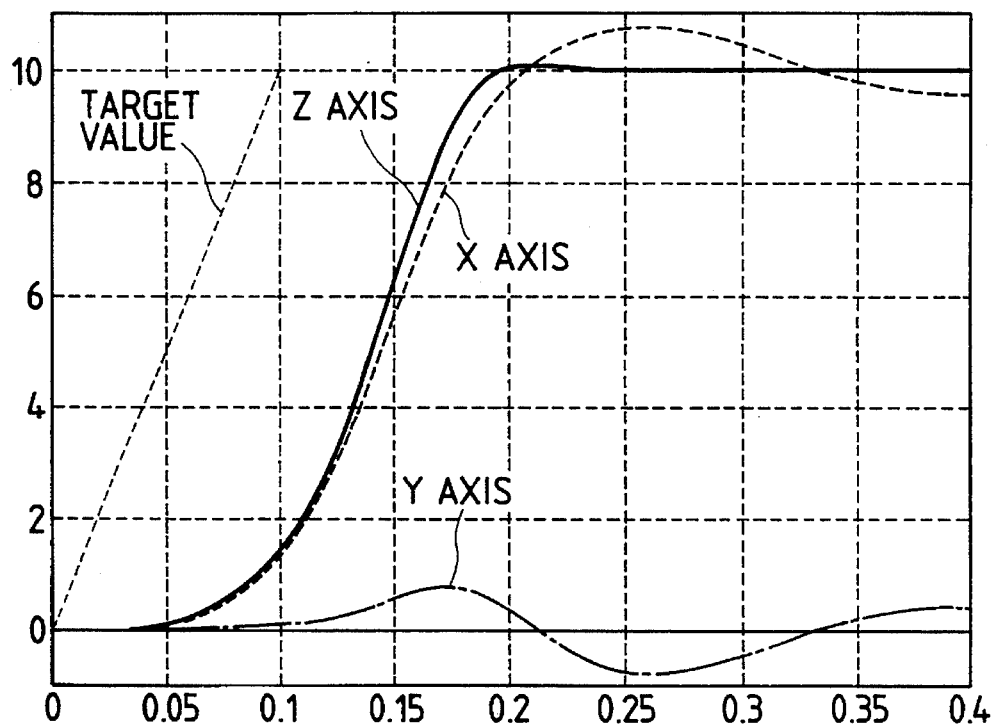
FIG. 28 is a graph showing the response characteristics of the respective axes with respect to ramp target values in the course control apparatus in FIG. 27.
Figure 36:
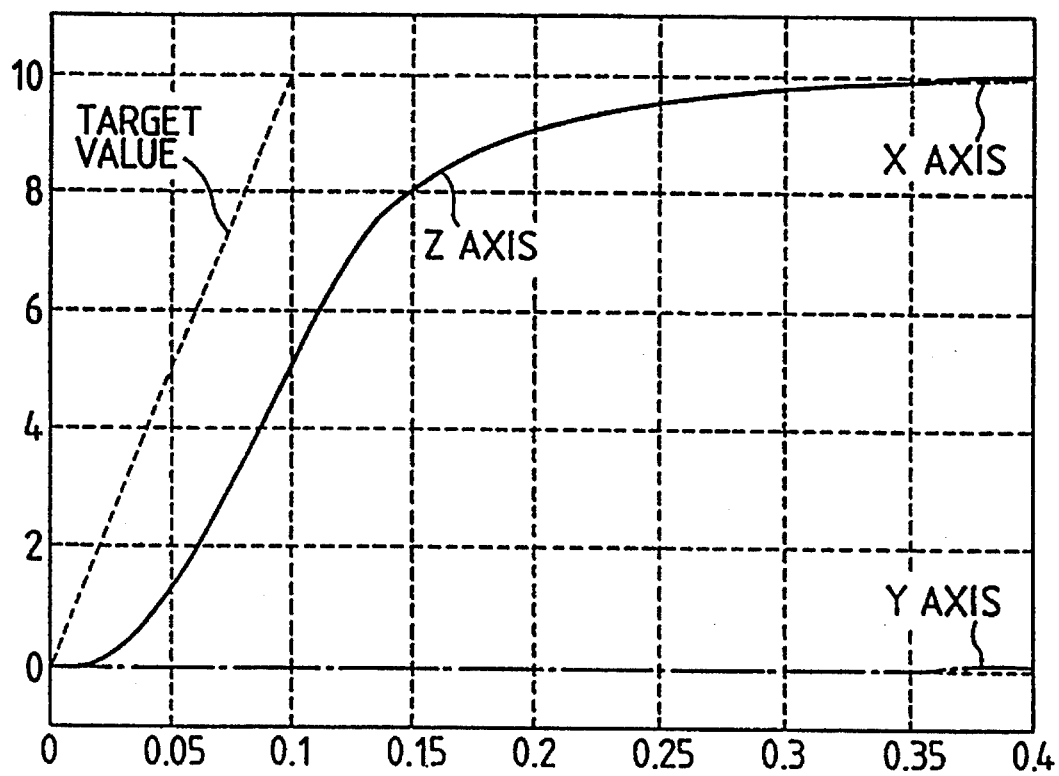
FIG. 36 is a graph showing the response characteristics of the axial feed control system of the position control apparatus in FIG. 35.
Figure 37:
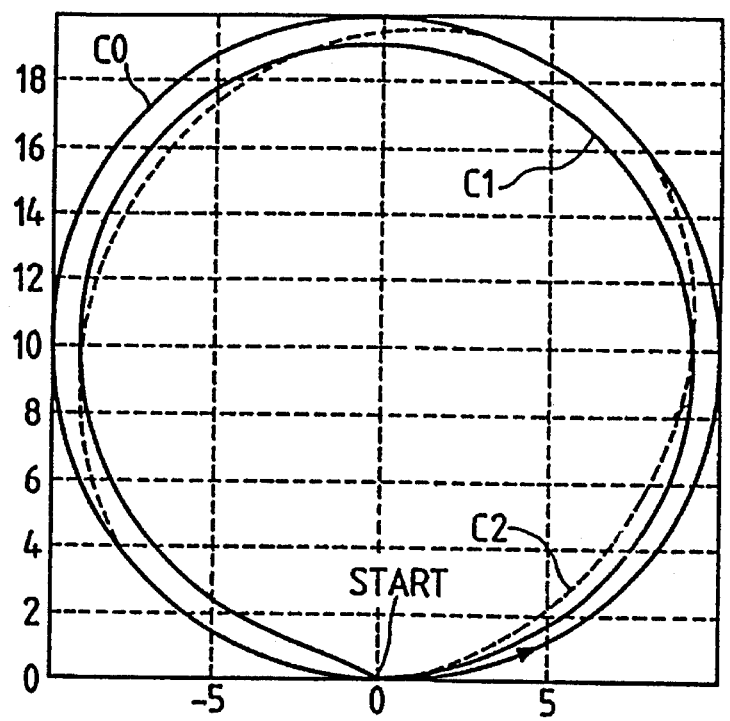
FIG. 37 is a chart showing traces drawn by an X-Y plotter with two orthogonal axes to which a conventional position control method is applied.

With the above-described arrangement of the course control apparatus and calculation of control inputs for minimizing the evaluation function, the response characteristics of each axis with respect to a target value in the form of a ramp such as the one shown in FIG. 28 are greatly improved as compared with the prior art (see FIG. 36).

Note that the conventional scheme requires 36 (msec) for settling to 0.2% of a command value, whereas the embodiment requires 24 (msec) for settling. In addition, the weighting coefficients 172a and 172b are set to make the maximum accelerations in the embodiment coincide with those in the prior art. The reason why the embodiment and the prior art are compared with each other upon setting the same maximum accelerations is that setting of the same accelerations means that the power consumption of each motor driver in the embodiment is the same as that in the prior art, provided that disturbances, friction, and the like are neglected. If the control inputs 168a and 168b are output from the compensator 167, positioning control associated with axial feed of, e.g., a machine tool can be performed by a driver with the same capacity at a higher speed. In addition, as described above, an acceleration causes vibration of a mechanical system. In the embodiment, however, since the maximum accelerations are the same as those in the conventional control system, positioning control can be performed at a high speed while the mechanical vibration is maintained at the same level as that of the conventional control system.

A state of variation in control characteristics in a case where two spatial reality axes and one virtual axis are controlled will be described below with reference to FIGS. 29 and 30.

Figure 29:
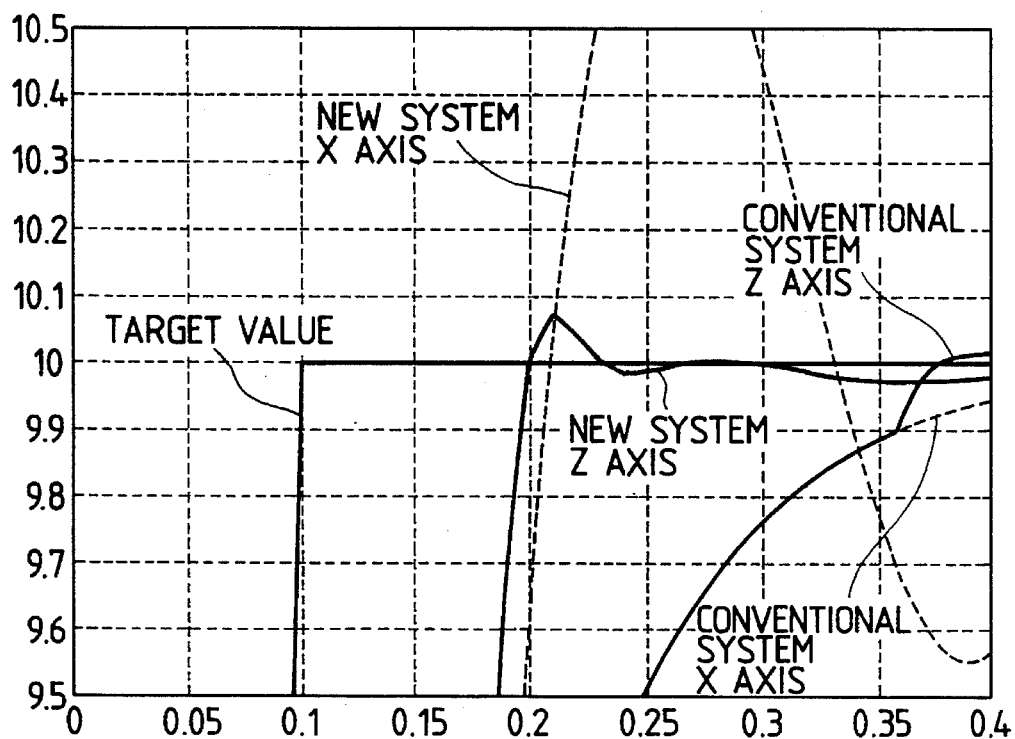
FIG. 29 is a graph showing response characteristics with respect to target values in the course control apparatus in FIG. 27.

FIG. 29 shows response characteristics with respect to a target value in the course control apparatus shown in FIG. 27. Referring to FIG. 29, the abscissa indicates time; and the ordinate, a moving amount.

As shown in FIG. 29, the time required for convergence to a target value for the X axis is greatly shortened as compared with the conventional scheme.

As shown in FIG. 29, therefore, by controlling a target command value for the virtual W axis, a response which causes overshoot (see a response characteristic curve C4) can be converted into a response which causes almost no overshoot (see a response characteristic curve C3), thus greatly improving the control characteristics.

Figure 30:
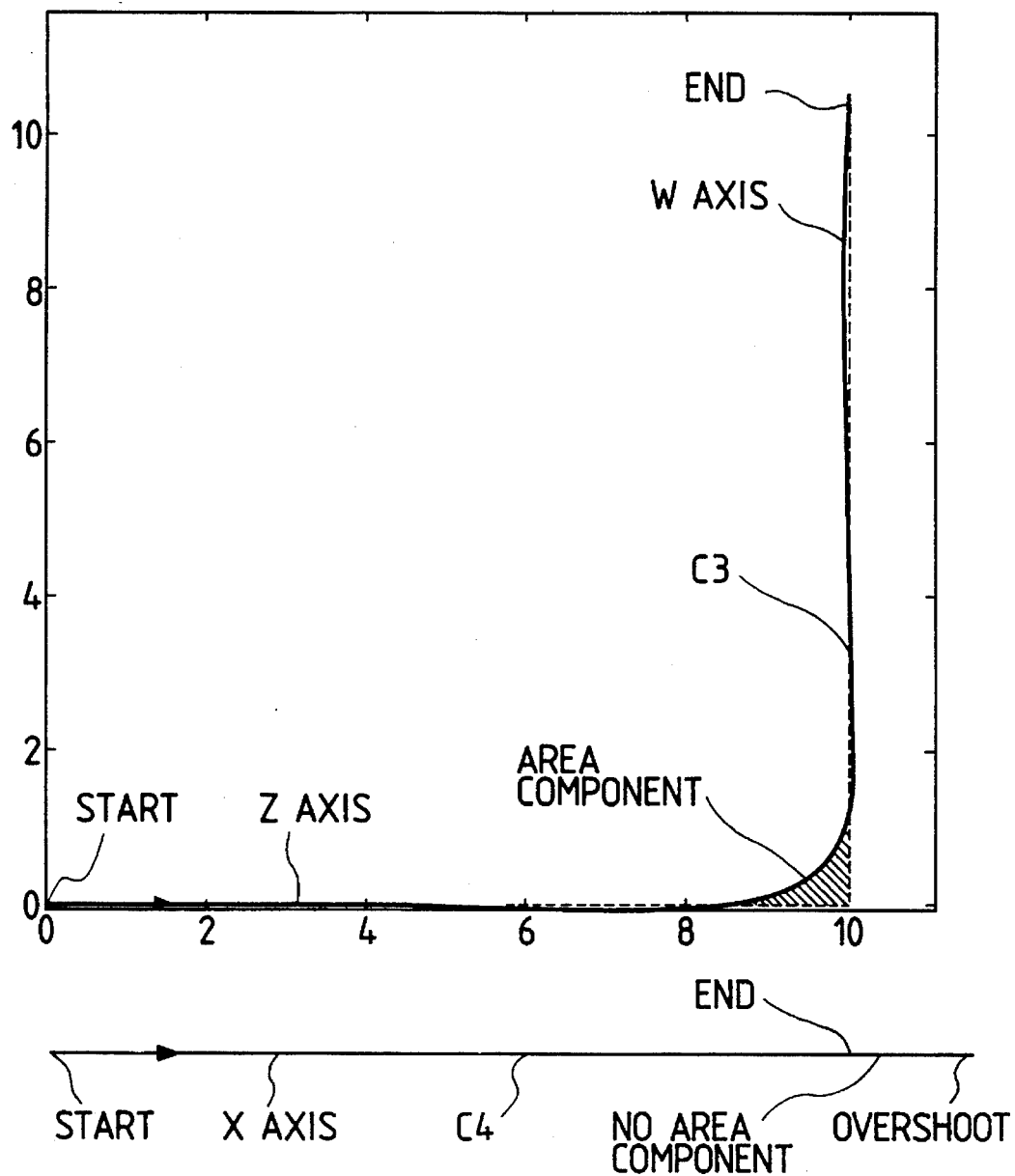
FIG. 30 is a chart showing a physically analyzed state of the response characteristics shown in FIG. 29.
Figure 31:
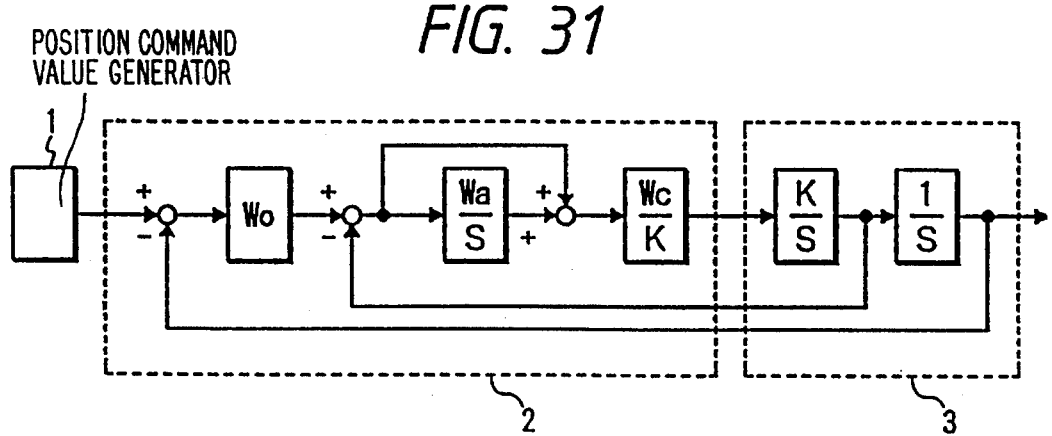
FIG. 31 is a block diagram showing a position control system model of a machine tool.
Figure 32:
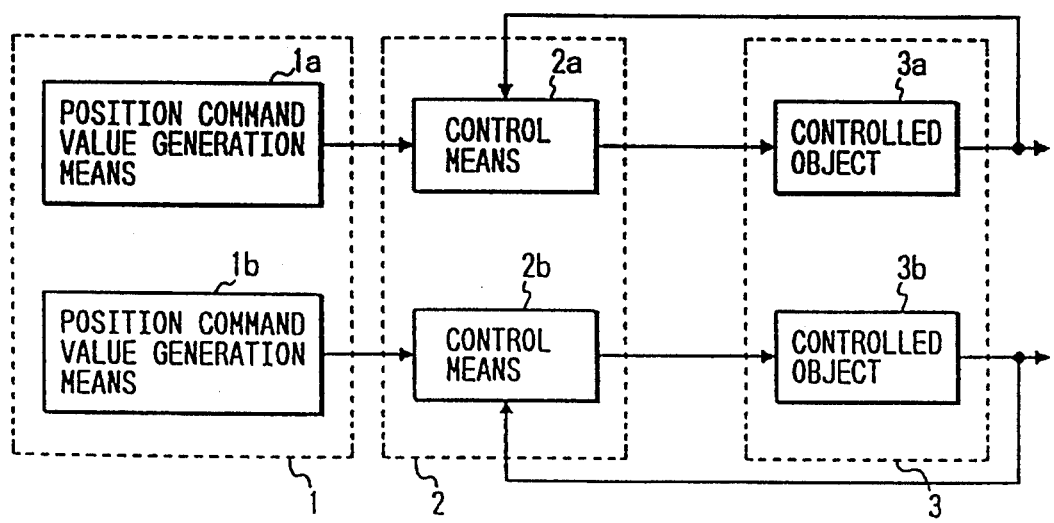
FIG. 32 is a block diagram showing the loop control arrangement of a conventional two-axis system position control apparatus.
Figure 33:
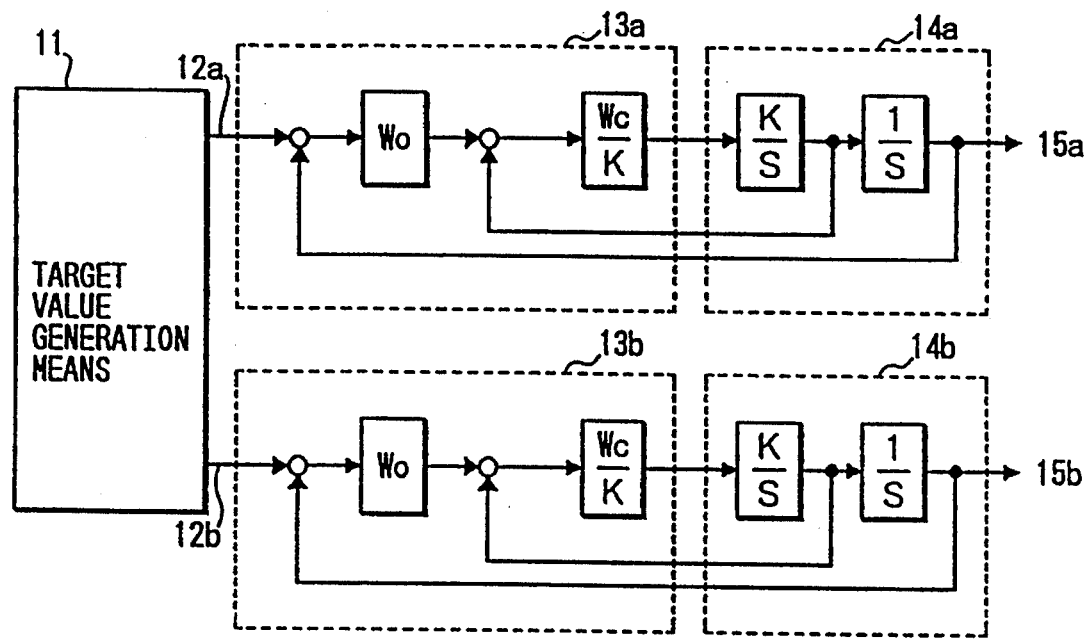
FIG. 33 is a block diagram showing a position control system model of a conventional numerical control apparatus.
Figure 34:
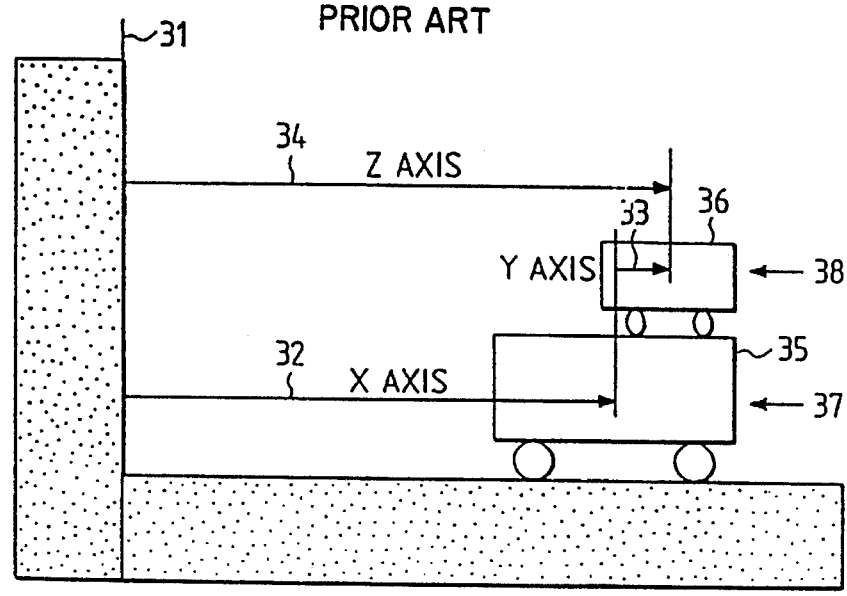
FIG. 34 is a schematic view showing an axial feed control system of a conventional position control apparatus.
Figure 35:
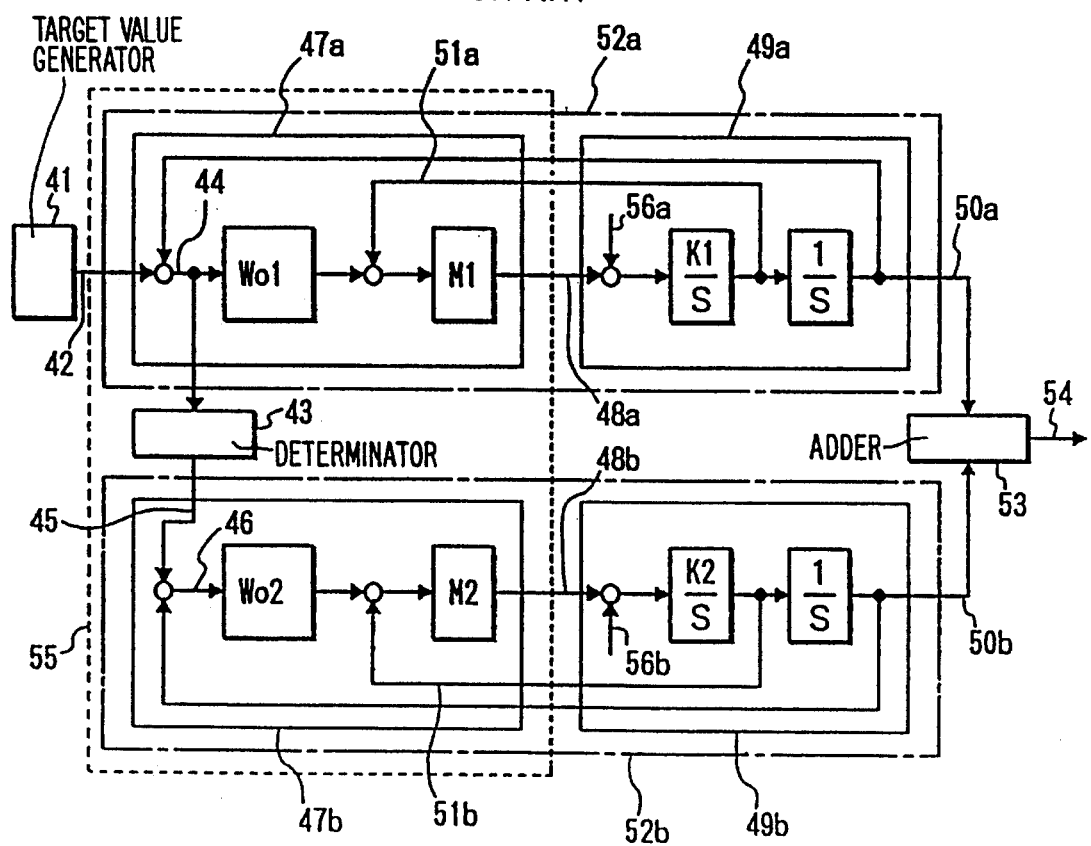
FIG. 35 is a block diagram showing a control arrangement in the axial feed control system of the position control apparatus in FIG. 34.

FIG. 30 is a graph showing a physically analyzed state of the response characteristics shown in FIG. 29. Referring to FIG. 30, the abscissa indicates the virtual axis; and the ordinate, the reality axis.

As shown in FIG. 30, the response characteristic curve C4 in a virtual space is a target course having a line segment moving from the left to the right on the reality axis (X axis), and the response characteristic curve C3 is a target course curving at a right angle in the virtual space defined by the reality axis (X axis) and the virtual axis (W axis). Note that since each of weighting functions Q and X in an evaluation function includes either $|e|^2*|\Delta R|^2-(e,\Delta R)^2$ or $|e|^2*|\Delta y|^2-(e,\Delta y)^2$, or an element term mathematically equivalent thereto, control is performed to reduce the area component, of the response characteristic curve C3, which is indicated by the hatching. For this reason, overshoot can be eliminated from the response of the reality axis Z.

In contrast to this, when the response characteristic curve C4 follows up the target course whose line segment is simply moved, even if overshoot occurs on the line segment, the area component is zero, and the overshoot cannot be eliminated. Therefore, the follow-up characteristics with respect to a target value in the control system are poor.

The above-described embodiment exemplifies the control system in a position control apparatus. However, the present invention can be applied to velocity control. That is, the synthetic velocity of a rotation system X axis with a high speed and coarse control precision and a rotation system Y axis with a low speed and fine control precision can be accurately controlled. Furthermore, target values are not limited to above-mentioned position and velocity, and temperature data may be used as a target value. For example, the X and Y axes may be replaced with a heater having a large capacity and a heater having a small capacity, respectively, so as to perform temperature control with high precision.

As described above, according to the composite system course control method of the present invention, target values for moving controlled objects as reality axes and a virtual target value for moving a virtual controlled object as a virtual axis based on the reality axes are produced, and control inputs and a virtual control input which optimize a predetermined first evaluation function are calculated upon reception of the produced virtual target value, the produced target values, a virtual state amount from the virtual controlled object, state amounts from the controlled objects, the first disturbance signal for the virtual controlled object, and the second disturbance signal for the controlled objects. The calculated control inputs and the calculate virtual control input are respectively output to the controlled objects and the virtual controlled object, thereby minimizing the course error without changing the maximum accelerations with respect to disturbances.

According to the composite system course control apparatus of the present invention, when the target value production means produces target values for moving controlled objects as reality axes and a virtual target value for moving a virtual controlled object as a virtual axis based on the reality axes, the control means calculates control inputs and a virtual control which optimize a predetermined first evaluation function upon receiving the produced virtual target value, the produced target values, a virtual state amount from the virtual controlled object, state amounts from the controlled objects, the first disturbance signal for the virtual controlled object, and the second disturbance signal for the controlled objects. The control means then outputs the calculated control inputs and the calculate virtual control input to the controlled objects and the virtual controlled object, respectively. With this operation, control inputs which minimize the course error without changing the maximum accelerations with respect to disturbances can be output.

When the target production means produces target values for moving a plurality of controlled objects by desired amounts, the control means calculates control inputs for optimizing a predetermined second evaluation function upon receiving the target values, state amounts from the controlled objects, and disturbance signals for the controlled objects. The control means then outputs the control inputs to the controlled objects. With this operation control inputs for minimizing the course error can be output.

Since the first and second evaluation functions include the first or second weighting function component for evaluating a course error, a follow-up operation with respect target values can be performed at a high speed without increasing the accelerations.

In addition, when the target value production means produces target values for moving a plurality of controlled objects by desired amounts, the target value conversion means converts the produced target values into new target values and outputs them to the control means. The control means calculates control inputs for optimizing the predetermined second evaluation function upon receiving the converted target values, state amounts from the controlled objects, and disturbances acting on the controlled objects. The control means then outputs the control inputs to the controlled objects, thereby minimizing the course error without increasing the accelerations.

Therefore, high-speed, high-precision course control can be performed without increasing the loop gain of each control system.

Sixth Embodiment

Figure 39:
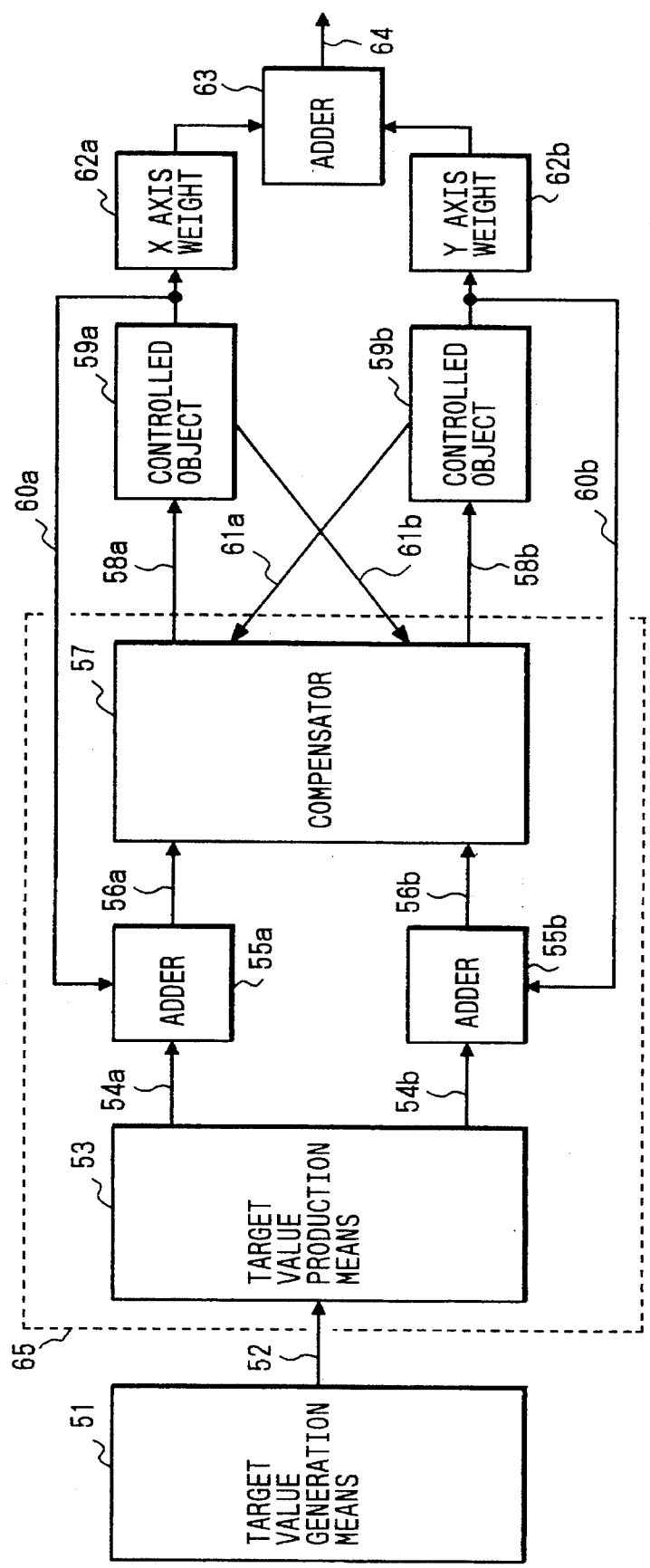
- FIG. 39 is a block diagram for explaining the arrangement of a composite system control apparatus according to the sixth embodiment of the present invention.
Figure 40:
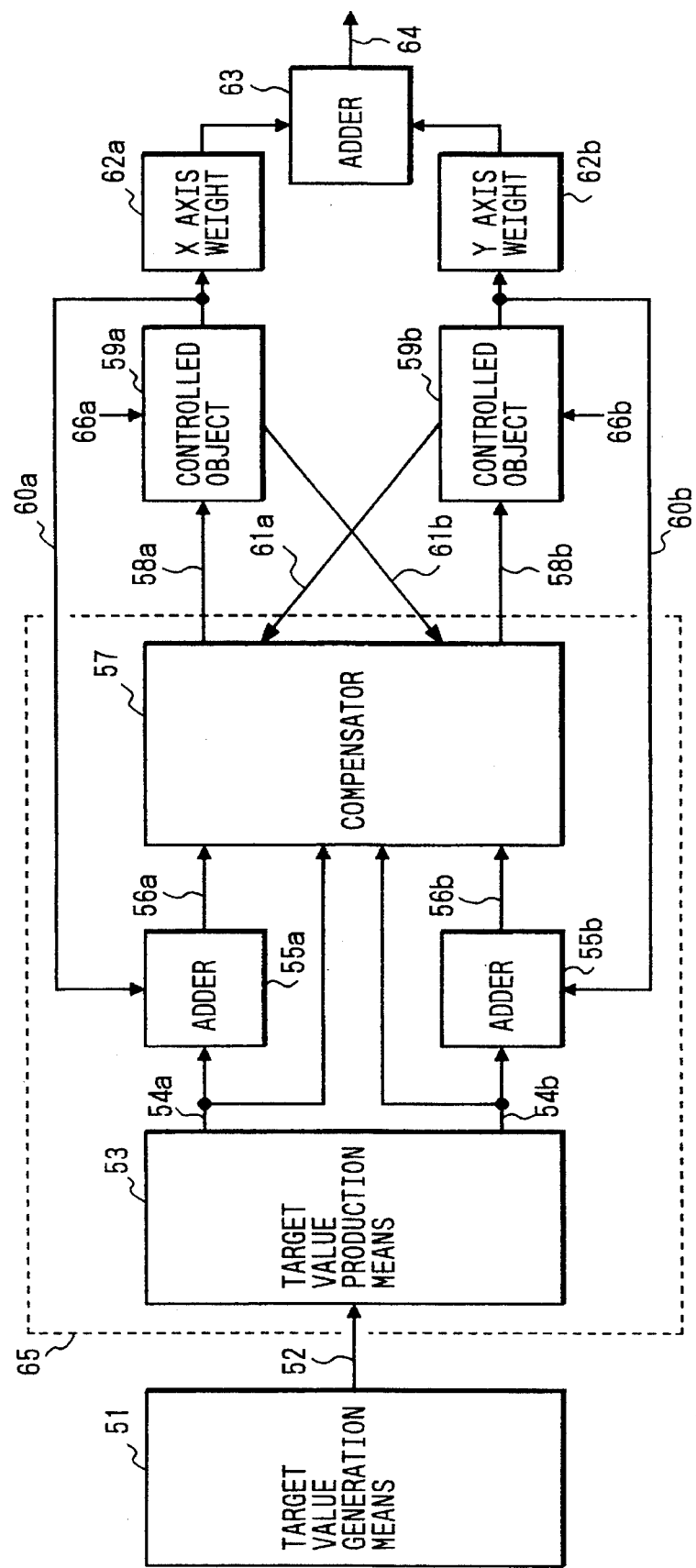
FIG. 40 is a block diagram for explaining the arrangement of the composite system control apparatus according to the sixth embodiment of the present invention.

FIGS. 39 and 40 are block diagrams for explaining the arrangement of a composite system control apparatus, e.g., a position control apparatus, according to the sixth embodiment of the present invention. Note that the data processing section of a control system based on a predetermined evaluation function may be constituted by a logic circuit, software (including hardware, e.g., a CPU, a ROM, and a RAM, and designed to execute various types of firmware read out from the ROM), or a combination thereof.

Referring to FIG. 39 or 40, a target value generation means 51 outputs a desired target value signal 52 to a target value production means 53 of a controller 65. The target value production means 53 produces an X axis target value 54a and a Y axis target value 54b on the basis of the input target value signal 52, and outputs the target values to adders 55a and 55b, respectively. The adder 55a adds the X axis target value 54a and an X axis controlled amount 60a to output an X axis error signal 56a to a compensator 57. The adder 55b adds the Y axis target value 54b and a Y axis controlled amount 60b to output a Y axis error signal 56b to the compensator 57.

Note that the target value production means 53 produces the target values 54a and 54b such that the sum of the target values 54a and 54b for the respective controlled object and the desired target value signal 52 becomes equal to each other.

The compensator 57 produces an X axis control input 58a and a Y axis control input 58b upon receiving the X axis error signal 56a, the Y axis error signal 56b, an X axis state amount 61a, and a Y axis state amount 61b. The compensator 57 then outputs the control inputs to controlled objects 59a and 59b, respectively.

In this manner, in the controller 65, control systems are arranged to optimize (minimize) evaluation functions based on the following equations (6) to (8), and the compensator 57 determines control inputs which minimize a predetermined evaluation function (to be described later) in consideration of error signals associated with the respective control systems, thereby enabling control with response speed far superior to that of the prior art.

A Z axis 64 as the final controlled amount is an axis represented by synthesis (sum $Z=X+Y$ in this embodiment) of the X axis controlled amount 60a and the Y axis controlled amount 60b.

The target value 52 for the Z axis is converted into the target value 54a for the X axis and the target value 54b for the Y axis by the target value production means 53. As the target value 54a for the X axis, the target value for the Z axis is directly used, while the target value 54b for the Y axis is set to be "0". The respective error signals 56a and 56b as position errors are produced from the target values 54a and 54b for the X and Y axes and the positions 60a and 60b as the X and Y controlled amounts. The X and Y axis control inputs 58a and 58b are produced on the basis of the error signals 56a and 56b and the X and Y axis state amounts 61a and 61b (corresponding to the velocities of the X and Y axes in the embodiment).

Note that equation (8) is mathematically converted from equation (7), and an equivalent relationship can be established therebetween.

An adder 63 adds an X axis weight 62a and a Y axis weight 62b to produce and output a Z axis controlled amount 64. The above-mentioned control inputs 58a and 58b respectively include the sums of terms obtained by multiplying weights and errors 56 for the respective controlled objects, which errors are based on the target values 54a and 54b for the respective controlled objects, obtained from the target value 52, and the corresponding controlled amounts 60a and 60b. In addition, the control inputs 58a and 58b respectively include the sums of terms obtained by multiplying the state amounts 61a and 61b for the respective controlled objects by weights.

In the composite system control apparatus having the above-described arrangement, when the respective addition means (adders 55a and 55b) add controlled amounts from the controlled objects of the respective control systems and target value signals and output error signals for the respective control systems to the compensation means (compensator 57). The compensation means then calculates and outputs control inputs for the respective controlled objects, which inputs optimize the first evaluation function (equations (6) to (9) to be described later), while causing the error signals output from these addition means (adders 55a and 55b) and the controlled amounts output from the controlled objects to interfere with each other. With this operation, the response speed with respect to controlled amounts of a composite purpose can be increased without increasing the gain of each control system.

$$J_{(k)} = \sum_{i=k}^{i=k+M} \{(R_{(i)} - y_{(i)})^T Q_{(i)} (R_{(i)} - y_{(i)}) + U_{(i)}^T H_{(i)} U_{(i)}\} \quad (6)$$

where R is the target value vector, y (=CX) is the output vector, X is a state vector, U is the control input vector, k is time, M is the integration time, and Q and H are weighting functions.

$$J_{(t)} = \int_{t}^{t+t_M} \{(R_{(\tau)} - y_{(\tau)})^T Q_{(\tau)} (R_{(\tau)} - y_{(\tau)}) + U_{(\tau)}^T H_{(\tau)}\} d\tau \quad (7)$$

The same symbols in equation (7) indicate the same values as in equation (6). In equation (7), $t_M$ is the integration time. The present invention can be applied to the above-described method regardless of whether the control time in the evaluation function equation in the embodiment is given as a time integration form of a time interval between the current time and a finite elapsed time or a time integration form of infinite time.

$$J_{(k)} = \sum_{j=k}^{k+M} \{q_1 * e_{i(j)}^2 + q_2 * e_{2(j)}^2 + (q_3 * e_{1(j)} + q_4 * e_{2(j)})^2 + h_1 * u_{1(j)}^2 + h_2 * u_{2(j)}^2\} \quad (8)$$

where $e_{(j)}$ is the position error term.

Evaluation function equations (6) to (8) include each term indicated by equation (9). In addition, the target value production means 53 outputs either or both of the target values 54a and 54b as "0".

$$EA_i * |e_i|^2 + (EB_i * e_i)^2 \quad (9)$$

where i is the index (i=1, 2, ..., N) of a controlled amount 60, N is the maximum number of controlled amounts 60, $e_i$ is the error signals 56a and 56b based on the differences between the target values 54a and 54b and the controlled amounts 60a and 60b, and $A_i$ and $B_i$ are the weighting coefficient determined in accordance with the purpose of control. As an evaluation function equation, a quadratic evaluation function equation may be used as long as a weighting function of the quadratic evaluation function equation is represented by a target value function.

Figure 41:
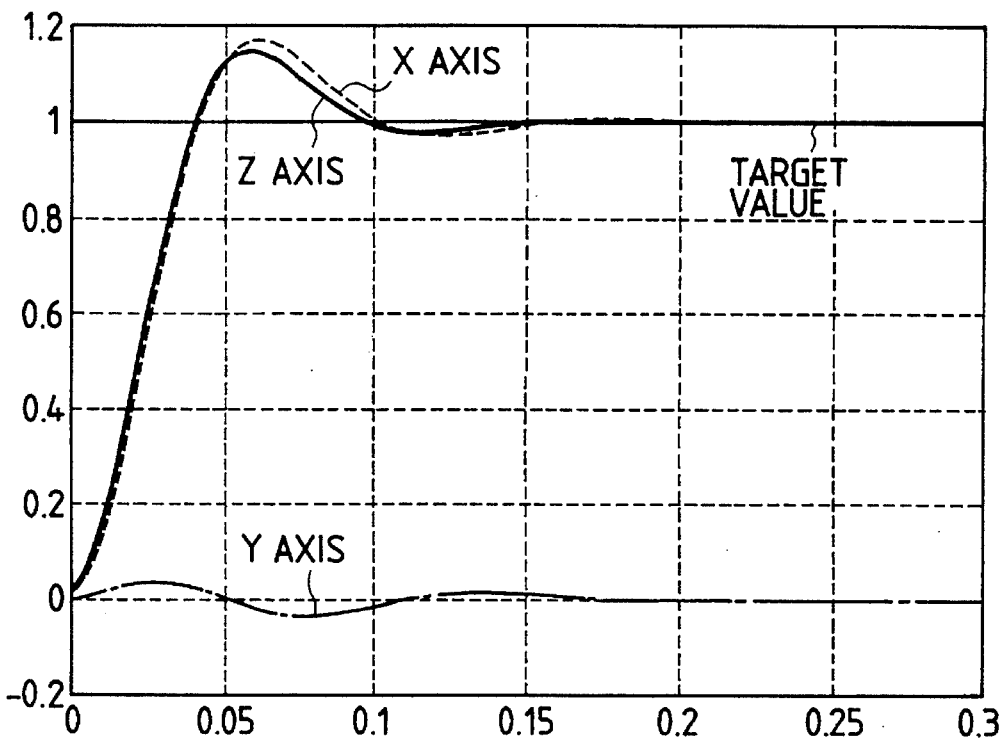
FIG. 41 is a graph showing the control response characteristics of the composite system shown in FIGS. 39 and 40.

With this method, the control response characteristics of the composite system shown in FIGS. 39 and 40 are improved, as shown in FIG. 41.

FIG. 41 is a graph showing the control response characteristics of the composite system shown in FIGS. 39 and 40. Referring to FIG. 41, the abscissa indicate time (sec); and the ordinate, a control amount.

As shown in FIG. 41, if the controller 65 is designed to minimize the above-described evaluation functions, the X and Y axes move in phase. As a result, the Z axis approaches a target value at a high speed. At the time of convergence, the X and Y axes move in opposite phases so that the Y axis reduces the vibration of the X axis. As a result, the Z axis does not easily depart from a target value. Since the X and Y axes interfere with each other in this manner, excellent control response speed can be achieved.

Figure 42:
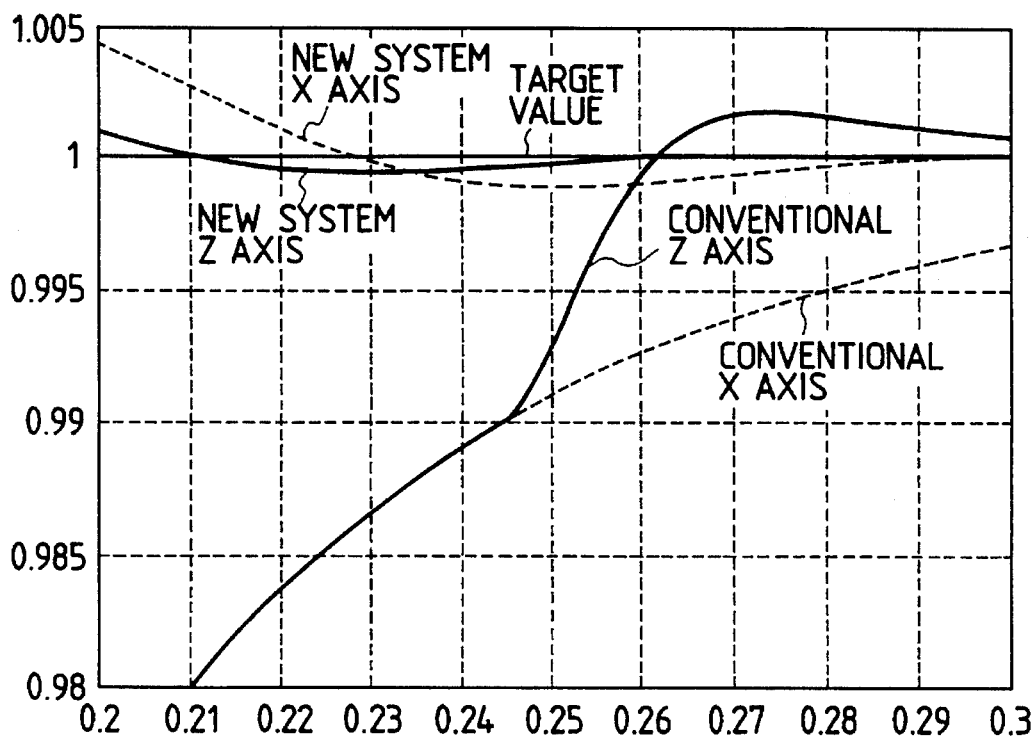
FIG. 42 is a graph showing the convergence characteristics of the composite system in FIGS. 39 and 40 with respect to target values.

FIG. 42 is a graph showing the convergence characteristics of the composite system with respect to target values. More specifically, FIG. 42 shows the convergence characteristics of the X and Y axes in comparison with those of the X and Y axes in the prior art.

In the embodiment, the maximum accelerations are 1,600 (rad/sec$^2$) for the X axis and 188 (rad/sec$^2$) for the Y axis, which are not much different from those in the prior art. However, the time required for the Z axis to reach 0.1% of the target value is about 20 (msec), which is shorter than that in the prior art by about 10 (msec).

Figure 49:
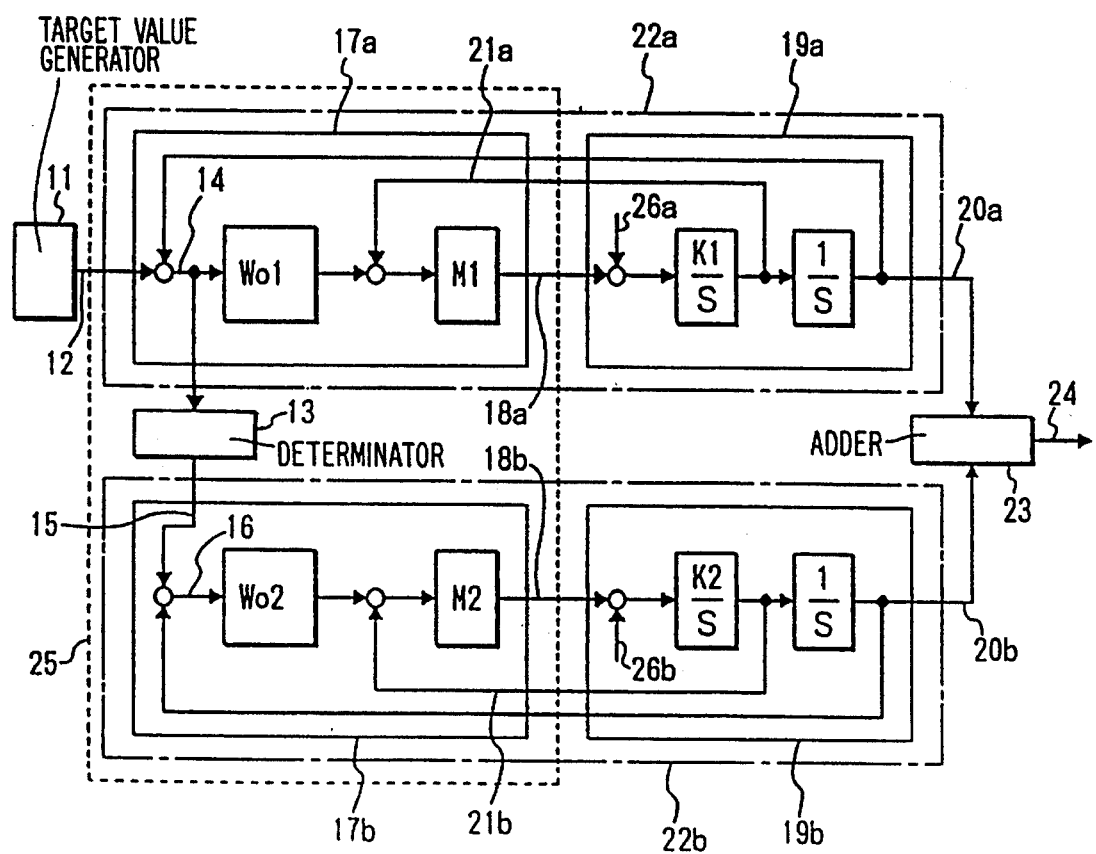
FIG. 49 is a block diagram showing the second control arrangement in the axial feed control system of the position control apparatus shown in FIG. 45.
Figure 50:
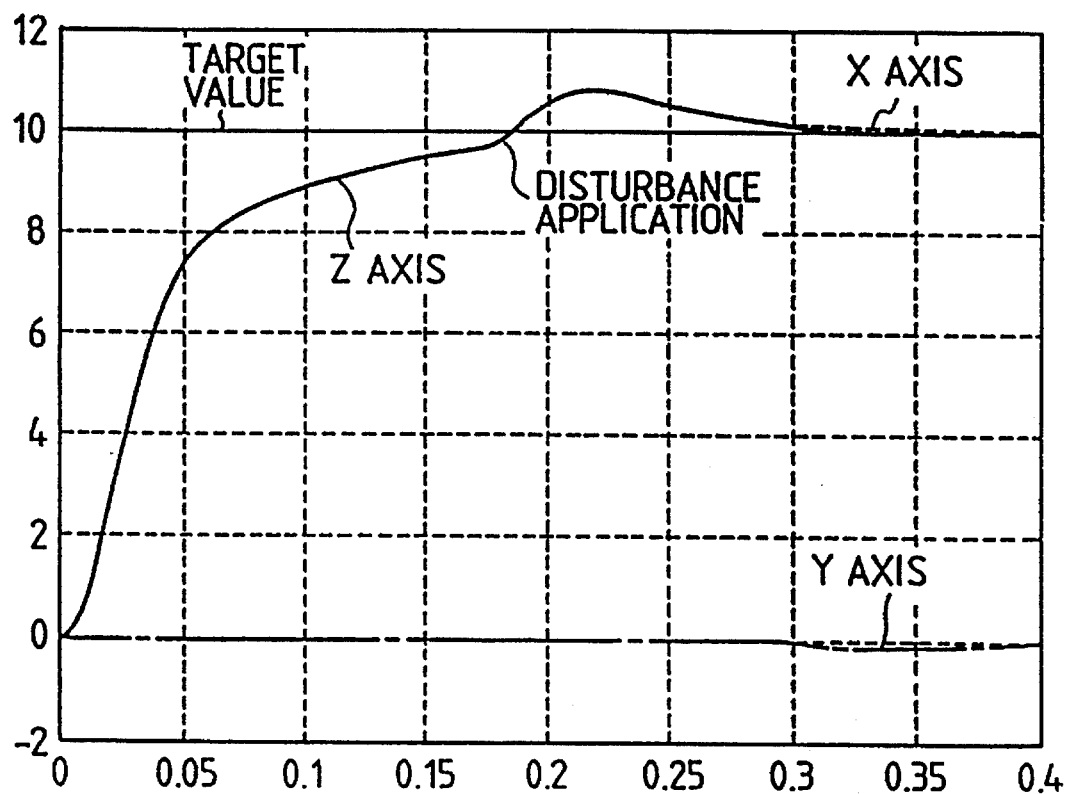
FIG. 50 is a graph showing the behavior of the axial feed control system of the position control apparatus shown in FIG. 46 with respect to disturbances.

Although the above-described embodiment exemplifies the control system to which no disturbances are applied. However, as shown in FIG. 49, the present invention can be applied to a composite system control apparatus to which disturbances 26a and 26b are applied.

In this case, each of the control inputs 58a and 58b input from the compensator 57 to the controlled objects 59a and 59b includes a sum $U_{(j)}$ of terms of inputs multiplied by weights $K_{(j)}$ of equation (10) (to be described later).

In the composite control system control apparatus having the above-described arrangement, when the respective addition means add controlled amounts from the respective controlled objects and target value signals and output error signals for the respective control systems to the compensation means (compensator 57), the compensation means calculates control inputs for optimizing the second evaluation function (equation (10) or the like (to be described later)) and outputs them to the respective controlled objects, while causing the error signals output from the addition means (adders 55a and 55b), the controlled amounts output from the controlled objects, and either or both of the disturbances applied to the controlled objects to interfere with each other. With this operation, stationary errors caused by disturbances acting on controlled amount of a composite purpose can be converged at a high speed.

In addition, the compensation means calculates and outputs control inputs for compensating the characteristics of the respective controlled objects on the basis of the integral values of error signals from the respective addition means or values obtained by multiplying the integral values by predetermined weights. Therefore, stationary errors caused by stepwise disturbances can be quickly eliminated.

$$U_{(j)} = K_{1(j)} * e_{(j)} + K_{2(j)} * Ee_{(j)} + K_{3(j)} * X_{(j)} + K_{4(j)} * R_{(j)} \quad (10)$$

In equation (10), the sum $U_{(j)}$ is constituted by a term obtained by multiplying the position error term $e_{(j)}$ by the weight $K_{1(j)}$, a term obtained by multiplying a term, obtained by integrating the position error term $e_{(j)}$, by the weight $K_{2(j)}$, a term obtained by multiplying the state amount $x_{(j)}$ of each axis by the weight $K_{3(j)}$, and a term obtained by multiplying the target value $R_{(j)}$ for each axis by the weight $K_{4(j)}$.

Figure 43:
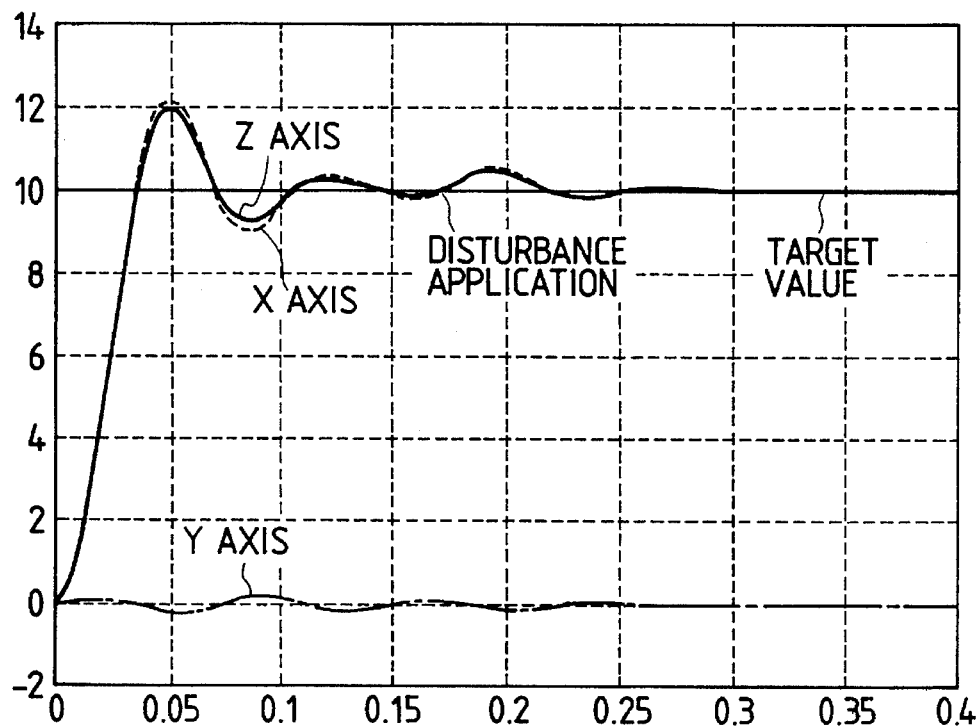
FIG. 43 is a graph showing step response convergence characteristics at the time of disturbance application in the composite system control apparatus according to the present invention.

Assume that the compensator 57 determines the control inputs 58a and 58b to be input to the respective controlled objects 59a and 59b upon multiplication of the weights $K_{(j)}$ in this manner. In this case, it is apparent that if stepwise disturbances are applied, as shown in FIG. 43, the compensator 57 outputs the control input 58a for allowing the control system for the X axis to cancel the influence of the disturbances. In this embodiment, in order to also allow the control system for the Y axis to quickly cancel the disturbances acting on the control system for the X axis, the compensator 57 outputs the control inputs 58a and 58b including terms obtained by multiplying the state amounts 61a and 61b of the respective axes by the weight $K_{3(j)}$ to the controlled objects 59a and 59b. Therefore, disturbances can be converted at a very high speed, as compared with the step response characteristics of the prior art with respect to disturbances, without increasing the gain of the control system for each axis of the controller. With this operation, stationary errors caused by stepwise disturbances can be eliminated. In addition, since the two control systems interfere with each other with respect to disturbances acting on one of the systems, the influence of disturbances on target controlled amounts can be quickly eliminated.

Figure 44:
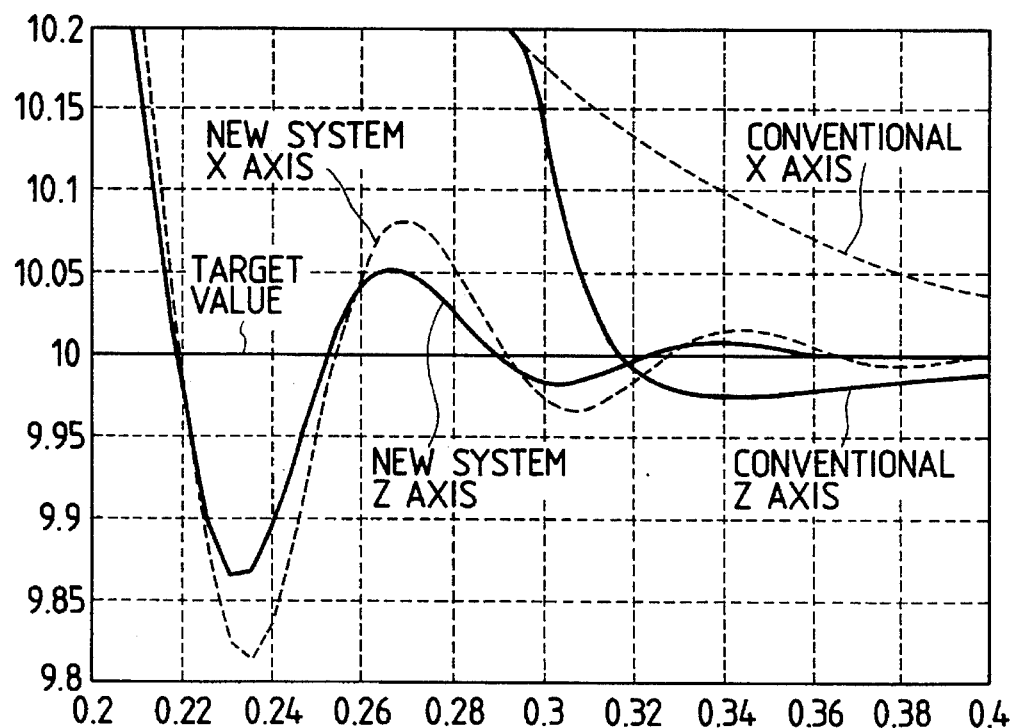
FIG. 44 is a graph showing convergence characteristics with respect to target values at the time of disturbance application in the composite system control apparatus according to the present invention.
Figure 45:
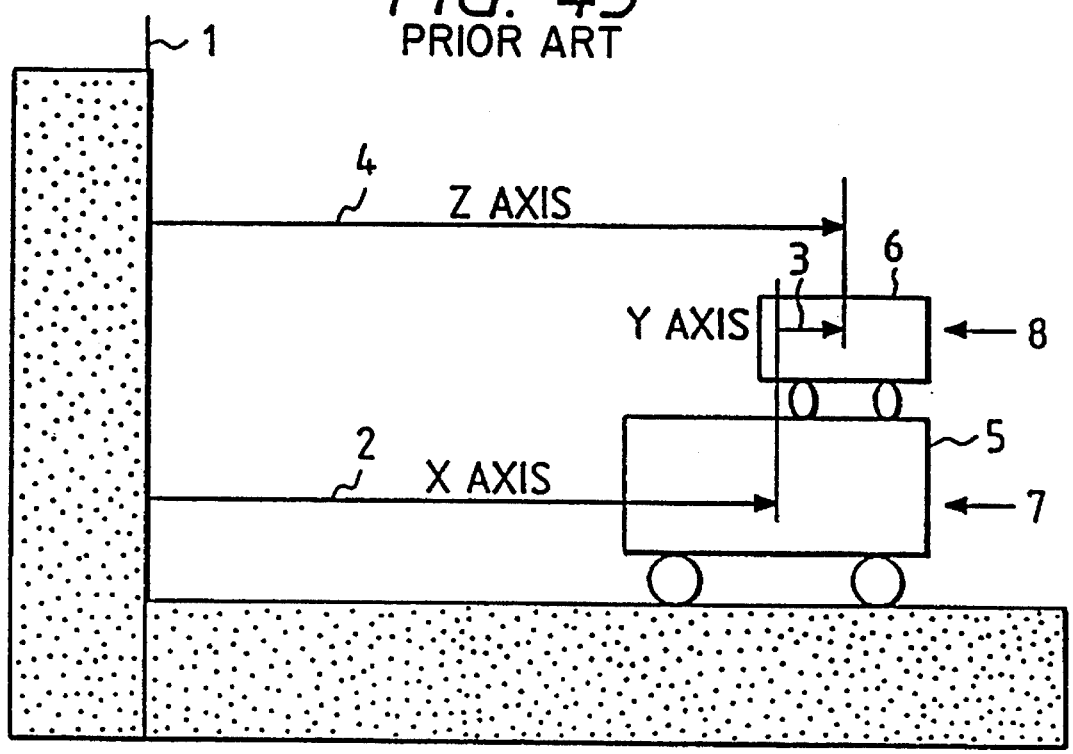
FIG. 45 is a schematic view showing an axis feed control system of a conventional position control apparatus.
Figure 46:
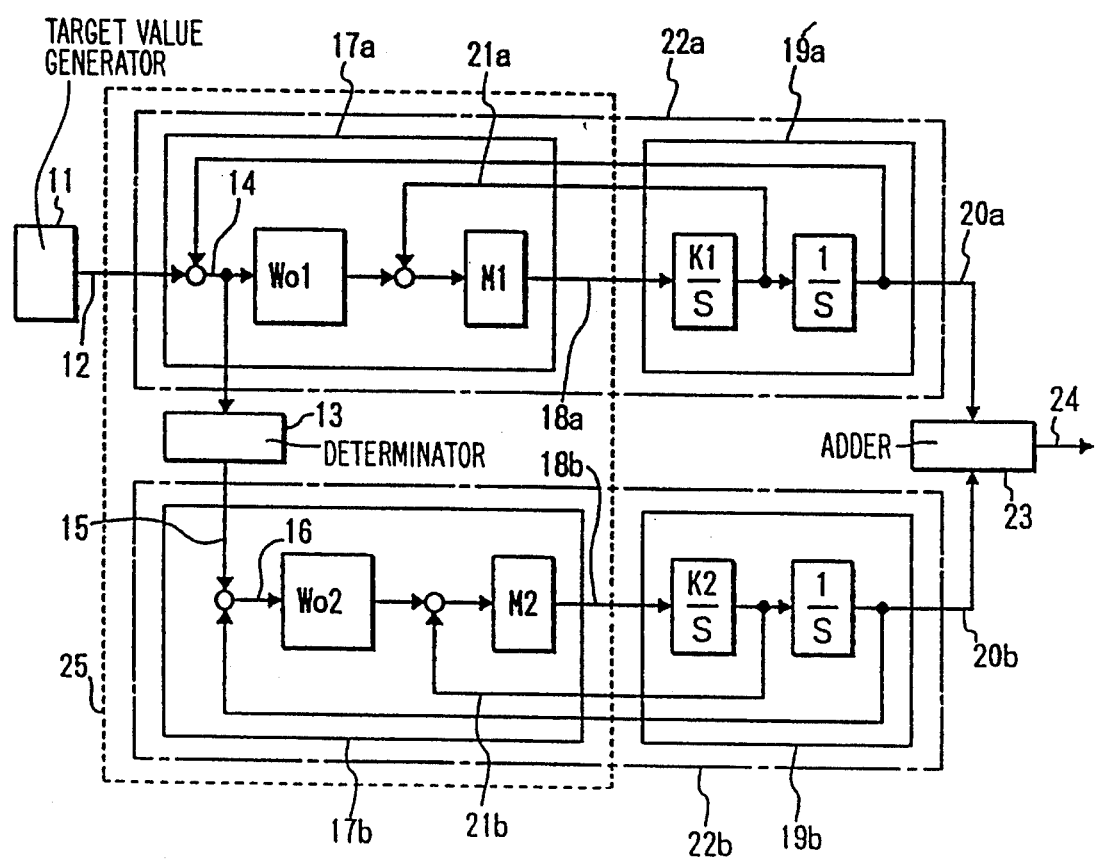
FIG. 46 is a block diagram showing the first control arrangement in the axial feed control system of the position control apparatus shown in FIG. 45.
Figure 47:
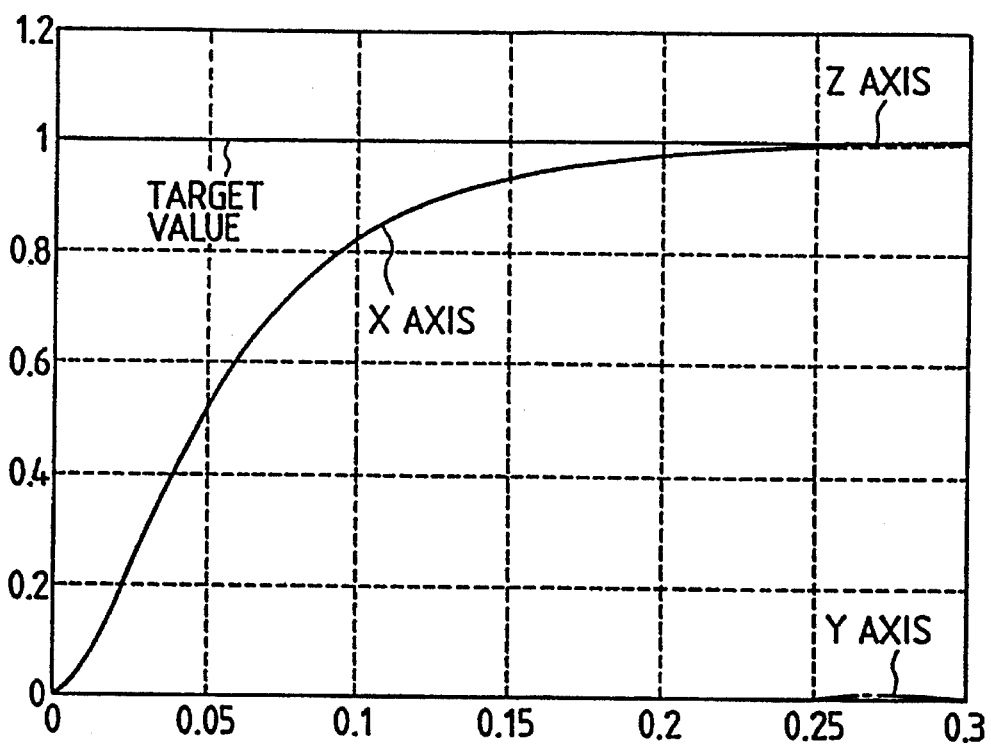
FIG. 47 is a graph showing the response characteristics of the axial feed control system of the position control apparatus shown in FIG. 46.
Figure 48:
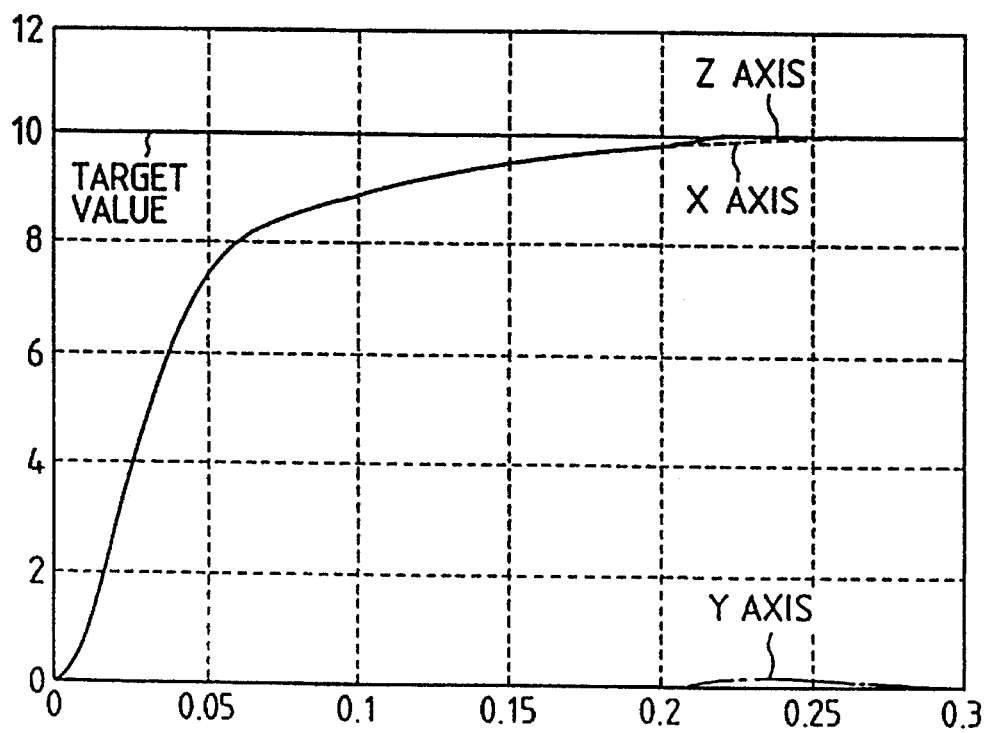
FIG. 48 is a graph showing the response characteristics of the axial feed control system of the position control apparatus shown in FIG. 46.

FIG. 44 is a graph showing the convergence characteristics with respect to target values at the time of disturbance application in the composite system control apparatus of the present invention. More specifically, FIG. 44 shows the convergence characteristics of the X and Y axes in the embodiment in comparison with those in the prior art. Note that the accelerations of the respective axes are the same.

As shown in FIG. 44, convergence to target values in the positioning control system can be performed within a very short period of time from the time when disturbances are applied.

In the above-described embodiment, the target value production means 53 supplies the same target value as the received one to the X axis, and "0" to the Y axis in such a manner that the sum of the target values supplied to the X and Y axes becomes equal to the received target value. In this case, however, 90% of the received target value may be supplied to the X axis, while 10% of the target value may be supplied to the Y axis, so that the sum of the supplied values becomes equal to the received target value.

The above-described embodiment exemplifies the position control apparatus, in which the control system is designed for the two axes, i.e., the X and Y axes. However, the number of axes is not limited to two. The present invention can be easily applied to other arrangements as long as the controller 65 can be designed to minimize an evaluation function.

In addition, in the embodiment, the X and Y axes as controlled objects do not interfere with each other. However, the present invention can be easily applied to a case where the controlled objects interfere with each other, as long as the controller 56 can be designed to minimize a similar evaluation function.

Furthermore, in the embodiment, the control system is a position control apparatus. However, the present invention can be applied to velocity control. That is, the synthetic velocity of a rotation system X axis with a high speed and coarse control precision and a rotation system Y axis with a low speed and fine control precision can be accurately controlled. Moreover, target values are not limited to above-mentioned position and velocity, and temperature data may be used as a target value. For example, the X and Y axes may be replaced with a heater having a large capacity and a heater having a small capacity, respectively, so as to perform temperature control with high precision.

As has been described above, according to the present invention, when the respective addition means add controlled amounts from the controlled objects of the respective control systems and target value signals and output error signals for the respective control systems to the compensation means, the compensation means compensates/calculates and outputs control inputs for optimizing the first evaluation function to the respective controlled objects, while causing the error signals output from the addition means and the controlled amounts output from the controlled objects to interfere with each other. With this operation, the response speed with respect to controlled amount of a composite purpose can be increased without increasing the gain of each control system.

In addition, when the respective addition means add controlled amounts from the respective controlled objects and target value signals and output error signals for the respective control systems to the compensation means, the compensation means calculates control inputs for optimizing the second evaluation function and outputs them to the respective controlled objects, while causing the error signals output from the addition means, the controlled amounts output from the controlled objects, and either or both of the disturbances applied to the controlled objects to interfere with each other. With this operation, stationary errors caused by disturbances acting on controlled amount of a composite purpose can be converged at a high speed.

In addition, the compensation means calculates and outputs control inputs for compensating the characteristics of the respective controlled objects on the basis of the integral values of error signals from the respective addition means or values obtained by multiplying the integral values by predetermined weights. Therefore, stationary errors caused by stepwise disturbances can be quickly eliminated.

Therefore, the response characteristics with respect to the overall controlled amount as the sum of controlled amounts of the respective controlled objects of the composite system can be greatly improved, and stationary errors with respect to disturbance application can be quickly converged.

What is claimed is:

1. A composite system course control apparatus comprising:

target value production means for producing a target value for moving a controlled object as a reality axis by a desired amount;

virtual target value production means for producing a virtual target value for moving a virtual controlled object as a virtual axis based on the reality axis; and control means for calculating a control input and a virtual control input which optimize a predetermined first evaluation function upon receiving the produced virtual target value, the produced target value, a virtual state amount from the virtual controlled object, a state amount from the controlled object, a first disturbance signal with respect to the virtual controlled object, and a second disturbance signal with respect to the controlled object, and for outputting the calculated control input and the calculated virtual control input to the virtual controlled object and the controlled object, respectively, the first evaluation function including a first or second weighting function component for evaluating a course error.

2. A composite system course control apparatus comprising:

target value production means for producing target values for moving a plurality of controlled objects by desired amounts; and control means for calculating control inputs for optimizing a predetermined first evaluation function upon receiving the target values, state amounts from the controlled objects, and disturbance signals with respect to the controlled objects, thus outputting the control inputs to the controlled objects, the first evaluation function including a first or second weighting function component for evaluation a course error.

3. A composite system course control apparatus comprising:

target value production means for producing target values for moving a plurality of controlled objects by desired amounts;

target value conversion means for converting the target values produced by said target value production means into new target values; and control means for calculating control inputs for optimizing a predetermined first evaluation function upon receiving the converted target values output from said target value conversion means, state amounts from the controlled objects, and disturbance signals with respect to the controlled objects, and for outputting the control inputs to the controlled objects.

4. A control apparatus for a composite control system having target value generation means for generating a target value corresponding to a composite controlled amount represented by a sum of terms obtained by multiplying controlled amounts output from controlled objects of the respective control systems by predetermined weights, comprising:

target value production means for producing desired target value signals on the basis of the target value;

a plurality of addition means for respectively adding the controlled amounts from the controlled objects of the control systems and the target value signals and outputting error signals for the respective control systems; and compensation means for compensating/calculating control inputs for optimizing a first evaluation function upon receiving the error signals output from said addition means and the controlled amounts output from the respective controlled objects, the control inputs being output to the respective controlled objects.

5. A control apparatus for a composite control system having target value generation means for generating a target value corresponding to a composite controlled amount represented by a sum of terms obtained by multiplying controlled amounts output from controlled objects of the respective control systems by predetermined weights, comprising:

target value production means for producing desired target value signals on the basis of the target value;

a plurality of addition means for respectively adding the controlled amounts from the controlled objects of the control systems and the target value signals and outputting error signals for the respective control systems; and compensation means for compensating/calculating control inputs for optimizing an evaluation function upon receiving the error signals output from said addition means, the controlled amounts output from the respective controlled objects, and either or both of disturbances applied to the controlled objects, the control inputs being output to the respective controlled objects.

6. An apparatus according to claim 5, wherein said compensation means calculates and outputs a control input for compensating characteristics of each controlled object on the basis of an integral value of the error signal from each of said addition means or a value obtained by multiplying the integral value by a predetermined weight.

* * * * *

UNITED STATES PATENT AND TRADEMARK OFFICE
CERTIFICATE OF CORRECTION

PATENT NO. : 5,459,381
DATED : October 17, 1995
INVENTOR(S) : Itoh

It is certified that error appears in the above-indentified patent and that said Letters Patent is hereby corrected as shown below:

COLUMN 14:

Line 9, "$F_0X_k + F_1R_{k+1} + \sum_{i=2}^{M} F_1 R_{k+1}$" should read $$--U_k = F_0X_k + F_1R_{k+1} + \sum_{i=2}^{M} F_1 R_{k+1}--.$$

Line 32, "thereto. Assume" should read --thereto. ¶ Assume--.

COLUMN 15:

Line 5, "$J_{(t)} \int_{t}^{t+t_w} \{(R_{(\tau)} - Y_{(\tau)})^T Q_{(\tau)} (R_{(\tau)} - Y_{(\tau)} + U^T_{(\tau)} H_{(\tau)} V_{(\tau)}\} d\tau$" should read $--J_{(t)} \int_{t}^{t+t_w} \{(R_{(\tau)} - Y_{(\tau)})^T Q_{(\tau)} (R_{(\tau)} - Y_{(\tau)} + U^T_{(\tau)} H_{(\tau)} U_{(\tau)}\} d\tau--$.

COLUMN 17:

Line 57, "u=(u1, u2, u3)" should read --U=(U1, U2, U3)--.

COLUMN 20:

Line 1, "$J_{(k)} = E[|e_i|^2 + q_1 * \{|e_i|^2 * |\Delta R_i|^2 - (e_i \Delta R_i)^2\} + U^T_i H u_i]$" should read
$--J_{(k)} = \Sigma[|e_i|^2 + q_1 * \{|e_i|^2 * |\Delta R_i|^2 - (e_i, \Delta R_i)^2\} + U^T_i H U_i]--$.

UNITED STATES PATENT AND TRADEMARK OFFICE
CERTIFICATE OF CORRECTION

PATENT NO. : 5,459,381  
DATED : October 17, 1995  
INVENTOR(S) : Itoh

Page 2 of 3

It is certified that error appears in the above-indentified patent and that said Letters Patent is hereby corrected as shown below:

COLUMN 24:

Line 6, "$U_i^T Hu_i]$" should read --$U_i^T HU_i]$--.

COLUMN 29:

Line 20, "$J_{(k)} = \sum_{i=k}^{i=k+M} \{(R_{(i)} - Y_{(i)})^T Q_{(i)} (R_{(i)} - Y_{(i)} + U^T_{(i)} H_{(i)} U_{(i)}\}$"

should read --$J_{(k)} = \sum_{i=k}^{i=k+M} \{(R_{(i)} - Y_{(i)})^T Q_{(i)} (R_{(i)} - Y_{(i)}) + U^T_{(i)} H_{(i)} U_{(i)}\}$--.

Line 26, "$J_{(t)} \int_{t}^{t+t_w} \{(R_{(\tau)} - Y_{(\tau)})^T Q_{(\tau)} (R_{(\tau)} - Y_{(\tau)}) + U^T_{(\tau)} H_{(\tau)}\} d\tau$" should read --$J_{(t)} \int_{t}^{t+t_w} \{(R_{(\tau)} - Y_{(\tau)})^T Q_{(\tau)} (R_{(\tau)} - Y_{(\tau)}) + U^T_{(\tau)} H_{(\tau)} U_{(\tau)}\} d\tau$--.

COLUMN 30:

Line 54, "$U_{(i)} = K_{1(i)} * e_{(i)} + K_{2(i)} * Ee_{(i)} + K_{3(i)} * X_{(i)} + k_{4(i)} * R_{(i)}$" should read
--$U_{(i)} = K_{1(i)} * e_{(i)} + K_{2(i)} * Ee_{(i)} + K_{3(i)} * X_{(i)} + K_{4(i)} * R_{(i)}$--.

UNITED STATES PATENT AND TRADEMARK OFFICE
CERTIFICATE OF CORRECTION

PATENT NO. : 5,459,381          Page 3 of 3
DATED      : October 17, 1995
INVENTOR(S): Itoh It is certified that error appears in the above-indentified patent and that said Letters Patent is hereby corrected as shown below:

COLUMN 33:

Line 5, "evaluation" should read --evaluating--.

Signed and Sealed this

Eleventh Day of June, 1996

Attest:

BRUCE LEHMAN

Attesting Officer           Commissioner of Patents and Trademarks